Figure 1:
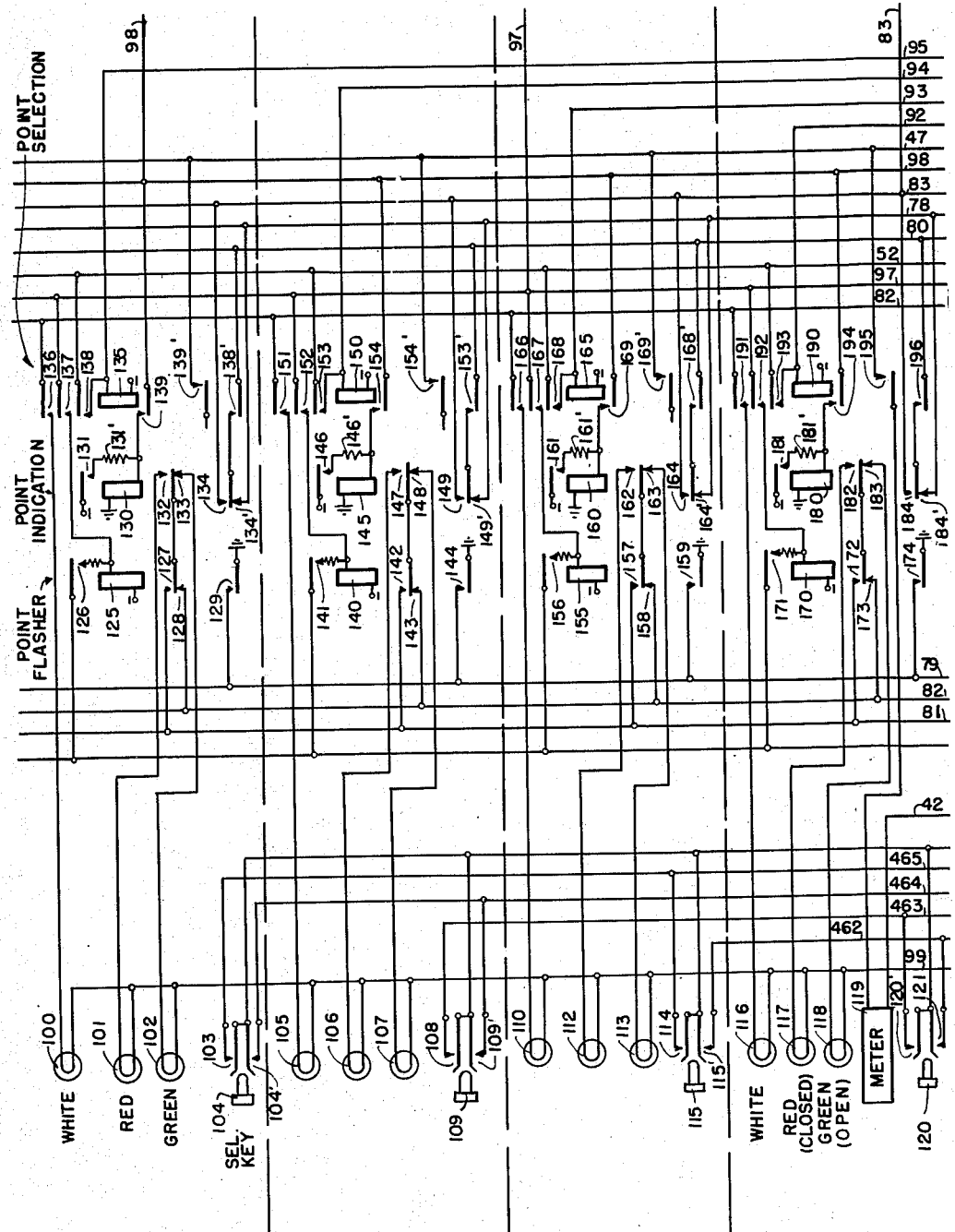
Figure 4:
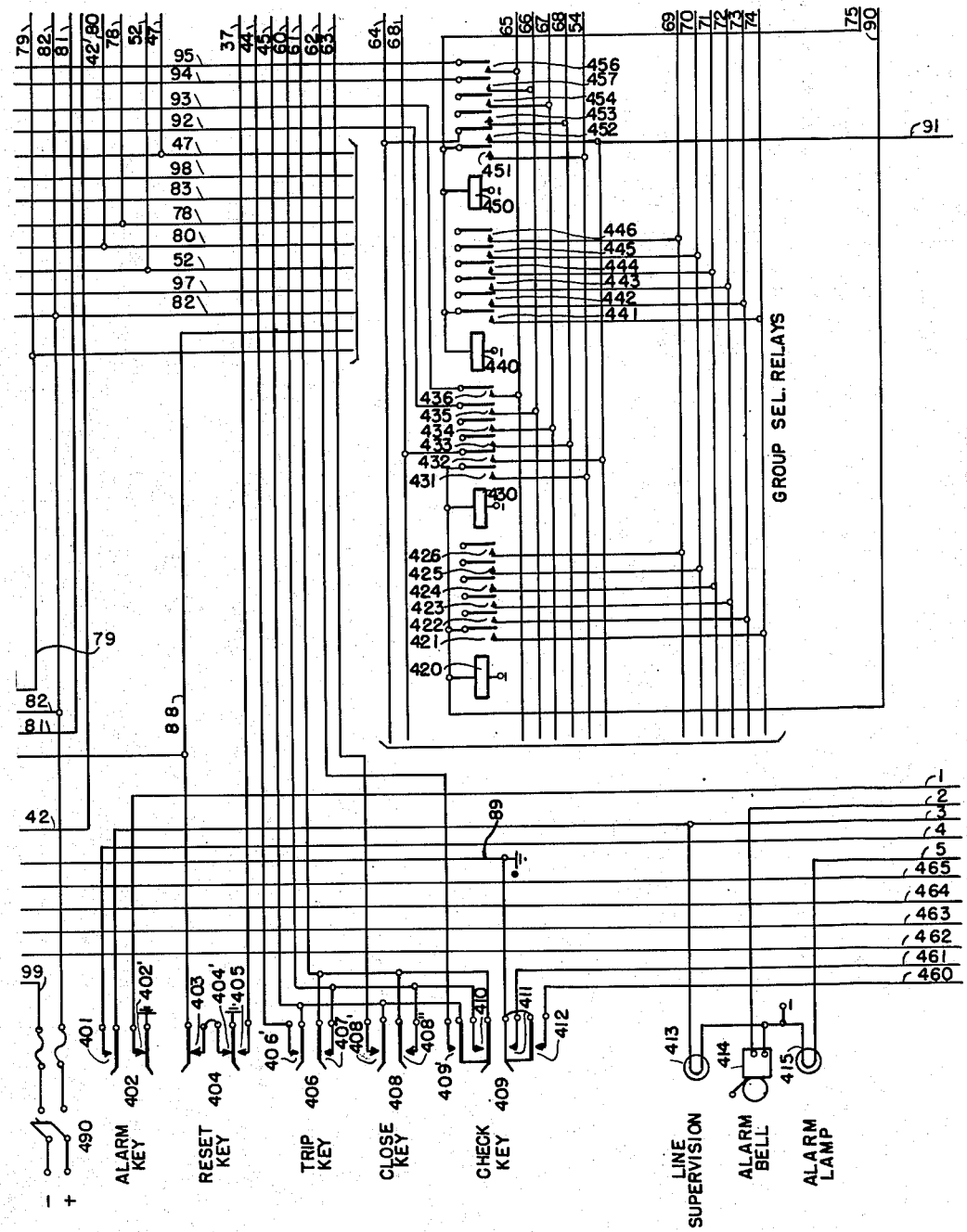
Figure 5:
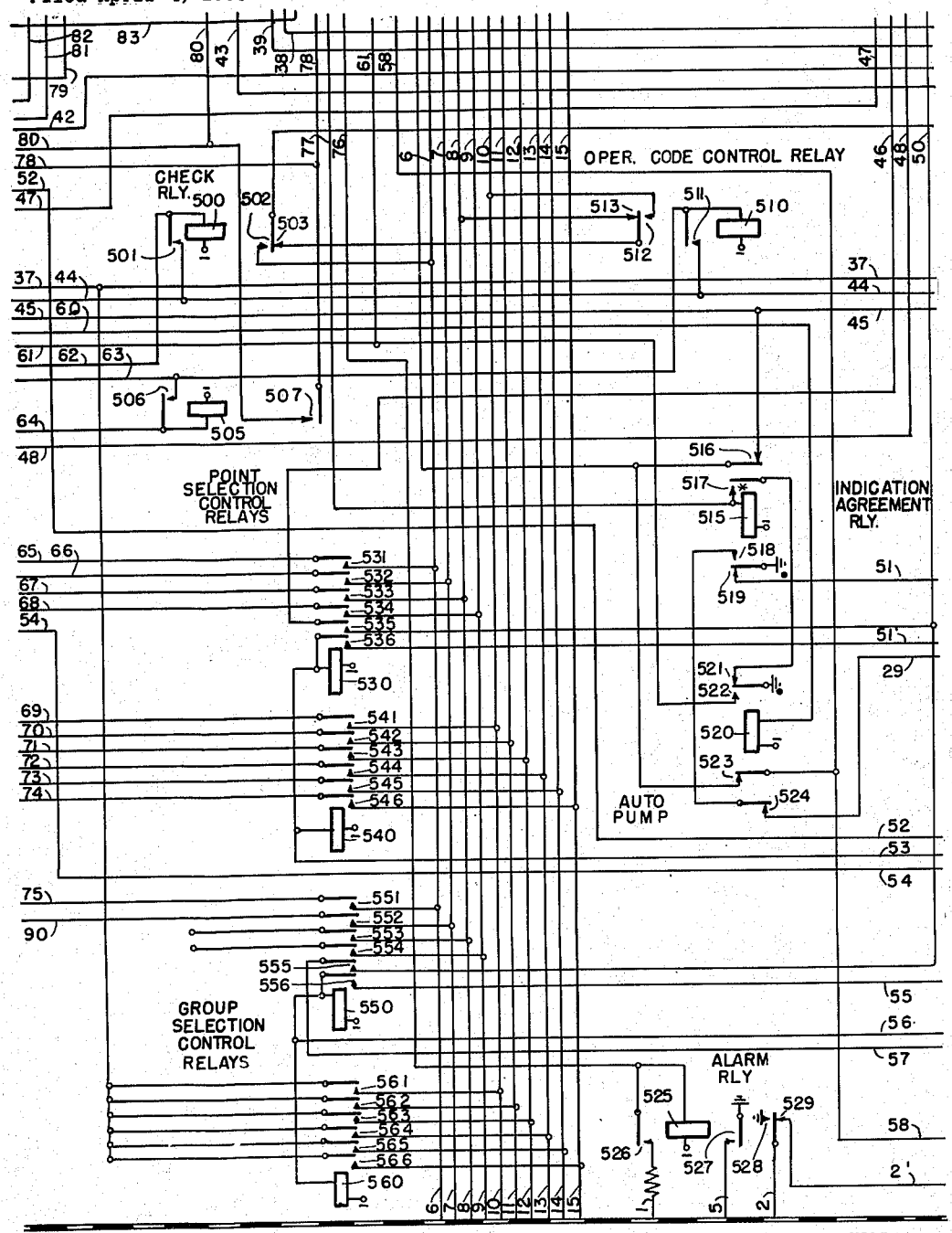
Figure 6:
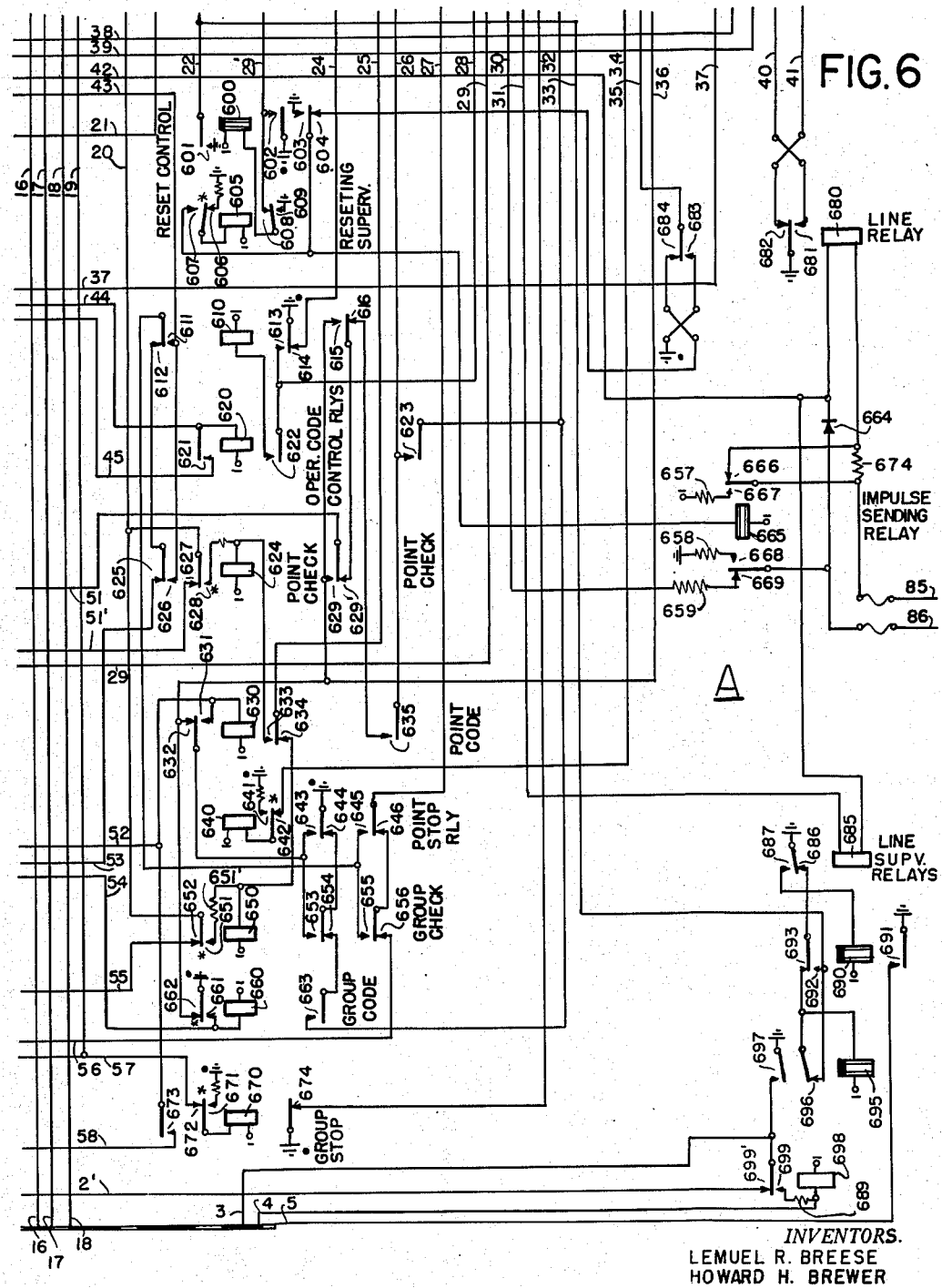
Figure 7:
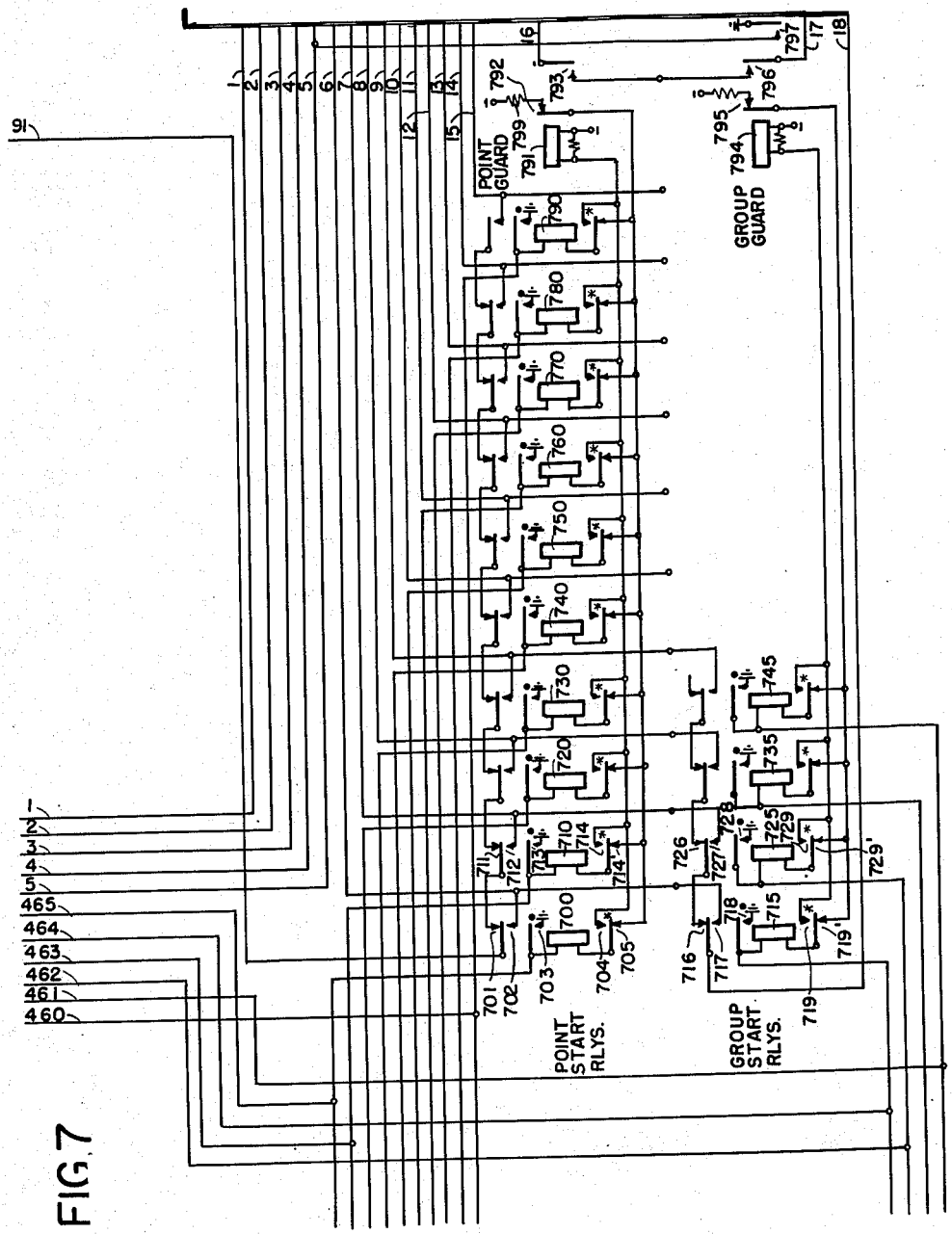
Figure 8:
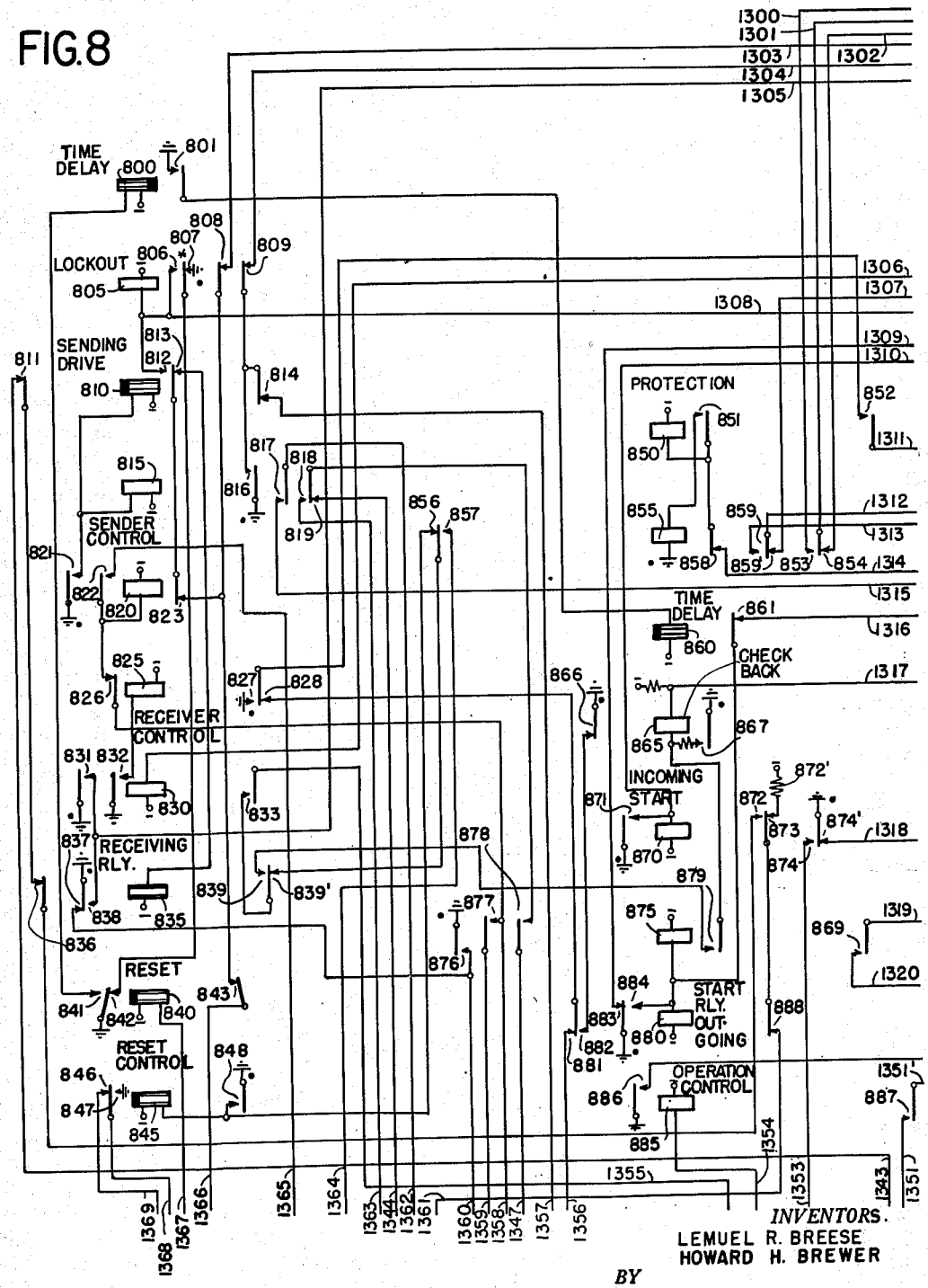
Figure 9:
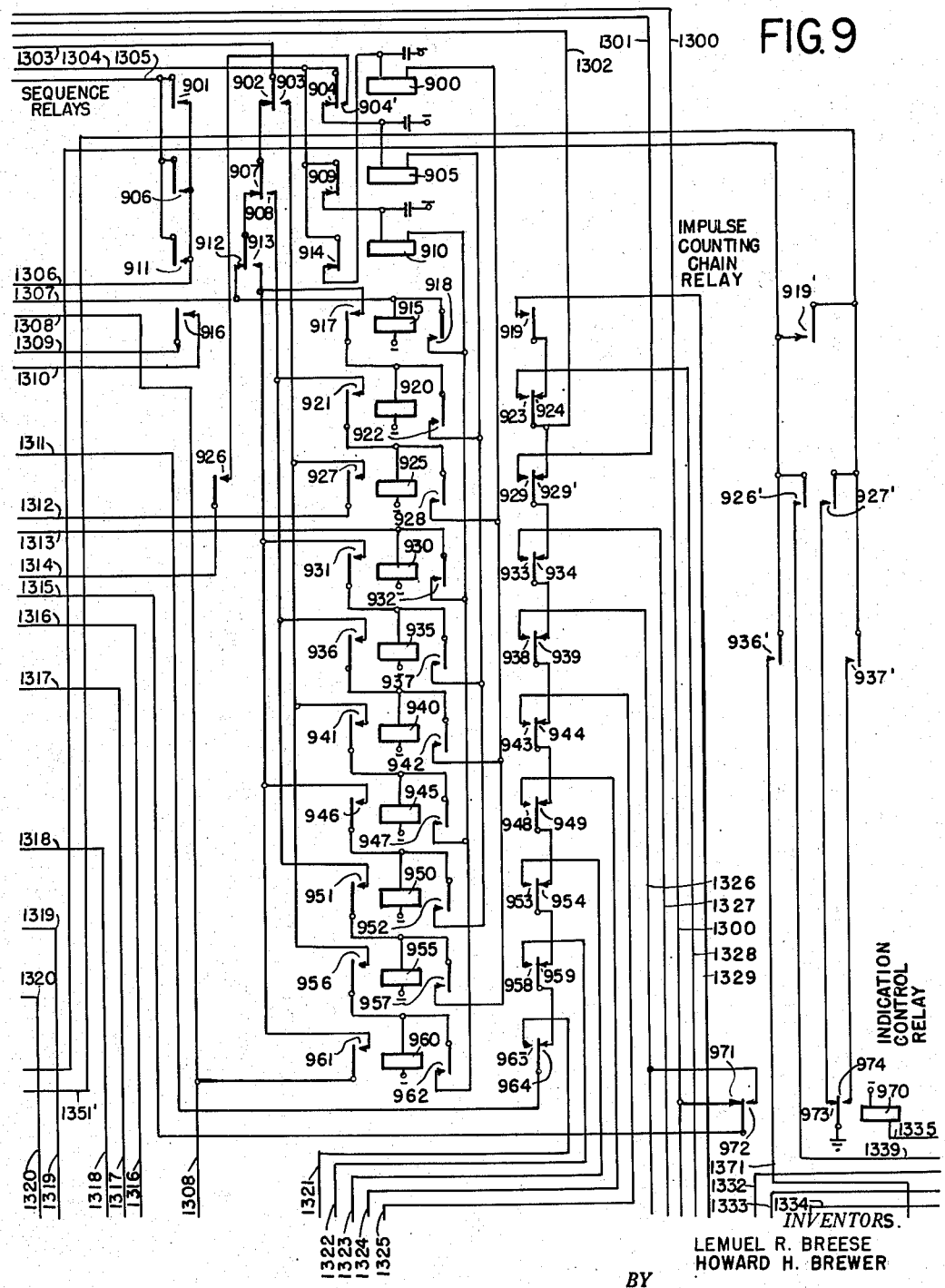
Figure 10:
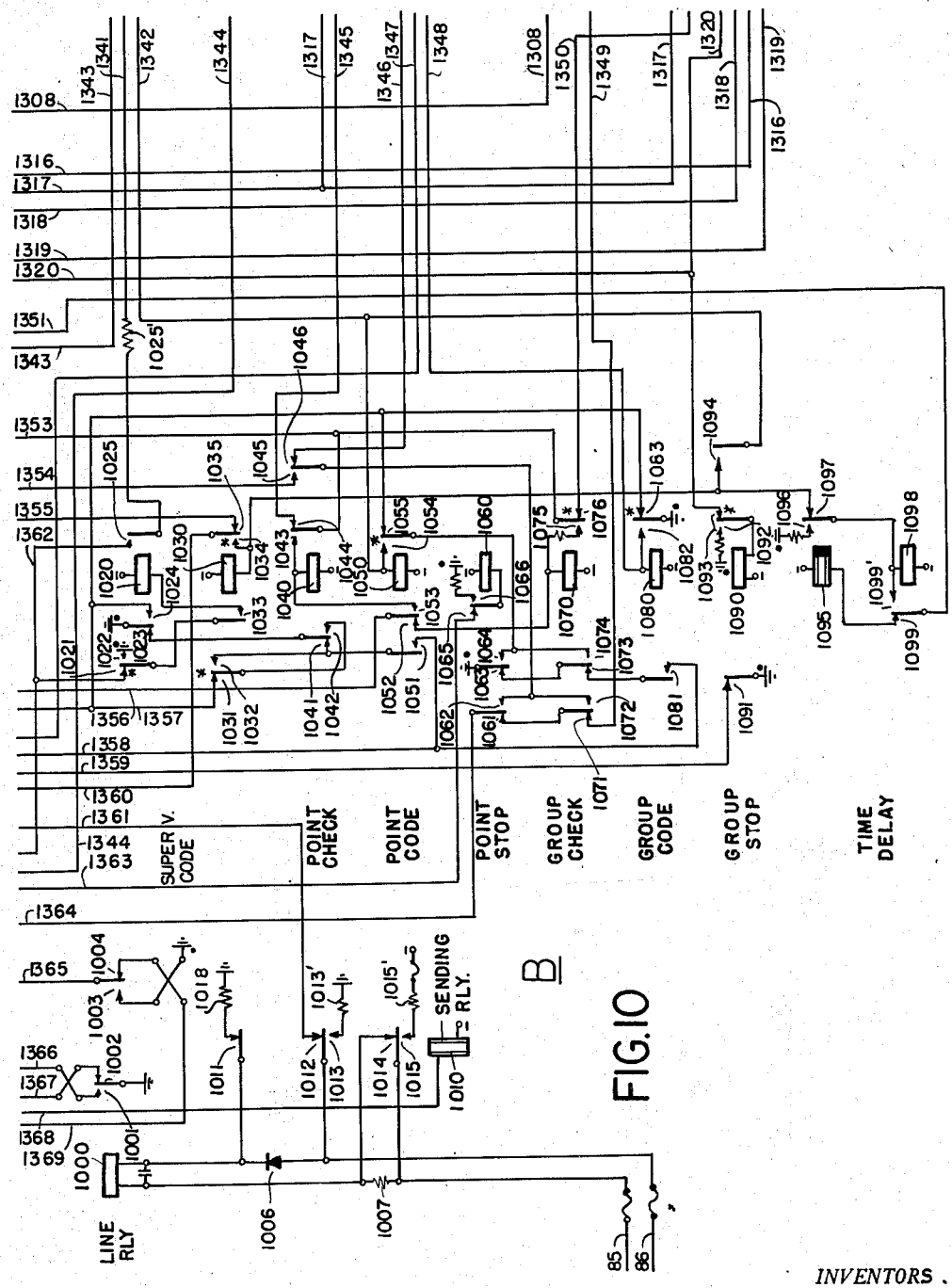

Nov. 4, 1952   L. R. BREESE ET AL   2,616,959
SUPERVISORY CONTROL SYSTEM SAFEGUARD
Filed April 4, 1950   12 Sheets-Sheet 2
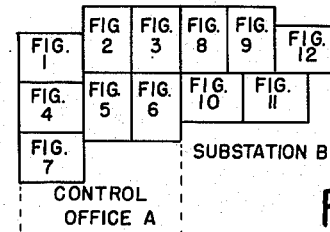
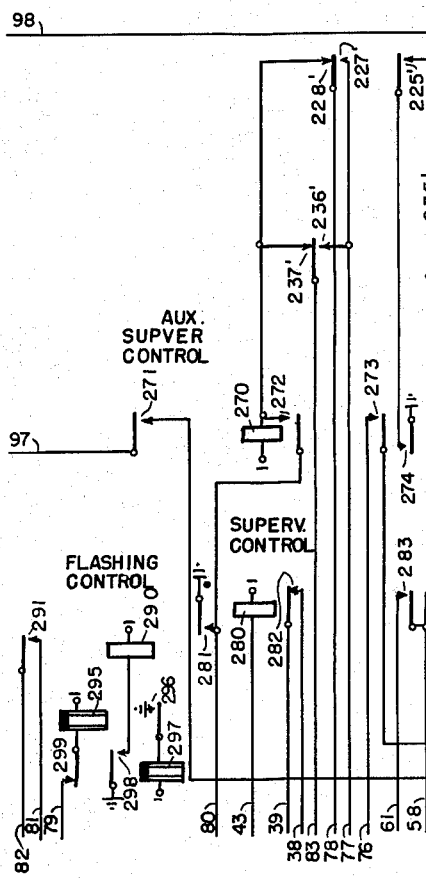
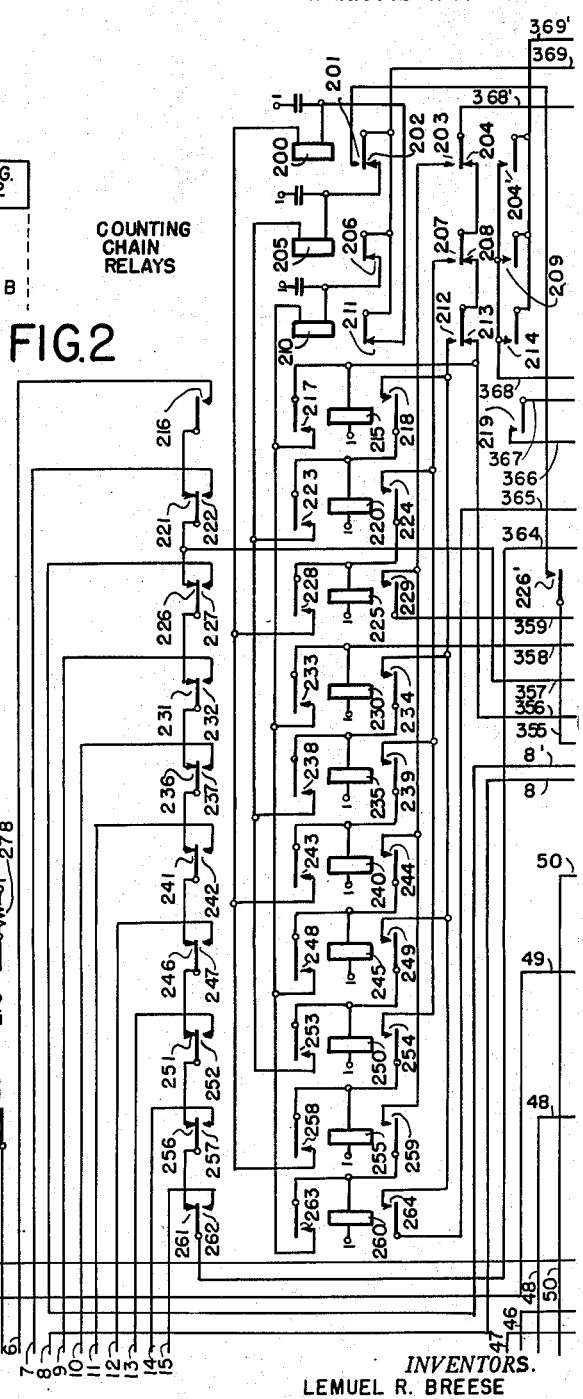
INVENTORS.
LEMUEL R. BREESE
HOWARD H. BREWER
BY
ATTORNEYS Nov. 4, 1952 — L. R. BREESE ET AL — 2,616,959

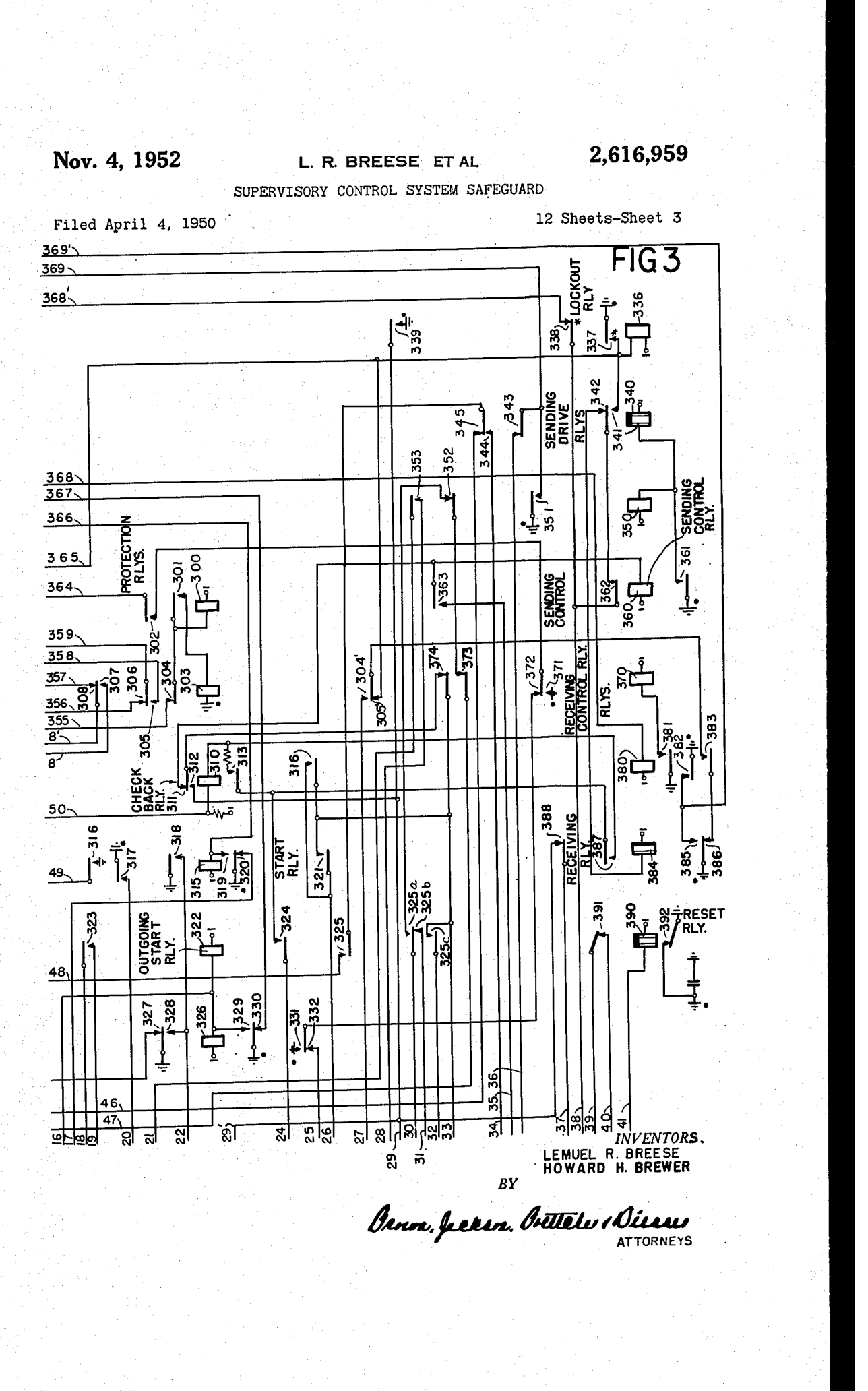

SUPERVISORY CONTROL SYSTEM SAFEGUARD

Filed April 4, 1950 — 12 Sheets-Sheet 3

FIG 3

INVENTORS.
LEMUEL R. BREESE
HOWARD H. BREWER
BY
ATTORNEYS

Nov. 4, 1952    L. R. BREESE ET AL    2,616,959
SUPERVISORY CONTROL SYSTEM SAFEGUARD
Filed April 4, 1950    12 Sheets-Sheet 6

INVENTORS.
LEMUEL R. BREESE
HOWARD H. BREWER
BY
ATTORNEYS

Nov. 4, 1952     L. R. BREESE ET AL     2,616,959
SUPERVISORY CONTROL SYSTEM SAFEGUARD
Filed April 4, 1950     12 Sheets-Sheet 11

FIG. 11

INVENTORS.
LEMUEL R. BREESE
HOWARD H. BREWER
BY
ATTORNEYS

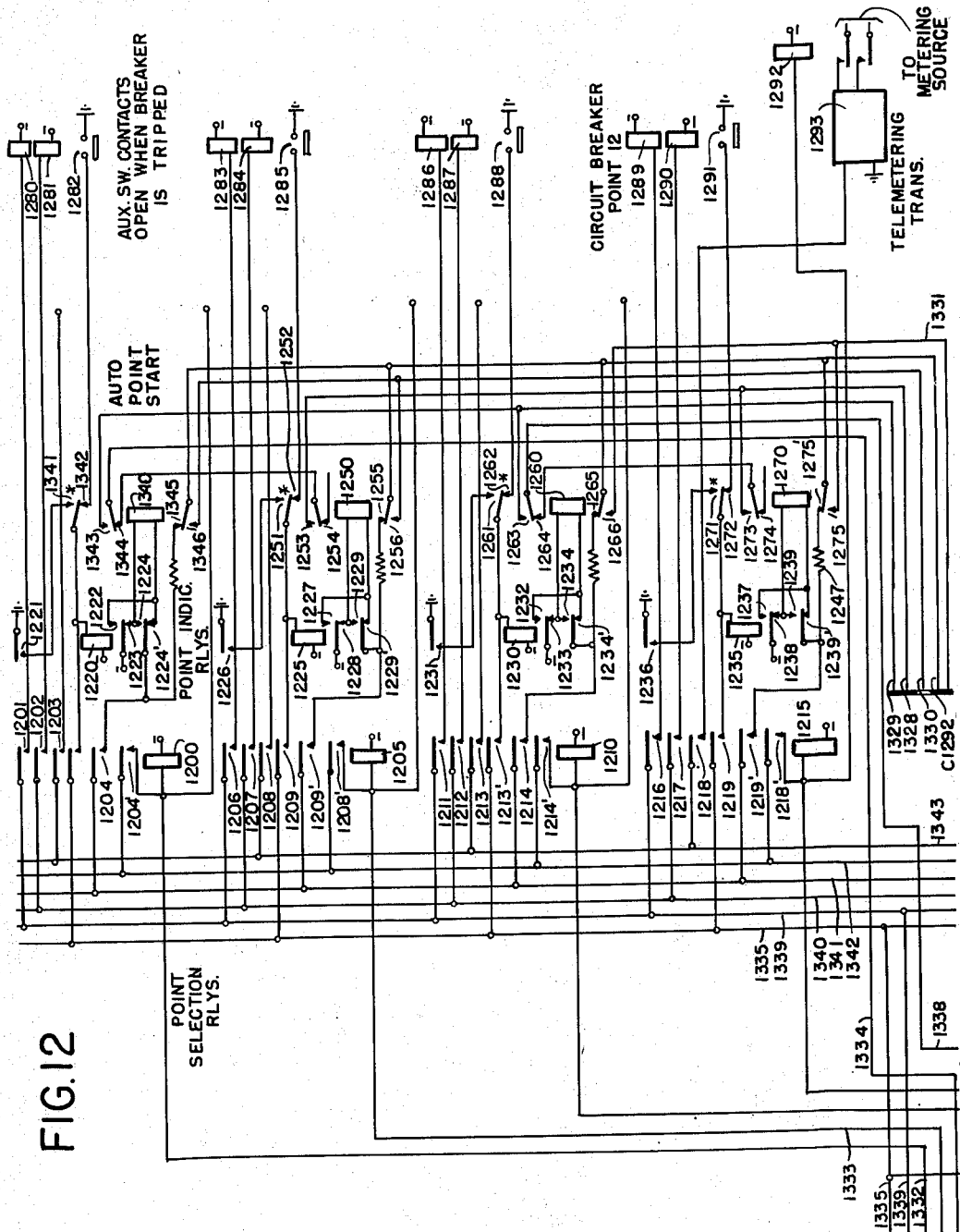

Patented Nov. 4, 1952

2,616,959

UNITED STATES PATENT OFFICE 2,616,959

SUPERVISORY CONTROL SYSTEM SAFEGUARD

Lemuel R. Breese and Howard H. Brewer, Galion, Ohio, assignors to The North Electric Manufacturing Company, Galion, Ohio, a corporation of Ohio Application April 4, 1950, Serial No. 153,962

24 Claims. (Cl. 177—353)

The present invention relates, in general, to automatic signalling equipment which is adapted for supervisory control purposes, and, particularly, to automatic supervisory equipment for controlling the operation of switching apparatus located at a series of remote points. The switching apparatus may, in turn, be arranged to control various types of electrical or mechanical units which are located at the distant points, such as circuit-breaker equipment for power lines, flood gates on dam installations, transformer switching and distribution stations, automatic substations, such as used in railroading and mining fields, automatic electrified pumping stations and substation generating installations.

It is apparent that in the automatic control of such types of equipment, the slightest error in operation may result in serious loss of life and property, and, therefore, automatic equipment adapted for such use must be safe, reliable and dependable in operation. It is, therefore, a primary object of this invention to provide an improved, more dependable type supervisory control arrangement which has new and novel safeguard means included therein for preventing false operation of the controlled apparatus.

In controlling a number of individual units, as for example, a series of circuit-breakers disposed at a distant location, it is necessary to establish a direct operating connection between the individual control buttons at the control station and the individual units at the remote controlled points. In theory, the simplest arrangement would comprise the extension of a pair of telephone wires, between the stations, for each control button and its associated unit. It is apparent, however, that in installations in which as many as a hundred units are controlled, this arrangement would necessitate the use of one hundred pairs of wires, and would prove economically impractical, especially if any considerable distance were involved between the controlled and controlling station. While in given installations several channels have been used to control a plurality of units at a distant station, experience has taught that the more economical type of supervisory equipment is that which is adapted to exercise its supervisory control over a single channel connection. An arrangement of this general type is set forth in the United States Patent No. 2,444,243, which was issued to Lemuel R. Breese on June 29, 1948, and which is assigned to the assignee of this invention. In the interests of simplicity, the arrangement set forth in the subsequent description is concerned only with the equipment located at a controlling station and a single controlled station, although the equipment is also arranged for simultaneous control of an equal number of units at a number of remote controlled stations.

In the more desirable types of selective control arrangement used in the field, the control station is arranged to transmit certain signals or orders to the chosen substations, and the substation is arranged to perform these orders and verify their execution. The four essential equipment operations, the selection by the operator of the desired unit, the automatic check signals providing proof of correct selection, the operation of the selected unit, and the automatic indication of a change in the condition of the unit, are accomplished by the intertransmission of codes of direct current impulses at the rate of approximately 15 impulses per second. A series of relays (usually five or ten in number) connected in a sequence arrangement, which is conventionally known in the art as a counting chain, are provided at each station for the purpose of translating the interexchanged control impulses into selective operations of the circuit breaker equipment at the substation and the indicating equipment at the control station. The extensive use of protective equipment and the check back signals provides a control system which is quite competent and reliable in operation.

One of the problems which has long proved troublesome, even in the systems of this type, however, is the provision of protection against false operation of the counting chain and the controlled apparatus by the so-called transient electrical disturbances which closely simulate the control pulses used in the operation of the equipment. These transient electrical disturbances may be caused by any one of numerous unfavorable atmospheric or installation conditions, the more common type of disturbance being the transient electrical disturbances which are established in outdoor line conductors during electrical storms. In that the control station and substation are normally connected by a signalling channel which is carried openly for long distances, the protection of equipment from electrical disturbances of this nature has long proven to be a serious problem in the field.

Various arrangements have been used heretofore in an attempt to prevent improper circuit operation by this type of transient pulse, one of the methods, for instance, comprising the use of an extra dummy relay at the beginning of each of the counting chains, the dummy relay being operative to absorb a single transient pulse as received without effecting any functional operation of the equipment. That is, as the transient pulse is received the dummy relay operates without effecting a circuit operation, and as the transient pulse ends the dummy relay safely releases. While limited protection is afforded by this arrangement, it is apparent that as the result of the addition of the dummy relay an extra pulse had to be added to each of the transmitted controlling codes to compensate for the absorption of one of the code impulses by the dummy relay. In that as many as four to six separate codes are normally transmitted in effecting the selection of a unit at the substation, it is apparent that the operating time of equipment so arranged was unavoidably greater than that of the conventional equipment. Additionally, the use of a dummy relay only provided protection against single transient pulses, whereas in commercial installations as many as seven operating transient pulses have been received at a time.

While it is conceivable that more dummy relays might be added to protect the equipment from improper operation on receipt of the larger number of transients, it is evident that each of the transmitted codes would necessarily require the addition of an equal number of compensating pulses and the operating speed of the equipment would be seriously impaired.

A further protective expedient which has been employed in systems of the prior art consisted of leaving the first several relays of the counting chain inoperative to produce an operative function; that is, instead of adding several dummy relays to the operating arrangement, the first several relays incorporated in the counting chain of ten were made non-functional in their energization. Thus, as a transient is received the first counting chain energizes without effect and the transient pulse is absorbed. Such arrangement, however, seriously limits the number of relays which are available for active or functional purposes, and, accordingly, the capacity of the system is undesirably limited.

Other arrangements have been employed in the field in an attempt to provide the desired system protection, but seemingly each of these prior art arrangements has been such as to result in the sacrifice of speed of operation and economy of manufacture, or, of a type which affords only a limited degree of protection. There is, therefore, a need in the field for remote control signalling equipment which is extremely rapid in operation, comparatively inexpensive in manufacture, and accurate and reliable in use, and it is the primary object of this invention to provide such type equipment.

It is a specific object of the invention to provide new and novel circuit protective means for preventing operation of controlled circuit breaker apparatus by transient impulses of any type. Such object is accomplished by providing each of the stations with novel electrical protective means which may be compared to a "maze" or "labyrinth" which permits the transient impulses to enter the equipment and operate the counting chain relays thereat, but which arrests their effect at that point so as to prevent the improper operation of the controlled circuit breaker apparatus thereby.

The code impulses which are normally used in effecting the desired operations of the controlled circuit breaker apparatus are provided with a special series of impulses which act as a "key" thus enabling the code or operating pulses to pass through the "labyrinth" to operate the counting chain and ultimately the selected one of the controlled circuit breaker units in the desired manner. It is especially important to note that the "key" precedes only the first of the six transmitted codes normally required to effect a selective operation of the desired unit, whereby the remaining five codes follow in order without being burdened by the addition of an impulse "key".

The protective circuit arrangement described may be adjusted according to a further feature of the invention to trap any desired number of transient impulses, as for example 3, 6, 9, etc., whereby the apparatus is readily adapted for use in different localities having varied atmospheric and installation problems. The installation also includes additional protective apparatus to preclude improper operation in the event that the transient pulses should unexpectedly exceed the particular range of transient protection for which the equipment is adapted.

Other objects and advantages of the invention will be understood by reference to the following specification and accompanying drawings wherein selected embodiments of the structure are illustrated.

In the drawings:

Figures 1 to 7 when arranged in the manner of the figure layout set forth in Figure 13 are illustrative of the novel supervisory equipment which is located at the dispatch or control office of the installation, and Figures 8 to 12 are illustrative of the novel supervisory equipment which may be located at a remotely disposed substation.

GENERAL DESCRIPTION

For purposes of illustration, the invention is disclosed in an arrangement comprising a dispatch or control office A which is adapted to automatically control equipment disposed at a distantly located substation B over a single signalling channel comprising a pair of line conductors 85 and 86. A control panel at the control station enables an attendant thereat to effect independent selective closing and tripping operations of a plurality of circuit breaker units disposed at the substation, to instantly determine the operated condition of any one of these circuit breaker units and to receive telemetered information concerning the circuit controlled by the selected point.

The circuit breaker units are of the conventional type, and in view of their similarity, only several have been shown herein. The circuit breaker at point twelve (12) for example comprises a set of power controlling contacts (not shown) a close coil 1290, a trip coil 1289, and a set of auxiliary contacts 1291. Momentary energization of the close coil effects closing of the breaker and mechanical means hold the breaker in such position until such time as a momentary energization of the trip coil or occurrence of a line fault effects reopening thereof. Auxiliary switch contacts such as 1291 are used to indicate the breaker position to the equipment at the control office.

The control equipment illustrated in the present embodiment is commonly referred to as the two-digit selection type which is operative to select any one of one hundred substation points (circuit breakers), it being understood that the features of the invention may also be embodied in the conventional one and three digit systems without departing from the scope of the invention.

In the two digit system, the points (circuit breaker and/or meter) are divided into groups of ten, whereby the selection of the points may be accomplished by sequentially transmitting the group and unit identification numbers of the desired circuit breaker.

For example, group 1 of the points may comprise circuit breakers 1 to 10, group 2 may comprise circuit breakers 11 to 20, group 3 may comprise circuit breakers 21 to 30, etc. Thus, the circuit breaker at point 12 is the second point in the second group of points, and in selecting this point the group selection digit 2 and the point selection digit 2 are transmitted sequentially. Upon arriving at a point, control of the circuit breaker is accomplished by transmission of one of the control codes, which in the given embodiment, comprise three pulses for "trip" and five pulses for "close." Of course, the number of impulses selected for close or trip codes is arbitrary.

The equipment for initiating the transmission of these coded group and unit impulses to effect selection of a chosen circuit breaker, and for thereafter initiating the control code of three or five impulses, generally includes a control panel disposed at the control station for convenient operation by an attendant thereat. The control panel in addition to providing selection and control of the circuit breakers at the substation is arranged to indicate automatic changes of position of the circuit breakers and to effect other supervisory operations necessary to the accomplishment of complete remote control.

The control panel may include a group of common control units, such as an alarm key, reset key, an alarm lamp, a trip key, a close key, a check key, an alarm bell, alarm lamp and line supervision lamp. A further section of the control panel is divided into a series of individual control and indicating panels, each of which is correspondingly individual to one of the circuit breakers located at the substation. Each of the individual panels may comprise an escutcheon plate which mounts an individual selection key for selecting its associated substation circuit breaker, a white selection lamp, a red indication lamp, and a green indication lamp. The red indication lamp is illuminated whenever the circuit breaker located at the substation is in the closed position, and the green indication lamp is illuminated whenever the circuit breaker is in the open position. The white lamp associated with each of the individual control panels is operated with operation of the selection key and indicates to the operator that a particular point has been reached.

Should the associated circuit breaker at the substation automatically change position, an alarm bell and an alarm lamp at the dispatch office flash to draw the attention of the attendant thereas, the red lamp flashing if the circuit breaker is being closed and the green lamp flashing if the circuit breaker is being opened. Control keys at the panel enable the operator to silence the alarm bell, turn off the alarm lamp, or stop the flashing of the red and green indicating lamp by operating the alarm key.

A reset key on the control panel enables the operator to reset the equipment at the substation and the control office in the event of the occurrence of a stalled condition, that is, a condition in which some of the relays are in the operated condition and have failed to restore the equipment to normal.

The selection of a circuit breaker is accomplished by merely operating the selection key at the control office which is individual to the chosen circuit breaker. As the key closing operation is performed, the equipment at the control office is automatically effective to condition itself for the transmission of both a set of "key" pulses for unlocking the substation and control office equipment, and the group identification digit of the selected circuit breaker.

With receipt of the first impulse, the equipment at the substation is operative to condition the equipment thereat for acceptance of the incoming coded impulses. As the key or protective impulses are transmitted from the office to the substation, the counting chains at each of the installations are sequentially advanced to unlock the associated equipment whereby, with receipt of the following group identification pulses, the equipment at both stations will be operated to register the group identification numeral. It is to be noted that protective pulses are prefixed on the first digit only, and that the equipment is completely conditioned for the entire series of codes by the first protective impulses transmitted. Following group registration, the transmitting equipment at the control office is automatically released and the control station is placed in the receiving condition. The substation equipment on completion of the registration of the group selection digit, releases its receiving units and initiates operation of the transmitting apparatus thereat to transmit a combination of impulses to the control office which is indicative of the particular group actually selected, this checking operation being known as the group check operation.

The equipment at the control office is operative in response to receipt of this checking code to compare the original and check-back signals, and, upon agreement, to deenergize its receiving equipment, and reenergize its transmitting equipment to effect the transmission of the coded impulses which are representative of the unit identification numeral for the chosen circuit breaker.

The substation equipment is operated responsive to the receipt of the point selection digit and is effective to register the particular digit which has been transmitted. The check code, known as the point check digit, is thereupon transmitted back to the control office by the substation to indicate the particular point which has been selected.

The equipment at the control office accepts the incoming point check code and upon agreement, notifies the attendant by the lighting of the white lamp that selection is complete. The attendant accordingly operates the close key or the trip key and the corresponding control code is transmitted to effect the operation of the selected unit at the substation to the close or trip position, as the case may be.

Following operation of the desired circuit breaker at the substation, a close or trip indication code, as the case may be, is transmitted by the equipment thereat to the control office to indicate to the attendant that the final operation of the unit has been accomplished.

The equipment at the substation is thereupon operative to restore its operating equipment to normal and to effect a similar restoration of the equipment at the dispatcher's office. The line supervision equipment is likewise restored to its normal condition.

It is seen, therefore, that a single signalling channel comprising two trunk conductors, or any medium capable of transmitting impulses, is operative to effect, in a first key selecting operation, the transmission of a set of "key" or equipment unlocking pulses, a set of group selecting code impulses, a set of unit selecting code impulses (these later pulses being interposed by check impulses for the group and unit selection); and in a second key selecting operation the transmission of the close or trip control code, indication code and supervisory reset code.

In a similar manner, the same signalling conductors are utilized by the substation apparatus to transmit signals to the control office to identify the automatic change of position of circuit breakers which may occur at the substation. These and other important supervisory control arrangements will be brought out more specifically in the following disclosure.

DESCRIPTION OF APPARATUS

The arrangement as shown for purpose of illustration comprises a control office A and a substation B which are interconnected by a single signal channel comprising a pair of line conductors 85 and 86. Control office A includes a control panel which has been previously described herein, from which the attendant may control the operation of the automatic transmitting and receiving equipment at the control office and at the substation. The illustration of the individual points at the controlling office and substation has been restricted to the showing of several points such as points 11, 12, 21 and 22 in the interests of a clear and concise disclosure.

The transmitting and receiving equipment which is disposed at the substation and the control office are somewhat alike, and by reason of the large number of individual elements in each station the general disclosure of this equipment, together with their function, may be best set forth by means of the chart shown below:

RELAY FUNCTIONS

| Control Location, Figs. 1–6, Relay | Substation, Figs. 7–12, Relay | Function |
|---|---|---|
| 680 | 1000 | Line Relay.—Connected to the line wires 85 and 86 in parallel, being normally released. Operates when the line is energized for pulsing at either end. |
| 384 | 835 | Receiving Relay.—Operates at the start of an incoming code. Since it is a slow-release relay it does not release between impulses but releases only after a code of impulses has been completed. |
| 370, 380 | 825, 830 | Receiving Control Relays.—Energize after the first impulse is completed in an incoming code. After selection has been made and locked up they release to terminate the receiving condition. |
| 665 | 1010 | Impulse Sending Relay.—Operates to send impulses by energizing the line. |
| 360 | 820 | Sending Control Relay.—Controls the operation of the Impulse Sending Relay. |
| 340, 350 | 810, 815 | Sending Drive Relays.—Energize at the start of an outgoing code. After the code is completed they release to terminate the sending condition and release the counting chain. |
| 336 | | Lockout and Reset Relay.—Operates to cause reset of equipment if despatcher's office and substation start sending simultaneously, and equipment attempts to send or receive more impulses than can be registered on the counting chain, or if a non-registering or transient code is received. |

RELAY FUNCTIONS—Continued

| Control Location, Figs. 1–6, Relay | Substation, Figs. 7–12, Relay | Function |
|---|---|---|
| | 805 | Lockout Relay.—Operates to cause temporary lockout of the substation if two or more stations start sending simultaneously or if a non-registering group code is received. If two or more stations start sending simultaneously the station sending the highest group selection code causes all other stations to lockout until reset by the despatcher's office. Also causes lockout of station if equipment attempts to send or receive more impulses than can be registered on the counting chain. |
| 525 | | Alarm Relay.—Operates the alarm and the alarm lamp. |
| | 800, 860 | Time Delay Relay.—Operates in cascade during a reset operation to delay the sending relays at the Remote Location and allow the Control Location to cut in and perform an operation. These relays are of the extra-slow release type. |
| 670 | 1090 | Group Stop Relay.—Stops the impulsing when the correct number of impulses has been sent in the group selection code. |
| 660 | 1080 | Group Code Relay.—Locks up the selected group. |
| 650 | 1070 | Group Check Relay.—Stops the impulsing when the correct number of impulses has been sent in the group check code. |
| 640 | 1060 | Point Stop Relay.—Stops the impulsing when the correct number of impulses has been sent in the point selection code. |
| 630 | 1050 | Point Code Relay.—Locks up the selected point. |
| 624 | 1040 | Point Check Relay.—Stops the impulsing when the correct number of impulses has been sent in the point check code. |
| 605 | | Battery Supervision Relay.—Normally held energized and releases only when the control power is shut off, operates the reset relay when power is turned on again. |
| 322, 326 | 875, 880 | Start Relays.—Operate at the originating end to mark that end as the original starting end. |
| 315 | 870 | Start Relay.—Operates at the end conditioned in the receiving state for the present transmission. |
| 310 | 865 | Check Back Relay.—Operates to reset the equipment when, in response to a previously transmitted selection code, a different check code is received. |
| 550, 560 | 1130–1140 | Group Selection Control Relays.—Operate on termination of an incoming group selection code to connect the counting chain contacts to the coils of the group selection relays. |
| 530, 540 | 1110–1120 | Point Selection Control Relay.—Operates on termination of an incoming point selection code to connect the counting chain contacts to the coils of the point selection relays. |
| 280 | | Supervision Control Relay.—Operates on termination of an incoming supervision code to connect the counting chain contacts to the coils of the indication control relays. |
| Chain Relays 215–260. Sequence Relays 200–210. | 915–960 900–910 | Impulse Counting Chain Relays.—Chain relays operate on successive operations of the line relays to count the impulses. Sequence relays operate in succession as the line relays are de-energized after each impulse to cause the counting relays to operate in sequence. |
| 500 | | Check Relay.—Operates when check key is operated to cause equipment to send check code of one impulse. |
| 505 | 1100–1105 | Master Check Relay.—Relay 1105 operates in response to master check code to cause release of all H relays. Relay 1100 at the substation and relay 505 at the dispatcher's office serve as point selection relays on master check. |
| 510, 610, 620 | | Operation Code Control Relays.—Operate to cause equipment to send operation control codes. Relay 620 alone sends trip code—3 imp. Relays 510 and 620 together send close code—5 imp. Relay 610 stops the impulsing when the correct number of impulses has been sent. |

RELAY FUNCTIONS—Continued

| Control Location, Figs. 1-6, Relay | Substation, Figs. 7-12, Relay | Function |
|---|---|---|
| | 1020-1030 | *Supervision Code Control Relays.*—Relay 1030 starts transmission of supervision code. Relay 1020 stops the impulsing when the correct number of impulses have been sent. |
| 515 | | *Indication Agreement Relay.*—Operates to initiate reset of equipment after the supervision code has been recorded. |
| | 970 | *Indication Control Relay.*—Controls the number of impulses to be sent in the supervision code. Released sends three impulses, operated five impulses. |
| 520 | | *Anti-Recycling Key.*—Operates when master control key is held operated until after supervision is received to hold the point selection for further operations and prevents recycling of equipment until control key is released. |
| 600 | 845 | *Reset Control.*—Initiates and terminates the long reset impulse. Relays 600 and 845 operate in conjunction with 850 and 855 to reset substation upon receipt of transient impulses. |
| 390 | 840 | *Reset Relay.*—Operates under control of line relay to energize the auxiliary positive bus and releases to drop all relays being held by this bus. |
| 270 | | *Aux. Supervision Control.*—Operates upon receipt of a supervision code in disagreement with the position of the point indication relay. Causes point indication relay to change position and operates alarm relay 525. |
| | 1095, 1098 | *Time Delay Relays.*—Operate after a control operation to prevent the immediate release of the control MS relays in order to insure complete operation of controlled device. |
| 300, 303 | 850, 855 | *Preliminary Protective Pulse Termination Relays.*—Operate at the end of the preliminary protective pulses and transfer counting chain to normal counting sequence position. |
| 685, 690, 696, 698 | | *Line Supervision Relays.*—Relay 685 (high resistance) is held operated in series with the line relays which are non-operated, from current supplied at the substation, supervising the line. Releases upon an open-line condition or upon a minimum leakage. Relays 690 and 695 control alarms. Relay 698 operates from the alarm key and cuts off the audible alarm. |
| 791, 794 | | *Guard Relays.*—Operate after the point selection key is operated to guard against the possibility of more than one point, code being set up. Relay 791 is point guard and relay 794 is group guard. |
| 290, 295, 297 | | *Flashing Alarm Relays.*—Operate when an automatic change of indication is recorded to cause indication lamp to flash on associated escutcheon. |
| 700, 790 | | *Point Start Relays.*—Operate when selection keys are operated to cause the proper point selection code to be sent. |
| 715, 745 | 1190, 1177 | *Group Start Relays.*—Operate when selection keys are operated or when H relays drop to cause the proper group selection code to be sent. |
| 420, 450 | 1150, 1180 | *Group Selection Relays.*—Operate in response to group selection code to prepare the operating circuits for for the ten associated point selection relays. |
| 135, 190 | 1200, 1215 | *Point Selection Relays.*—Operate in response to the point selection code to close the individual conrol and indication circuits. |
| 130, 180 | 1220, 1235 | *Point Indication Relays.*—Operate and release under control of the breaker auxiliary switch to indicate position of the device. |
| 125, 170 | | *Point Flashing Alarm Relay.*—Operates on an automatic change of indication to cause indication lamp to flash. |
| | 1240, 1270 | *Automatic Point Start Relay.*—Normally energized and releases each time the associated device changes position to cause the change of indication to be transmitted to the dispatcher's office. |
| | 1292 | *Metering Relay.*—Operates upon arrival at a metering point to connect metering source to telemetering transmitter. |

EXPLANATION OF CODES

All operations are performed by alternate transmission of codes between the control station equipment and the substation, the sequence of the codes when an operation is performed by the operator at the control station being as follows:

| | Control Location Transmits | Remote Location Transmits |
|---|---|---|
| 1 | Group Selection Code | |
| 2 | | Group Check Code. |
| 3 | Point Selection Code | |
| 4 | | Point Check Code. |
| 5 | Operation Code | |
| 6 | | Supervision Code. |
| 7 | Reset Code | |

When the remote location reports as operation to the control location, the codes are transmitted as follows:

| | Control Locations Transmits | Remote Location Transmits |
|---|---|---|
| 1 | | Group Selection Code. |
| 2 | Group Check Code | |
| 3 | | Point Selection Code. |
| 4 | Point Check Code | |
| 5 | | Supervision Code. |
| 6 | Reset Code | |

The reset code always consists of one long impulse. The close control code is always transmitted by the control equipment and comprises a series of five impulses. The trip control code is always transmitted by the control equipment and comprises a series of three impulses. The indication code transmitted by the substation comprises a series of five impulses when the circuit breaker is closed and three impulses when open.

REMOTE CONTROL SELECTION AND OPERATION

A more thorough understanding of the apparatus of the invention will now be had with reference to the drawings an the following detailed description of the functions of the equipment shown thereat, responsive to the operation of a selection key on the control board at the control station. A "ground" symbol is used in the diagrams to indicate positive battery. Also it is noted that the first digit of the identification numbers for the various elements are indicative of the figure in which the element appears.

With the control office and substation equipment in their normal restored conditions, positive and negative battery are applied by the substation to the signalling channel over a circuit extending from negative battery over the resistance 872', contacts 873, contacts 888, C1361, contacts 1012, C86, contacts 669, resistor 659, C30, contacts 325b, C31, the winding of line supervisory relay 685, the winding of line relay 680, contacts 666, C85, contacts 1014, the winding of line relay 1000, contacts 1011, and resistance 1018, to ground. The circuit characteristics are calculated so as to normally supply energizing current of approximately 2 milliamperes over the signalling channel. Line relays 680 and 1000 are low resistance relays which operate on approximately 6 milliamperes, whereas the line supervision relay 685 is a high resistance relay which operates at approximately 1½ milliamperes. It will be apparent, therefore, that the line relays 680 and 1000 will be normally restored and the line supervision relay 685 will be normally operated. Line supervision relay 685 at its contacts 686 completes an obvious operating circuit for associated relay 695 and this relay is, therefore, also normally operated.

Battery supervision relay 605 is normally energized over a circuit extending from battery over the winding of relay 605 and contacts 606 to ground, and reset relay 390, which is of the slow-to-release type, is normally operated over a circuit extending from battery over the winding of reset relay 390 and contacts 682 to ground. The remaining relays in the control station are normally in the restored condition.

At the substation reset relay 840 is normally operated over a circuit extending from battery over the winding of the relay 840, and contacts 1002 to ground. Also, each of the automatic point start relays 1240 to 1270 inclusive are in the operated position, the circuit for relay 1270, for instance, extending from battery over contacts 1238, the winding of relay 1270, contacts 1239', resistor 1247, contacts 1275', C1292, contacts 1107, to ground. The remaining relays in the substation equipment are normally in the non-operated position.

It will be apparent from the designation on the drawing that the power supply source for certain of the relays at each of the stations is controlled by the reset relay thereat. That is, reset relay 390 at its contacts 392 controls the supply operating potential for each of the relays which is shown connected to a positive potential connection which is identified by an adjacent dot. Similarly, at the substation the relays marked in this fashion are controlled by power source normally completed by contacts 842 or reset relay 840. Thus, with restoration of either of these reset relays 390 or 840, the power supply to the local relays controlled thereby will be released.

LINE SUPERVISION

Line supervisory relay 685 is normally maintained energized by the current supplied by the substation equipment. However, with the event of a short circuit of approximately ten thousand ohms, the current will be insufficient to hold the relay energized and the line supervisory relay 685 will restore and at its contacts 686 will interrupt the energizing circuit for its associate relay 695, and at its contacts 687 will complete an operating circuit for auxiliary supervisory relay 690. Auxiliary relay 690 operates and at its contacts 691 completes an operating circuit over C5 for alarm lamp 415 to notify the attendant that the equipment is no longer in the normal condition. Auxiliary relay 695 at its contacts 697 also completes an operating circuit over C3 to the line supervision lamp 413 to notify the attendant that the line has failed. Positive potential is connected by relay 695 over contacts 697, and 699', C2', contacts 529, conductor 2, the winding of the alarm bell and negative potential to ring the alarm bell 414 whereby audio signalling is also accomplished.

The attendant operates the alarm key which in turn operates relay 698 over the following circuit: battery over the winding of relay 698, C4, contacts 401, C3, contacts 697 to ground. Relay 698 locks over resistor 689, contacts 699 and 697 to ground. The alarm bell is silenced with the opening of contacts 699 by the operated relay 698. The attendant then takes the necessary steps to correct the mishap and to restore the line supervision equipment by removal of the cause.

It should be noted that when relay 690 releases for any reason, relay 695 is released or operates according to whether ground through contacts 318 or 328 is present on lead 22 or appears on lead 22 before the slow-to-release period of relay 695 expires.

OPERATION OF THE EQUIPMENT AT THE DISPATCH OFFICE ON SELECTION

A. *Initiating control operation*

The operation of the equipment at the dispatch office responsive to operation of a selection key at the control board to select a circuit breaker associated with a given point at the remotely disposed substation will now be described.

As previously pointed out, each of the control board selection keys is individual to a given point or circuit breaker located at the substation, and the operation of the key effects the transmission by the control or dispatch office equipment of a given coded signal which is assigned to the associated circuit breaker at the remote point. With reference to Figure 1, for example, the selection key 120 is arranged to control the operations of the circuit breaker associated with point 12 at the substation. As previously pointed out, point 12 is associated with group 2 and is the second point of the second group. Therefore, selection key 120, which is assigned to that circuit breaker, must be arranged to control transmission of an identifying signal comprising two impulses for the selection of the proper group and subsequently two impulses for selecting the proper point.

Assuming now the operation of selection key 120 by the attendant with the equipment at both stations in the restored condition, contact 121 will be closed by the key to complete an operating circuit for the group start relay 725, which extends from battery through resistor 798 over contacts 795, contacts 729', the winding of the group start relay 725, C462, contacts 121 and C89 to positive battery.

A plurality of group start relays 715, 725, etc., inclusive, are each designed to represent one of the ten groups and are arranged to energize whenever a selection key associated with its assigned group is operated. Thus, group start relay 725 which is assigned to represent the second group, operates with energization of selection key 120, which is associated with point 12 (second group, second point), and at its contacts 728 completes a self-holding circuit and a series operating circuit for a group guard relay 794, which is operative to prevent the simultaneous setting up of more than one group code. The operating circuit for the guard relay 794 extends from battery over the relay winding, contacts 729, the winding of group start relay 725 and contacts 728 to ground. Group guard relay 794 operates and at its contacts 795 opens a point in the operating circuits for each of the group start relays 700 to 790, inclusive, to prevent the operation of further group start relays during the selection period presently being accomplished.

A plurality of point start relays 700–790, inclusive, are each assigned to represent one of the ten points of each group and each is arranged to operate when a selector key associated with its assigned point designation is operated. Thus, in operating the selector key 120 (which is associated with point 12, the second point of the second group), an operating circuit for the second point start relay 710 is completed, the circuit therefore extending from battery through resistor 799 over contacts 792, contacts 714', the winding of the point start relay 710, C463, and contacts 720' to ground. The second point start relay 710 operates and at its contacts 713 completes a series operating circuit for point guard relay 791 and itself, which extends from battery over the winding of the point guard relay 791, contacts 714, the winding of the point start relay 710 and contacts 713 to ground. Point guard relay 791 operates and at its contacts 792 opens a point in the operating circuit for each of the point start relays 700-790, inclusive, to prevent the operation of any other of the point start relays until such time as the present selecting operation is completed. It is apparent from the foregoing that the desired group and point digits have now been recorded in the equipment at the control station.

CONDITIONING EQUIPMENT FOR SIGNAL TRANSMISSION

With the accomplishment of a supervisory operation, one of the stations initiates the control while the other station receives, checks and operates. Conditioning of the control station equipment to effect an outgoing operation and the sending of controlling impulses is effected with the energization of a pair of outgoing start relays 322 and 326. Inasmuch as an outgoing operation is now being initiated, an energizing circuit is completed for the outgoing start relays 322 and 326 (see Fig. 3) by the point guard relay 791, the operating circuit for the start relays extending from battery over the windings of the start relays 322 and 326, respectively, C16, contacts 793 and 796, C17 and contacts 320 to ground.

Start relay 326 operates and at its contacts 329 completes an obvious self-holding circuit for both of the outgoing start relays to maintain same operated until reset of the equipment is accomplished following completion of the circuit breaker operation. Start relay 322 operates and at its contacts 325B opens a point in the previously described operating circuit for the line supervisory relay 685 to effect the release thereof. Line supervision relay 685 releases and at its contacts 687 operates its associated auxiliary relay 690 to illuminate the alarm lamp 415 in the manner previously described which indicates that the control station equipment is in the off-normal condition. Relay 695 is held operated at contacts 328. Outgoing start relay 322 in operating also closes its contacts 335 to complete an operating circuit for the sending control relay 360, which circuit extends from battery over the winding of the sending control relay 360, contacts 311, contacts 334, contacts 325C, C32, contacts 674 to ground.

IMPULSE TRANSMISSION

The line relays at each station are arranged in operating relation with an impulse sending relay to effect a so-called "pumping" arrangement in which a series of impulses are automatically transmitted over the line conductors until positive action is taken to terminate the energizing circuit for the pumping arrangement at the control station.

The sending control relay 360 now operates and at its contacts 363 connects the initial operating ground to the control station impulse sending relay 665, to energize the impulse pumping arrangement thereat, the circuit therefor extending from battery over the winding of the impulse sending relay 665, contacts 604, contacts 684, conductor 35, contacts 363, contacts 311, contacts 374, contacts 325C, conductor 32, contacts 674 to ground. Additionally, the sending control relay 360 at its contacts 361 completes obvious operating circuits for auxiliary sending drive relays 340 and 350 which are maintained operated until the code transmission is completed and then deenergized to terminate the sending condition of the equipment.

Impulse sending relay 665 operates over the afore-described path and at its contacts 667 and 668 completes an operating loop for the local line relay 680 and the line relay 1000 at the sub-station, the local circuit extending from positive battery through resistor 658, over the contacts 668, rectifier 664, dispatch office line relay 680, resistance 674, contacts 667 and resistor 657 to negative battery The operating circuit for substation line relay 1000 extends from positive battery through resistor 658 over contacts 668, line conductor 86, rectifier 1006, substation line relay 1000, contacts 1014, line conductor 85, contacts 667 and resistor 657 to positive battery.

The operation of the impulse pumping arrangement will be described hereat for purposes of clarity and brevity, further repeated description hereinafter being deemed unnecessary. Line relay 680 operates and at its contacts 684 interrupts the operating circuit for the impulse sending relay 665 which being of the slow released type will responsively restore after a short interval and at its contacts 667 and 668 interrupts the energizing circuit for the line relays 680 and 1000. Thus the length of pulses is mainly determined by the restoring time of the slow-to-release relay 665. Line relays 680 and 1000 restore and line relay 680 at its contacts 684 reestablishes the operating circuit for the impulse sending relay 665 which reoperates to reenergize line relay 680. The cycle is thereupon reinitiated and the operation of the arrangement continues until the energizing circuit for the impulse sending relay 665 is interrupted at another point.

It should be observed that the pulsing of line relay 680 effects intermittent opening and closure at contacts 682 of the circuit of reset relay 390, which being of the extra-slow-to-release type does not release during regular pulsing. Restoration thereof is accomplished as hereinafter described by the transmission of a pulse having an extra long break period.

Referring now to the first operation of the line relays 680 and 1000, it is noted that line relay 680 closes its contacts 683 to complete a second energizing circuit for the sending control relay 360 which extends from battery over the winding of sending control relay 360, contacts 363, conductor 35, contacts 683 to ground.

Each of the stations includes a series of relays arranged in the manner of the conventional telephone counting chain arrangements which are operative in sequence to register the coded signal being transmitted or received. Line relay 680 in its first operation at its contacts 681 completes an operating circuit for the first relay 215 of the impulse counting chain at the control office which extends from battery over the winding of relay 215, contacts 213, 208, 204, C363', contacts 338, C38 contacts 292, C38, contacts 391, C40 and contacts 681 to ground.

The first counting chain relay 215 operates and at its contacts 217 prepares a series operating circuit for the first sequence relay 210 for the counting chain, the circuit extending from battery over the first counting chain relay 215, contacts 217, sequence relay 210, contacts 206, C369, and contacts 351 to ground. The sequence relay, however, is inoperative by reason of the shunt imposed by the original operating circuit for the counting chain relay 215.

The control station equipment has at this point initiated transmission of the circuit protective pulses and the local registration thereof

SUB-STATION OPERATION

The aforedescribed circuit operations are effected at the control station without influence on the sub-station equipment. However, with the first energization of the line relays 680 and 1000, the sub-station equipment is immediately conditioned for receipt of an incoming set of signal pulses.

Specifically, line relay 1000 in operating is effective at its contacts 1001 to complete an operating circuit for a receiving relay 835 which extends from battery over the winding of relay 835, contacts 813, 823, 843, C1366 and contacts 1001 to ground. The receiving relay is of the slow-to-release type and remains operated for the period that the incoming set of protective and group selection impulses are received. It should be observed that the pulsing of line relay 1000 intermittently opens and closes the circuit of reset relay 840 at contacts 1002 but said relay, being of the extra-slow-to-release type does not release during regular pulsing, requiring a longer open period, i. e. the reset pulse as explained hereinafter, to be released.

The substation equipment also includes a counting chain unit which is operative to record the signals transmitted over the channel and line relay 1000 is operative in its first energization to complete an energizing circuit for the first counting chain relay 915 which extends from battery over the winding of the first chain relay 915, contacts 912, 907, 902, C1303, contacts 808, contacts 843, contacts 1001 to ground.

The first counting chain relay 915 operates to complete a series operating circuit for the first sequence relay 910 of the counting chain, which circuit extends from battery over the winding of counting chain relay 915, contacts 918, the winding of the sequence relay 910, contacts 909, C1304, contacts 809, contacts 814, C1357, and contacts 1083 to ground. Sequence relay 910 is inoperative by reason of the shunt imposed thereon by the original operating circuit for the counting chain relay 915.

An incoming start relay located at each station is arranged to operate on receipt of an incoming set of impulses to condition the equipment for the duration of the receipt of such set. Counting chain relay 915 in operating is effective at its contacts 916 to complete an operating circuit to the incoming start relay 870 for the substation, the circuit extending from battery over the winding of the start relay 870, C1310, contacts 916, C1309 and contacts 883 to ground. Start relay 870 operates and at its contacts 871 completes an obvious self-holding circuit to ground, and at its contacts 873 interrupts the battery connection to the line conductor 86. The substation equipment is now prepared to receive the impulse series from the control office Summarily, it is noted that the operation of selection key 120 has therefore effected registration of the group, and point selection digits at the control station has effected the operation of the line relays 680 and 1000, has placed the substation in the receiving condition and the control station in the sending condition, has initiated the operation of the impulse pumping arrangement and has signalled the attendant that such operations are proceeding.

As will be hereinafter explained, the equipment at each station in its normal condition is electrically locked in a manner whereby the counting chain relays are operative responsive to receipt of transient pulses, but are ineffective to operate any of the controlled equipment, such as the substation circuit breakers. The counting chains are rendered selectively operative only by the transmission of a given set of key or compensating protective impulses.

It should be noted that in the present embodiment the first three impulses transmitted are compensating protective pulses which, when prefixed to the group selection digit, unlock the equipment to permit response of the counting chain to the active group selection digit.

Referring once more to the equipment at the control office, it will be recalled that with the operation of line relay 680 thereat, contacts 684 were operated to interrupt the operating circuit for the impulse sending relay 665 to thus continue the first pumping cycle. Relay 665 accordingly restores after a brief time period and at its contacts 667 and 668 interrupts the energizing circuit for the line relays 680 and 1000 at the respective stations. Line relay 680 restores and at its contacts 681 interrupts the initial energizing circuit for counting chain relay 215 to remove the heretofore described shunt circuit for the sequence relay 210. Sequence relay 210 now operates in series with the first counting chain relay 215 over the prepared series circuit heretofore described.

Line relay 1000 at the substation is released with line relay 680 and with the opening of the contacts 1001 responsive to release of the line relay 1000, the initial energizing circuit for counting chain relay 915 and the shunt circuit for sequence relay 910 is opened. Sequence relay 910 now operates in series with the first counting chain relay 915 over the prepared circuit heretofore described.

Sequence relay 910 in operating is effective to close its contacts 911 to complete an operating circuit for the receiving control relay 830 for the substation, which circuit extends from battery over the winding of the receiving contact relay 830, conductor 1306, contacts 911, conductor 1305, contacts 838 of the receiving relay to ground. Receiving control relay 830 operates and at its contacts 832 completes an obvious operating circuit for an auxiliary control relay 825.

It is to be noted at this time that the receiving relay 835 is slow-to-release and accordingly remains operated for the duration of the presently received impulses. Additionally, auxiliary receiving control relays 825 and 830 are adapted to be maintained energized by the counting chain sequence relays until the impulses have terminated and group selection has been made. Subsequent to the selection the receiving relays 825, 830 and 835 are restored to terminate the receiving condition of the equipment.

Briefly then, after the break portion of the first impulse is received by the line relays 680 and 1000, a first counting chain relay and a first sequence relay at each of the stations are maintained energized by series operating circuits.

It is apparent that with the restoration of the line relay 680, contacts 684 are reclosed to complete the operating circuit for the impulse sending relay 665. Impulse sending relay 665 once more reoperates, and at its contacts 667 and 668 effects reclosure of the energizing circuit for the line relays 680 and 1000 at the respective stations. Thus, one pumping cycle has been completed and a new cycle started.

As control station line relay 680 reoperates a second time it is effective at its contacts 681 to complete an operating circuit for the second counting chain relay 220, over a circuit extending from battery over the winding of relay 220, contacts 218, contacts 213, contacts 208, contacts 204, C368', contacts 338, C38, contacts 282, C39, contacts 391, C40, and contacts 681 to ground. Counting chain relay 220 operates and at its contacts 223 prepares a series operating circuit for the second sequence relay 205, such series circuit extending from battery over the winding of the second counting chain relay 220, contacts 223, winding of relay 205, contacts 202, C369, and contacts 351 to ground. Sequence relay 205 is prevented from operating, however, by the shunt arrangement effected by the initial operating circuit for the second counting chain relay 220.

A similar circuit operation occurs at the substation with the operation of the line relay 1000, the closing of its contacts 1001 being effective to complete an operating circuit for the second of the counting chain relays thereat, the circuit extending from battery over counting chain relay 920, contacts 917, contacts 913, 907, 902, C1303, contacts 808, 843, C1366 and contacts 1001 to ground. The counting chain relay 920 in operating prepares a circuit for the second sequence relay 905, which circuit extends from battery over counting chain relay 920, contacts 922, sequence relay 905, contacts 904, C1304, contacts 809, 814, C1357, contacts 1083 to ground. The sequence relay, however, is prevented from operating by the shunt imposed thereupon by the initial operating circuit for the second chain relay 920. Summarily then, responsive to the second energization of the series line relays 680 and 1000, the first and second counting chain relays and the first sequence relay at each station have been operated and the second sequence relay at each station is prepared.

As the pumping operation of the arrangement at the dispatch office continues, the line relays 680 and 1000 are released for the second time and line relay 680 at its contacts 681 interrupts the original energizing circuit for the counting chain relay 220 to remove the shunt for sequence relay 205, which immediately energizes in series with the second counting chain relay 220 over the described circuit. Sequence relay 205 at its contacts 206 interrupts the energizing circuit for the first sequence relay 210 and the first counting chain relay 215 to effect the restoration thereof.

The simultaneous release of the line relay 1000 at the substation effects the opening of contacts 1001 and the interruption of the shunt circuit for the second sequence relay 905 to effect the immediate operation thereof in series with the second counting chain relay 920. Sequence relay 905 in operating is effective at its contacts 909 to interrupt the operating circuit for the first sequence relay 910 and the first counting chain relay 915 to effect restoration thereof.

The pumping operation continues and line relay 680 and line relay 1000 are energized a third time. Line relay 680 at the dispatch office is operative at its contacts 681 to complete an operating circuit for the third counting chain relay 225, which extends from battery over the winding of relay 225, contacts 224, contacts 207, contacts 204, C368', contacts 338, C38, contacts 282, C39, contacts 391, C40, and contacts 681 to ground. The third counting chain relay 225 operates and at its contacts 228 prepares an operating circuit for the third sequence relay 200, which extends from battery over the counting chain relay 225, contacts 228, the winding of sequence relay 200, contacts 211, C369 and contacts 351 to ground. The sequence relay is held inoperative, however, by the shunt which is imposed thereon by the initial operating circuit for the counting chain relay 225.

In a similar manner, with the third energization of the line relay 1000 at the substation, the third counting chain relay 925 is operated over a circuit which extends from battery over the winding of counting chain relay 925, contacts 921, contacts 908, contacts 902, C1303, contacts 808, 843, C1366, contacts 1001 to ground. Counting chain relay 925 operates, and at its contacts 928 prepares an operating circuit for the third sequence relay 900 which extends from battery over counting chain relay 925, contacts 928, sequence relay 900, contacts 914, C1304, contacts 809, 814, C1357, and contacts 1083 to ground. Sequence relay 900 is held inoperative by the shunt imposed thereon by the original energizing circuit for the counting chain relay 925.

With the third release of the line relays 680 and 1000 as the pumping action of the arrangement at the control office continues, line relay 680 at its contacts 681 opens the original energizing circuit for the counting chain relay 225 and operation of the third sequence relay 200 is effected. Sequence relay 200 operates and at its contacts 202 interrupts the energizing circuit for the second counting chain relay 220 and the second sequence relay 205, which accordingly restore.

With the operation of the third counting chain relay 225 and the third sequence relay 200, the three compensating protective pulses have been registered at the control station and the counting chain may now be arranged to respond to the group digit which is about to be transmitted. The transfer of the counting chain to receive the group digit is effected by the set of so-called "preliminary protective pulse terminating" relays 300 and 303. Energization of these transfer relays is now effected by the third sequence relay over a circuit which extends from battery over the winding of relay 300, contacts 304, C355, contacts 226', contacts 201, C369, contacts 343, C36, contacts 662 to ground. Preliminary protective relay 300 operates and at its contacts 301 prepares a circuit for auxiliary transfer relay 303, which is now shunted by the operating circuit for the first protective relay 300.

Similarly, with the third release of the line relay 1000 in the substation contacts 1001 are opened to interrupt the shunt circuit for the third sequence relay 900 to thereby effect the operation thereof in series with the third counting chain relay 925. Sequence relay 900 at its contacts 904 is operative to interrupt the holding circuit for the second sequence relay 905 and the second counting chain relay 920 to effect restoration thereof.

Sequence relay 900 and counting chain relay 925 in operating are also effective at their contacts to close an operating circuit for a preliminary protective pulse terminating relay 850 thereat which in operating unlocks the equipment by conditioning the counting chain system for registration of the group selection digit about to be received. The operating circuit extends over battery winding of relay 850, contacts 853, C1314, contacts 926, contacts 904', C1304, contacts 809, 814, C1357 and contacts 1083 to ground. Relay 850 in operating is effective at its contacts 851 to prepare a series operating circuit for an auxiliary protective relay 855 which is inoperative at the present time by reason of the shunt imposed by the original operating circuit for the protective relay 850. Summarily, with the third release of the line relay, the third counting chain and third sequence relays at each station are operated and the preliminary protective pulse terminating relays thereat are operated to condition the equipment for receipt of the functional impulses.

As the pumping operation continues, the relay 680 and line relay 1000 at the respective stations are operated a fourth time and line relay 680 at its contacts 681 effects the re-operation of the first counting chain relay 215 over a circuit extending from battery, first counting chain relay 215, C356, contacts 306, C359, contacts 229, contacts 203, C368', contacts 338, C38, contacts 282, C39, contacts 391, C40 and contacts 681 to ground. Counting chain relay 215 operates and prepares a series operating circuit with the first sequence relay 210 in the manner heretofore described. Sequence relay 210, however, is maintained inoperative at the present time by reason of the shunt imposed thereon by the operating circuit of the counting chain relay 215.

In a similar manner, the operation of the line relay 1000 at the substation is effective to close contacts 1001 to complete a circuit for again operating the first counting chain relay 915, the circuit extending from battery over the winding of counting chain relay 915, C1307, contacts 859', C1312, contacts 927, contacts 903, C1303, contacts 808, 843, C1366, and contacts 1001 to ground. The first counting chain relay 215 in operating prepares a series operating circuit with the first sequence relay 910 as heretofore described, which is ineffective at the present time by reason of the shunt imposed thereupon by the completed operating circuit for the counting chain relay 915.

As the impulse pumping continues to effect the fourth release of the respective line relays 680 and 1000, the control station line relay 680 at its contacts 681 opens the shunt circuit for the first sequence relay 210 to effect operation thereof. Sequence relay 210 operates and at its contacts 211 opens the energizing circuit for the third counting chain relay 225 and the third sequence relay 200, which responsively restore. Sequence relay 200 and counting chain relay 225 in releasing interrupt the shunt circuit for the second protective relay 303 and protection relay 303 thereupon operates over the series circuit prepared by associated protective relay 300.

In a similar manner, as the line relay 1000 is deenergized for the fourth time at the substation, contacts 1001 are open to effect removal of the shunt on the first sequence relay 910, which relay accordingly operates and at its contacts 914 opens the holding circuit for the third counting chain relay 925 and the third sequence relay 900 to restore same. Sequence relay 900 and counting chain relay 925 at their contacts 926 and 903 interrupt the shunt circuit for the protective relay 855 to effect the operation of the two protective relays 850 and 855 in series over an obvious circuit.

As the control station continues the impulse transmission, line relays 680 and 1000, respectively, are operated for the fifth time, and line relay 1000 effects the completion of a circuit for the second counting chain relay 920 which operates and prepares a series operating circuit for its associated sequence relay 905 in the manner heretofore described. Control station line relay 680 at its contacts 681 completes an operating circuit for the second counting chain relay 220 which extends from battery over the counting chain relay 220, contacts 218, 212, 208, 204, C368', contacts 338, C38, contacts 282, C39, contacts 391, C40, and contacts 681 to ground. The second counting chain relay 220 operates and at its contacts 222 completes an operating circuit for the group stop relay 670, which circuit was previously prepared in the registration of the group selection digit "2" by the operation of selection key 120.

Group stop relay 670, as its name indicates, is arranged to terminate the operation of the pumping arrangement when the number of impulses corresponding to the registered group digit have been transmitted. Inasmuch as the equipment has been unlocked by the three compensation pulses and the registered group digit 2 has been transmitted, the group stop relay 670 operates over a circuit which extends from battery over the winding of relay 670, contacts 672, C19, contacts 323, C18, contacts 716, contacts 727, C7, contacts 222, 226, 231, 236, 241, 246, 251, 256, 261, C364, contacts 302, contacts 372 and contacts 331 to ground. Group stop relay 670 locks up over an obvious self-holding circuit which extends over contacts 671 to ground. Group stop relay 670 at its contacts 674 also opens one of the energizing circuits for the sending control relay 360.

As the line relay 680 now restores for the fifth time, it is effective at its contacts 683 to open the second holding circuit for the sending control relay 360, thus effecting release thereof to terminate the impulse transmission. Specifically, sending control relay 360 at its contacts 363 opens the operating circuit for impulse sending relay 665 and the relay is restored to end the transmission of impulses for the present. Sending control relay 360 at its contacts 361 opens the operating circuits for the sending control relays 350 and 340 to effect the release thereof. Sending control relay 350 restores, and at its contacts 351 interrupts the holding circuit for the second counting chain relay 220 and the second sequence relay 205 to restore same. Relay 340, being of the slow-to-release type, holds the circuit to ground through contacts 343 open for a time period which is sufficient to permit relays 220 and 205 to release.

Referring now to the equipment at the substation, with the fifth and final release of the line relay 1000, the second sequence relay 905 operates in series with the counting chain relay 920 over the prepared series circuit. Further, in response to the termination of the impulse transmitting operations at the control station, the line relay 1000 will be maintained inoperative for a comparatively long period of time, and the energizing circuit for the receiving relay 835 will be interrupted by open contacts 1001 for an interval of time which is sufficient to effect the restoration thereof.

It is evident that a group selection should now be made which corresponds to the value of the group digit received. Receiving relay 835 in restoring is accordingly effective at its contacts 837 and its contacts 839' to complete an operating circuit for group selection control relays 1130 and 1140, which circuit extends from battery over the respective windings of the relays 1130 and 1140, C1349, contacts 1071, 1061, C1364, contacts 857, 839', 833, C1355, contacts 1035, C1360, contacts 837 to ground. The group selection control relays 1130 and 1140 operate and lock themselves to ground over the contacts 1136, C1350, contacts 1076, C1353, contacts 874. Operation of the group selection control relay 1130 in turn effects the operation of group selection relays 1170 and 1180, which in their operation represent the receipt of a group selection digit for the second group. The energizing circuit extends from battery to windings of the respective group selection relays 1170 and 1180, contacts 1132, C1328, contacts 923, 929', 934, 939, 949, 954, 959, 964, C1311, contacts 852 and 827 to ground, it being apparent therefrom that the operated one of the counting chain relays is effective to determine the group selection relay to be operated.

Group selection relays 1170 and 1180 operate, and relay 1170 at its contacts 1176 completes an operating circuit for the group code relay 1080, which circuit extends from battery over the winding of relay 1080, C1348, contacts 1176, contacts 1132, the counting chain relay contacts 923, 929', 934, 939, 944, 949, 954, 959, 964, C1311, contacts 852 and contacts 827 to ground.

It is important, of course, that the selected group be maintained energized for the final selection period, but it is also necessary to have a free counting chain system for translating the further supervisory signals which are used to accomplish point selection and, accordingly, a group code relay 1080 is provided for locking up the selected group relays. Group code relay 1080 now operates and at its contacts 1082 completes an obvious self-holding circuit and the desired holding circuit for the group selection relays 1170 and 1180. Group code relay 1080, at its contacts 1083, also opens the series holding circuit of the second counting chain relay 920 and the second sequence relay 905, which are responsively restored, whereby the counting chain is freed for further use. Sequence relay 905 in restoring is operative at its contacts 906 to effect the restoration of the receiving control relay 830. Receiving control relay 830 restores and at its contacts 832 effects the restoration of its auxiliary relay 825.

GROUP CHECK-BACK TRANSMISSION

As previously pointed out, the serious nature of the consequences which result from improper operation of the equipment necessitates the provision of many extra safeguards. One of these safeguards comprises the transmission of a "check-back" signal to the control station, which is indicative of the group actually selected. Conditioning of the substation for such transmission is now initiated by the restoration of receiving control relay 825 which, at its contacts 826, completes an operating circuit for the sending control relay 820. The operating circuit extends from battery over relay 820, contacts 826, C1358, contacts 1081, 1073, 1063 to ground.

Sending control relay 820 operates and at its contacts 822 extends its operating ground to energize the sending relay 1010 over C1365, contacts 1004, C1369, contacts 846, C1368 and the winding of the relay 1010 to battery. Sending control relay 820 at its contacts 821 also effects the operation of the sending drive relays 815 and 810. The substation has now been converted from the receiving to the transmitting condition to initiate the check-back operation.

Sending relay 1010 operates and at its contacts 1013 and 1015 completes an operating circuit for the line relays 680 and 1000, the operating circuit for relay 1000 extending from positive battery through resistor 1013, over contacts 1013, rectifier 1006, line relay 1000, resistance 1007, contacts 1015, and through resistor 1015' to negative battery; the operating circuit for line relay 680 at the control office extending from positive battery through resistor 1013' over contacts 1013, line C86, rectifier 664, line relay 680, contacts 666, line C85, contacts 1015 and through resistor 1015' to negative battery.

Substation line relay 1000 operates and at its contacts 1004 interrupts the operating circuit for the impulse sending relay 1010 and at its contacts 1003 completes a holding circuit for sending control relay 820, which extends from battery over the winding of relay 820, contacts 822, C1365, contacts 1003 to ground.

Line relay 1000 at its contacts 1001 also completes an operating circuit for the first relay of the counting chain which extends from battery over counting chain relay 915, contacts 912, 907, 902, C1303, contacts 808, contacts 843, C1366 and contacts 1001 to ground. The counting chain relay 915 operates and prepares a series operating circuit for the first sequence relay 910 in a manner heretofore described, which relay is inoperative by reason of the shunt imposed thereupon by the completed operating circuit for the first counting chain relay 915.

As the group check-back signal is transmitted over the line conductors 85 and 86, the control station equipment must necessarily be placed in the impulse receiving condition and additionally in condition for receiving a check-back signal.

Referring then to the equipment at the control office, it is noted that responsive to receipt of the first energizing impulse from the substation, line relay 680 thereat operates over the loop circuit described, and at its contacts 681, effects the operation of the receiving relay 384 over a circuit extending from battery over the winding of receiving relay 384, contacts 342, contacts 362, C38, contacts 282, C39, contacts 391, C40, contacts 681 to ground. Line relay 680, in operating, is also effective at its contacts 681 to complete an operating circuit for the first counting chain relay 215, which circuit extends from battery over the winding of relay 215, contacts 213, 208, 204, C368', contacts 338, C38, contacts 282, C39, contacts 391, C40, contacts 681 to ground. Counting chain relay 215 operates and prepares a series operating circuit for the first sequence relay 210, which is presently shunted by reason of the completion of the original operating circuit to the counting chain relay 215.

The receiving relay 384 operates, and at its contacts 387, completes an operating circuit to check-back relay 310, which circuit extends from battery through resistor 310' over the winding of relay 310, contacts 387, contacts 324, C24, contacts 614 to ground. Check-back relay 310 is arranged to reset the equipment when the returned check-back code is different than the digit transmitted. Check-back relay 310 operates and locks over an obvious self-holding circuit extending over contacts 313, contacts 324, C24, and contacts 614 to ground.

The dispatch office equipment is now conditioned for receipt of the group check signal which is to be automatically transmitted by the substation equipment. With reference to the equipment thereat, it will be noted that a pumping arrangement, such as the previously described control station arrangement, is now established at the substation by the impulse sending relay 1010 and the line relay 1000. Thus, with each release of relay 1010, the contacts 1013 and 1015 thereof are opened to interrupt the operating circuit for line relay 1000. Line relay 1000 releases and, at its contacts 1004, completes an energizing circuit for sending relay 1010. Sending relay 1010 then operates and, at its contacts 1013 and 1015, reestablishes an operating circuit for line relay 1000; line relay 1000 operates and, at its contacts 1004, interrupts the sending relay 1010 to cause it to restore. As previously pointed out, the operation of this arrangement has been initiated by the operation of the sending control relays thereat and the automatic transmission of impulses will be effected until interrupted by the equipment at the substation.

As the sending relay 1010 releases for the first time, the energizing circuit for the line relays 680 and 1000 are opened, and line relays 680 and 1000 restore. Restoration of the line relay 1000 effects the opening of its contacts 1001 and the removal of the shunt from the first sequence relay 910 to effect operation thereof in series with the first counting chain relay 915. Similarly, at the dispatch office, the release of the line relay 680 effects the opening of contacts 681 and the removal of the shunt circuit from the sequence relay 210. Sequence relay 210 responsively operates in series with first counting chain relay 215 over the circuit prepared thereby. Sequence relay 210 at its contacts 214 completes an operating circuit to the receiving control relay 380, which extends from battery over relay 380, C368, contacts 214, C369', contacts 385 to ground. The receiving control relay 380 operates and at its contacts 382 establishes a self-holding circuit which extends from battery over the winding of the relay 380, C368, sequence relay contacts 204', 209 or 214 (depending on which sequence relay is operated), C369' and contacts 382 to ground. Receiver control relay 380, at its contacts 381, completes an obvious energizing circuit for an auxiliary relay 370.

As the pumping action of the substation arrangement continues, sending relay 1010 effects a second energization of line relays 1000 and 680. Line relay 1000 operates and at its contacts 1001 completes an operating circuit for the second relay of the counting chain, which extends from battery over relay 920, contacts 917, 913, 907, 902, C1303, contacts 808, 843, C1366, contacts 1001 to ground. Counting chain relay 920 operates and at its contacts 922 prepares a series operating circuit for the second sequence relay 905, which is presently held inoperative by reason of the shunt imposed thereacross by the initial operating circuit for the counting chain relay 920. The series operating circuit extends from battery over the winding of relay 920, contacts 922, sequence relay winding 905, contacts 904, C1304, contacts 809, and contacts 816 to ground.

Counting chain relay 920 at its contacts 923 completes an operating circuit for the group check relay 1070, which circuit extends from battery over the winding of group check relay 1070, contacts 1052, C1356, contacts 881, contacts 828, contacts 852, C1311, contacts 964, 959, 954, 949, 944, 939, 934, 929', 923, C1328, contacts 1132, 1176, C1348 and contacts 1082 to ground. The group check relay is operative to terminate the check-back signal transmission at the proper time, and it is noted that the time of operation of the group check relay is determined by the particular group signal which has been registered on the group selection relays. In the present example, group 2 has been registered, and therefore group selection relay 1170 at this time effects operation of group check relay 1070 to terminate impulse transmission after the sending of two impulses. Group check relay 1070 operates and at its contacts 1075 completes a self-holding circuit which extends over C1353 and contacts 874 to ground. Group check relay 1070 at its contacts 1076 interrupts the holding circuit for the group selection control relays 1139 and 1140, which responsively release.

The second operation of the line relay 680 at the control station responsive to the incoming check-back signal effects the closure of contacts 681 and the operation of the second counting chain relay 220 over a circuit which extends from battery, the winding of relay 220, contacts 218, 212, 208, 204, C368', contacts 338, C38, contacts 282, C39, contacts 391, C40, contacts 681 to ground. Counting chain relay 220 operates and at its contacts 223 prepares a series operating circuit for the second sequence relay 205, which extends from battery over the winding of the second counting chain relay 220, contacts 223, winding of sequence relay 205, contacts 202, C369, contacts 343, C36, contacts 662 to ground. The second sequence relay 205 is presently held inoperative by the shunt which is imposed thereupon by the initial operating circuit for the counting chain relay 220.

As the line relay 1000 and line relay 680 are released for a second time, line relay 1000 at its contacts 1001 interrupts the shunt circuit for the second sequence relay 905, which accordingly operates over the prepared circuit in series with the second counting chain relay 920. Sequence relay 905 in operating is effective at its contacts 909 to open the series holding circuit for the sequence relay 910 and the first counting chain relay 915 to effect the restoration thereof. The group check relay 1070, having operated during the previous organization of the line relay 1000 has opened one of the energizing circuits for the sending control relay 820 to prepare the release thereof with the following restoration of the line relay 1000, such interruption being accomplished by the opening of its contacts 1073. As the line relay 1000 now restores, contacts 1003 are opened and the second holding circuit for the sending control relay 820 is interrupted.

Sending control relay 820 releases and at its contacts 821 interrupts the operating circuits for the sending drive relays 810 and 815, respectively. Relay 815 releases and at its contacts 816 interrupts the holding circuit for the second sequence relay 905 and the second counting chain relay 920 to effect the restoration thereof. Relay 810 is of the slow-to-release type and holds its contacts 814 open for a time period sufficient to permit relays 905 and 920 to release. The transmission of pulses by the relay pumping arrangement at the substation is thus terminated after the transmission of a coded signal of two digits which is indicative of the particular group selected by the substation equipment.

With the second release of the line relay 680 at the control office responsive to the receipt of the check-back signal, the shunt is removed from the series circuit for the second counting chain relay 220 and the second sequence relay 205 to permit the series operation thereof over the prepared circuit. Sequence relay 205 is operative at its contacts 206 to interrupt the holding circuits for the first counting chain relay 215 and the first sequence relay 210 to effect the restoration thereof.

The prolonged release of line relay 680 as the result of the termination of the impulse transmission by the substation effects the restoration of the slow-to-release receiving relay 384 and the comparison of the transmitted group signal and the check-back group signals is effected. Assuming first that the proper check-back signal is received and relay 384 is released following termination of the impulses, contacts 386 are closed to complete operating circuits for the group selection control relays 550 and 560, the energizing circuit therefor extending from battery over the windings of the relays 550 and 560 over C56, contacts 656, contacts 646, C27, contacts 304', contacts 383, and contacts 386 to ground.

Group selection control relay 550, in operating, is effective at its contacts 552 to complete an operating circuit for the group selection relays 420 and 430 over a circuit which extends from battery over the windings of relays 420 and 430, C90, contacts 552, C7, contacts 222, 226, 231, 236, 241, 246, 251, 256, 261, C364, contacts 302 and contacts 371 to ground.

Group selector control relay 550, at its contacts 555, completes a shunt circuit for check-back relay 310 to effect the release thereof, the shunt circuit extending from battery over the 500 ohm resistance 310', C50, contacts 555, C57, C19, contacts 323, C18, contacts 716, 727, C7, contacts 222, 226, 231, 236, 241, 246, 251, 256, 261, C364, contacts 302 and contacts 371 to ground. Check-back relay 310 accordingly releases.

Group selection relay 430 operates and at its contacts 431 completes an operating circuit for group code relay 660 by extending its operating ground which appears on C90 over contacts 431, C54 to the winding of group code relay 660 and battery. Group code relay 660 operates and at its contacts 661 completes a self-holding circuit and a holding circuit for group selection relays 420 and 430. Group code relay 660 at its contacts 662 interrupts the holding circuit for the operated counting chain relay 220 and the operated sequence relay 205 which release. Relay 205 at its contacts 209 interrupts the holding circuit for the receiving control relay 380 to effect the restoration thereof.

Receiving control relay 380 releases and at its contacts 381 effects the release of auxiliary control relay 370. Receiving control relay 380 is also effective at its contacts 383 to interrupt the holding circuit for the group selection control relays 550 and 560 to effect the restoration thereof. Auxiliary control relay 370 restores and at its contacts 374 effects the operation of sending control relay 360.

In the event that a check-back digit other than the digit "two" is received by the control station, the counting chain will advance to a relay other than relay 220 and the aforedescribed operations will not be effected. For example, supposing digit "one" instead of digit "two" is returned, the counting chain will advance to the first relay and following termination of the impulse counting chain, relay 215 will be in the operated condition. As receiving relay 384 restores, the group selection relays 550 and 560 are responsively operated as described. Group selection relay 550 prepares the circuit for shunting the check-back relay 310, but such circuit is not completed in that the second counting chain relay is inoperative and its contacts 222 are held open. The circuit completed by contacts 216 moreover is interrupted by the open contacts 717 of the de-energized group start relay 715 and consequently the check-back relay 311 remains operated.

Thus, as the equipment operates as described above to eventually restore auxiliary control relay 370 and close contacts 374, the circuit to the sending relay for initiating the transmission of the point selection digit will be interrupted by the open contacts 311 of the check-back relay 310. In addition to preventing operation of the sending control relay 360 to send the point selection digit, check-back relay 310 at its contacts 312 completes an operating circuit to reset relay 600, which circuit extends from battery over the reset relay winding, contacts 608, C29', contacts 312, 374, C33, contacts 663, 654, and 644 to ground. Reset relay 600 operates in the manner described hereinafter to restore both stations to the normal condition and to so inform the operator.

It is seen from the foregoing that unless the same sequential relay of the group start relays and the sequential counting chain relays are operated following receipt of the check-back signal, the equipment will be restored.

Summarily then, at this point it will be noted that if the group check signal transmitted by the substation is correct, the equipment at the dispatch station will accept the group check code and having determined the accuracy of the signal, will prepare to transmit the point selection code "2" which was previously established as a result of the operation of the selector key 120.

TRANSMISSION OF POINT SELECTION CODE

In the event of agreement of the check-back signal, the selection of the second point in the second group is now accomplished by the transmission of the informing point selection digit "2". Sending control relay 360 is operated over the circuit extending from battery over the winding of the control relay 360, contacts 311, contacts 374, C33, contacts 663, 654, 644 to ground. Sending control relay 360 operates and extends its operating ground to the impulse sending relay 665, the energizing circuit extending over contacts 363, C35, contacts 684, contacts 604 and the winding of relay 665 to battery. The control office is now prepared to transmit the point selection code to the substation much in the manner that the group selection code was transmitted, with the exception that the code at this time is not preceded by the protective impulse series.

Sending control relay 360 at its contacts 361 completes obvious circuits for the sending drive relays 350 and 340.

The control station impulse pumping arrangement is once more energized by the sending control relay 360 at its contacts 363 and line relays 680 and 1000 are energized to effect the first impulse of the point selection code. Line relay 680 is operative at its contacts 681 to complete the aforedescribed circuit to the first counting chain relay 215. Counting chain relay 215 operates in turn, and prepares a series circuit for the first sequence relay 210, which is presently shunted by the completed operating circuit for the counting chain relay 215.

At the substation, the first operation of the line relay 1000 in response to the point selection code is effective to close contacts 1001 and thereby effect the operation of the receiving relay 835 and the first counting chain relay 915 over the circuits previously described. The receiving relay 835 operates and once more conditions the equipment for receipt of a series of impulses from the dispatch office. Counting chain relay 915 operates and at its contacts 918 prepares an operating circuit for the first sequence relay 910, which is presently shunted by the completed operating circuit for the counting chain relay 915.

As the control station impulse sending relay 665 effects the first release of the line relays 680 and 1000 for this code, line relay 680 is effective at its contacts 681 to open the shunt circuit for the first sequence relay 210 to thereby effect the operation of relay 210 in series with the first counting chain relay 215. Similarly, at the substation the release of the line relay 1000 is effective to open the contacts 1001 and remove the shunt for the sequence relay 910 to effect the operation of relay 915.

With the second energization of the line relays 680 and 1000, control station line relay 680 is effective at its contacts 681 to complete an operating circuit for the second counting chain relay 220. Counting chain relay 220 operates and at its contacts 223 prepares a series operating circuit for the second sequence relay 205 which is presently held inoperative by reason of the shunt imposed thereupon by the initial operating circuit for the counting chain relay 220.

Inasmuch as the point to be selected is the second point of the second group, only two impulses need to be transmitted and the equipment now prepares to terminate the impulse transmission by operating the point stop relay 640. Counting chain relay 220 at its contacts 222 completes an operating circuit for the point stop relay 640, the circuit therefore extending from battery over the winding of relay 640, contacts 642, C34, contacts 344, contacts 325, C48, contacts 432, C91, contacts 701, contacts 712, C7, contacts 222, contacts 226, contacts 231, 236, 241, 246, 251, 256, 261, C364, contacts 302, contacts 372 and contacts 331 to ground. Point stop relay 640 operates and at its contacts 641 completes an obvious self-holding circuit to ground, and at its contacts 644 opens the energizing circuit for the sending control relay 360.

At the substation the second energization of line relay 1000 effects the closure of contacts 1001 and the completion of an operating circuit to the second counting chain relay 920, which operates and prepares a series circuit for its associated sequence relay 905, which is maintained inoperative by the shunt imposed thereupon by the completed operating circuit of the counting chain relay 920.

As the line relays 680 and 1000 release for the second time, line relay 680 is effective at its contacts 681 to interrupt the shunt circuit for the second sequence relay 205 to effect the operation thereof. Relay 205 operates and at its contacts 206 interrupts the holding circuit for the first counting chain relay 215 and the first sequence relay 210 to effect the restoration thereof. Line relay 680 at its contacts 683 also interrupts the second energizing circuit for the sending control relay 360 and in that the point stop relay 640 has interrupted the first energizing circuit therefor, the relay is restored. Relay 360 at its contacts 361 interrupts the operating circuits for the sending drive relays 350 and 340 which responsively release. Drive relay 350 at its contacts 351 interrupts the holding circuit for the second counting chain relay 220 and the second sequence relay 205 to effect the restoration thereof. As the line relay 1000 is restoring for the second time in the series, the shunt circuit for the second sequence relay 905 is interrupted to effect operation of the sequence relay 905 over a circuit extending from battery over the winding of the second counting chain relay 920, contacts 922, sequence relay 905, contacts 904, C1304, contacts 809, contacts 814, C1357, contacts 1055, contacts 1074, contacts 1063 to ground. Sequence relay 905 operates and at its contacts 909 interrupts the holding circuit for the first counting chain relay 915 and the first sequence relay 910 which are responsively restored.

The registration of the point selection code received is now made at the substation equipment. Inasmuch as the impulse transmission from the control office has been terminated, line relay 1000 will be restored for a period of time which is sufficient to effect restoration of the slow-to-release receiving relay 835.

Relay 835 at its contacts 837 and 839' completes operating circuits to the point selection relays 1110 and 1120, the circuits therefor extending from battery over the windings of the respective relays 1110 and 1120, C1346, contacts 1046, contacts 1072, 1061, C1364, contacts 857, contacts 839', contacts 833, C1355, contacts 1035, C1360, contacts 837 to ground.

The point selection relays 1110 and 1120 operate and point selection relay 1110 at its contacts 1116 completes a holding circuit for the relay pair which extends from battery over the respective windings of the relays 1110 and 1120, contacts 1116, C1345, contacts 1044, C1353 and contacts 874 to ground. Point selection relay 1110 at its contacts 1112 completes an operating circuit for the point selection relay 1215, which is associated with the second point of the second group, the circuit therefor extending from battery over the winding of relay 1215, C1337, contacts 1172, contacts 1112, C1328, contacts 923, 929', 934, 939, 944, 949, 954, 959, 964, C1311, contacts 852 and 827 to ground. The operating ground which is extended to point selection relay 1215 by the point selection relay 1110 is also extended to metering relay 1292 over an obvious path.

POINT CHECK TRANSMISSION

In that the point selection code is now registered, it is necessary to transmit an informative digit to the control station which identifies the point selection digit received. Accordingly, point selection relay 1215 operates and extends its operating ground to point code relay 1050, the operating circuit therefor extending from battery over the winding of the point code relay 1050, C1342, contacts 1218' to the operating ground provided by the group selection relay 1170 and point selection relay 1110. Point code relay 1050 operates and at its contacts 1054 completes a holding circuit for itself, the point selection relay 1215 and metering relay 1292, which holding circuit extends over contacts 1054, 1074 and 1063 to ground. Point code relay 1050 at its contacts 1055 also interrupts the holding circuit for the second counting chain relay 920 and the second sequence relay 905 to effect the restoration thereof.

Sequence relay 905 restores and at its contacts 906 interrupts the holding circuit for the receiving control relay 830 to effect the restoration thereof. Relay 830 restores and at its contacts 832 effects the restoration of associated receiving control relay 825.

The equipment at the sub-station now prepares to transmit the point check code to the control office to indicate to the operator thereat the particular substation point which has been chosen as a result of the code transmission. As the receiving control relay 825 restores, it is effective at its contacts to complete an operating circuit for the sending control relay 820, the circuit therefor extending from battery over the winding of sending control relay 820, contacts 826, C1358, contacts 1051, contacts 1041, contacts 1023 to ground. The sending control relay 820 operates and at its contacts 821 completes operating circuits for the sending drive relays 810 and 815, and at its contacts 822 extends its operating ground over C1365, contacts 1004, contacts 846, C1368 to the sending relay 1010 to once more initiate operation of the impulse pumping arrangement. The sending relay 1010 operates and at its contacts 1013 and 1015 completes the operating circuits for the line relays 680 and 1000.

Substation lines relay 1000 operates and at its contacts 1001 completes the operating circuit to the first relay 915 of the counting chain and at its contacts 1004 interrupts the operating circuit for the sending relay 1010 to effect the restoration thereof. The counting chain relay 915 operates and at its contacts 918 prepares a series circuit for its associated sequence relay 910 which is held inoperative pending removal of the shunt circuit effected by the initial operating circuit for the counting chain relay 915.

At the control station, the line relay 680 operates and at its contacts 681 completes operating circuits for the receiving relay 384 and the first counting chain relay 215. The receiving control relay 384 operates and conditions the control station equipment for receipt of the point check code which is being transmitted by the substation. Relay 384 at its contacts 387 also completes an operating circuit for check-back relay 310 which extends from battery through resistor 310' over the check-back relay 310, contacts 387, 324, C24, contacts 614 to ground. The check-back relay operates and locks itself over contacts 313, contacts 324, C24 and contacts 614 to ground. Counting chain relay 215 operates and prepares a series circuit for its associated sequence relay 210.

As the substation continues its impulse transmission, line relays 680 and 1000 release, and line relay 1000 at its contacts 1001 interrupts the energizing circuit for the first counting chain relay 915 to remove the shunt from the sequence relay 910 to permit the operation thereof. At the control office, the release of the line relay 680 effects the opening of the initial energizing circuit for the first counting chain relay 215 to remove the shunt from the sequence relay 210 and to thereby permit the operation thereof. Sequence relay 210, in operating, is effective at its contacts 214 to complete an energizing circuit for the receiving control relay 380. Receiving control relay 380 operates and at its contacts 381 closes an operating circuit for an auxiliary relay 370, and at its contacts 382 establishes a holding circuit over the contacts of the operated one of the sequence relays.

As the pumping operation continues, line relays 1000 and 680 are operated a second time, and line relay 1000 at its contacts 1001 completes an operating circuit for the second counting chain relay 920. Counting chain relay 920 operates and at its contacts 922 prepares a series circuit with its associated sequence relay 905 which is presently held inoperative by reason of the shunt temporarily imposed thereon.

In that the check-back signal in this example comprises only two impulses, it is now necessary to operate the point check relay 1040 to initiate termination of the impulses. Counting chain relay 920 at its contacts 923 therefor completes an operating circuit for the point check relay 1040, which extends from battery over the winding of the point check relay 1040, contacts 1053, C1356, contacts 881, contacts 828, contacts 852, C1311, contacts 964, 959, 954, 949, 944, 939, 934, 929', 923, C1328, contacts 1112, contacts 1172, contacts 1218', C1342, contacts 1055, contacts 1074, 1063 to ground. It is noted that operation of the point check relay is determined by the value of the received and registered point selection digit. Thus, if the received digit had been four, the point check relay would not be operated until four impulses had been transmitted for the check code.

Point check relay 1040 operates and at its contacts 1044 interrupts the holding circuit for the point selection control relays 1110 and 1120. The point selection control relays are responsively restored. The point check relay 1040 at its contacts 1041 also interrupts the first of the energizing circuits for the sending control relay 820, which is held operated, however, over a second energizing circuit extending over the contacts of the line relay 1000.

At the control office with the second operation of the line relay 680, contacts 681 are closed to complete an operating circuit for the second counting chain relay 220. Counting chain relay 220 operates and at its contacts 223 prepares an operating circuit for its associated sequence relay 205, which is temporarily held inoperative by the shunt imposed thereon by the completed operating circuit for the counting chain relay 220.

As line relay 1000 releases for the second time, contacts 1001 are opened to interrupt the shunt of the second sequence relay 905. Sequence relay 905 operates, and at its contacts 909 interrupts the operating circuit for the first counting chain relay 915 and the first sequence relay 910 to effect the restoration thereof. Line relay 1000, at its contacts 1003, is also effective to interrupt the second energizing circuit for the sending control relay 820 to effect the restoration thereof, it being apparent that with restoration of the sending control relay 820 the transmission of the point check code is terminated. That is, the sending control relay 820, in restoring, is effective at its contacts 821 to interrupt the energizing circuit for the sending drive relays 810 and 815, respectively, to effect the restoration thereof, and at its contacts 822 to also interrupt the energizing circuit for the pumping arrangement. Sending drive relay 815, in releasing, is effective at its contacts 816 to interrupt the holding circuit for the counting chain relay 920 and the sequence relay 905 to effect the restoration thereof. Relay 810, of the slow-to-release type holds contacts 814 open long enough to permit relays 920 and 905 to release.

At the control office, as the line relay 680 is released for the second time in the point check impulse series, the shunt is removed from the second sequence relay 205 which thereupon operates in series with its associated counting chain relay 220. Relay 205 in operating is effective at its contacts 206 to interrupt the holding circuit for the first sequence relay 210 and the first counting chain relay 215 to effect the restoration thereof.

It is assumed at this point that the check-back signal agrees with the point selection signal transmitted, and as the line relay 680 now remains in the restored position for a prolonged period as a result of the termination of the impulses by the sub-station, sufficient time elapses to permit the restoration of the slow-to-release receiving relay 384 and to initiate the registration of the point check code received for comparison purposes. Receiving relay 384 restores and at its contacts 386 effects the operation of point selection control relays 530 and 540, the circuit therefor extending from battery over the windings of the point selection control relays 530 and 540, C53, contacts 625, contacts 612, contacts 645, C27, contacts 304, contacts 383 and contacts 386 to ground. Point selection control relays 530 and 540 operate and relay 530 at its contacts 535 completes a circuit for shunting check-back relay 310, the shunt circuit extending from battery over the resistance 310, C50, contacts 535, C46, contacts 345, contacts 325, C48, contacts 432, C91, contacts 701, contacts 712, C7, contacts 222, 226, 231, 236, 241, 246, 251, 256, 261, C364, contacts 302 and contacts 371 to ground. The check-back relay 310 responsively releases.

It is apparent from the description of the equipment heretofore that, in the event that a check-back signal other than "two" is received, the equipment is reset to normal. Specifically, a counting chain relay other than relay 220 will be operated and, as a result, the shunting circuit for check-back relay 310, which extends over the point start relay 710, will be interrupted by open contacts 222. The check-back relay will accordingly remain energized, and as the receiving control relay 370 is eventually released, the reset relay 600 will be operated to reset the equipment at both stations. The energizing circuit will, therefore, extend from battery over the winding of the reset relay 600, contacts 604, C29', contacts 312, 374, 314, C26, contacts 635, 616, 629', C51, contacts 519 to ground. It is seen, therefore, that in the event of improper impulse transmission, the equipment is automatically reset.

Continuing with the description of the circuit operation in the event that the transmitted point selection signal and the check-back signal agree, as point selection control relay 530 operates it is effective at its contacts 532 to complete an operating circuit for point selection relay 190, the operating circuit therefor extending from battery over the winding of relay 190, C92, contacts 435, C66, contacts 532, C7, contacts 222, 226, 231, 236, 241, 246, 251, 256, 261, C364, contacts 302, contacts 371 to ground. Point selection relay 190 operates and at its contacts 193 extends its operating ground to the point code relay 630, the circuit therefor extending over contacts 193, conductor 52 and the winding of the point code relay 630 to battery. Point code relay 630 operates and at its contacts 631 locks itself up over the contacts 643 of the point stop relay. The completion of the holding circuit effectively transfers control of the point selection relay 190 to the point code and point stop relays. Point selection relay 190 at its contacts 191 completes an operating circuit for the white selection lamp 116 to indicate to the attendant that point 12 at the substation has been selected. The circuit for the lamp extends from negative battery over one side of the lamp switch 490, C99, the filament of the lamp 116, contacts 191 to C82 and the other side of the lamp switch 490 to positive battery.

With the operation of the point selection relay 190, a telemetering circuit is automatically energized, the circuit therefor extending from positive battery via resistor 1018, over contacts 1011, line relay 1000, contacts 1014, C85, line relay 680, C42, meter 119, contacts 195, C47, contacts 373, 352, 325a, C30, resistor 659, contacts 669, C86, contacts 1012, C1361, contacts 888, 872, 836, 811, C1352, C1343, contacts 1218 to negative lead of telemetering equipment 1293.

Further details of the operation of the telemetering equipment are set forth in the copending application, Serial Number 182,671 which was filed September 1, 1950 by Lemuel R. Breese and assigned to assignee of this invention.

The operation of the point code relay 630 which resulted with the operation of the point selection relay 190, effects the opening of the contacts 632 to effect the release of the second counting chain relay 220 and its associated sequence relay 205. Counting chain relay 220 and sequence relay 205 restore and sequence relay 205 at its contacts 209 interrupts the holding circuit for the receiver control relay 380 to effect the restoration thereof. Relay 380 restores and at its contacts 381 opens the operating circuit for its associated control relay 370, and at its contacts 383 interrupts the operating circuit for the point selection relays 530 and 540, respectively.

The attendant, in receiving the visual signal, is now informed that the desired group and point selection has been made at the substation and that the equipment is prepared for the receipt of the control code.

CLOSE CONTROL

Assuming a "close" operation of the circuit breaker selected at point 12 is desired, the closure of the equipment at such point is effected by operation of the common close key 408 at the control station by the attendant. With closure of the key, an operating circuit is completed for the operation code control relay 510, the circuit therefor extending from battery over the winding of relay 510, C63, contacts 408', C45, contacts 516, 523, C58, contacts 673, 631, and 643 to ground. Code control relay 510 operates and at its contacts 511 extends this operating ground over conductor 44 to the second operation code control relay 620.

As explained by the legend, the operation code control relays 510, 620 and 610 are arranged to send the trip code—3 impulses—or the close code—5 impulses—in accordance with their manner of operation. Relays 510 and 620, when operated in combination as effected by operation of the close key, effect the transmission of the close code of five impulses to the substation. Specifically, control relay 620 operates and at its contacts 621 locks the code control relay 510 and itself to ground independent of the close key 408, the locking circuit extending from battery over the winding of relay 620, contacts 621, conductor 45, contacts 516, 523, C58, contacts 673, 631 and 643 to ground. The locking circuit for relay 510 extends from battery over the winding of 510, contacts 511, 621, C45, contacts 516, 523, C58, contacts 673, 631 and 643 to ground.

Operation code control relay 620 at its contacts 623 completes an operating circuit for the sending control relay 360, which circuit extends from battery over the winding of sending control relay 360, contacts 311, 374, C33, contacts 623, contacts 635, contacts 616, contacts 629', C51, contacts 519 to ground. Sending control relay 360 is now operated to condition the set for automatic transmission of a series of five impulses (the close code) to indicate to the substation that the closing of the equipment at the selected point is desired. Sending control relay 360 at its contacts 363 extends its operating ground over C35, contacts 684, contacts 604 to the impulse sending relay 665 to again initiate operation of the impulse pumping arrangement. Sending control relay 360 at its contacts 361 also completes operating circuits for sending drive relays 350 and 340. Drive relay 350 operates and at its contacts 352 interrupts the circuit for the metering equipment 119.

As the impulse sending relay 665 is operated, it is effective at its contacts 667 and 668 to effect closure of the operating circuits for the line relays 680 and 1000 and to then initiate sending of the close control code.

Relay 680 at the control office operates and at its contacts 681 effects the completion of the operating circuit for the first counting chain relay 215, and at its contacts 684 interrupts the operating circuit for the impulse sending relay 665 to effect the restoration thereof. Counting chain relay 215 operates and at its contacts 217 prepares an operating circuit for its associated sequence relay 210, which is held inoperative pending removal of the shunt created by the completed operating circuit for the counting chain relay 215.

The first energization of the line relay 1000 at the substation responsive to initiation of the close control code transmitted effects the closure of contacts 1001 and the completion of a circuit to the receiving relay 835, which condition the equipment at the substation for the receipt of the close control code. Line relay 1000 at its contacts 1001 also completes an operating circuit to the first counting chain relay 915, which operates and at its contacts 918 prepares an operating circuit for its associated sequence relay 910. Sequence relay 910 remains inoperative at the time pending removal of the shunt created by the initial operating circuit for counting chain relay 915.

As the impulse transmission continues, line relays 680 and 1000, respectively, are released and line relay 680 at its contacts 681 interrupts the shunt circuit for the first sequence relay 210 to effect the operation thereof.

The release of the line relay 1000 at the substation effects removal of the shunt for the first sequence relay 910 to effect the operation thereof. Sequence relay 910 operates and at its contacts 911 completes an operating circuit for the receiving control relay 830. Receiving control relay 830 operates and at its contacts 832 effects an obvious operating circuit for associated receiving relay 825, the relays 825 and 830 in combination further preparing the equipment at the substation, as before, for the receipt of the incoming code.

As the line relays 680 and 1000 are energized for the second time in the code transmission, line relay 680 at its contacts 681 completes an operating circuit for the second counting chain relay 220 which operates, and at its contacts 223 prepares a series operating circuit for its associated sequence relay 205. Sequence relay 205, however, remains inoperative awaiting removal of the shunt imposed thereon by the completed operating circuit for the counting chain relay 220. At the substation, the second operation of the line relay 1000 effects the closure of its contacts 1001 to complete an operating circuit for the second counting chain relay 920, which operates and at its contacts 922 prepares an operating circuit for its associated sequence relay 905. Sequence relay 905 is held inoperative by the completed operating circuit for the counting chain relay 920.

Line relays 680 and 1000 are deenergized for the second time in the code impulse transmission and line relay 680 at its contacts 681 removes the shunt for the second sequence relay 205 to effect the operation thereof in series with the counting chain relay 220. The sequence relay 205 operates and at its contacts 206 interrupts the holding circuit for the sequence relay 210 and the first counting chain relay 215 to effect the restoration thereof. At the substation, the second release of the line relay 1000 effects the opening of its contacts 1001 to remove the shunt from the second sequence relay 905 to effect the operation thereof. The sequence relay 905 operates over a circuit extending from battery over the winding of the counting chain relay 920, contacts 922, the winding of sequence relay 905, contacts 904, C1304, contacts 809, contacts 814, C1357, contacts 1031, contacts 1042, contacts 1023 to ground. Sequence relay 905 operates and at its contacts 909 interrupts the holding circuit for the first sequence relay 910 and the first counting chain relay 915 to effect the restoration thereof.

As the pumping operation continues, line relays 680 and 1000 operate for the third time and line relay 680 at its contacts 681 effects the closure of an operating circuit to the third sequence relay 225 which operates and at its contacts 228 prepares an operating circuit to its associated sequence relay 200, which is held inoperative at the present time by the shunt circuit imposed thereupon by the completed operating circuit for the counting chain relay 225. At the substation, the operation of the line relay 100 for the third time effects closure of contacts 1001 and the operation of the third counting chain relay 925. Counting chain relay 925 operates and at its contacts 928 prepares an operating circuit for its associated sequence relay 900 which is maintained inoperative by the shunt circuit imposed thereupon by the completed operating circuit to the counting chain relay 925.

The third release of the line relay 680 effects removal of the shunt for the third sequence relay 200 which operates and at its contacts 202 interrupts the holding circuit for the second sequence relay 205 and the second counting chain relay 220 to effect the restoration thereof. Similarly, at the substation the restoration of line relay 1000 effects the opening of its contacts 1001 and removal of the shunt from the third sequence relay 900 to effect the operation thereof. Sequence relay 900 in operating is effective at its contacts 904 to interrupt the operating circuit for the second sequence relay 905 and the second counting chain relay 920 to effect the release thereof.

The pumping action of the control station continues to effect the fourth energization of the line relays 680 and 1000. Line relay 680 at its contacts 681 completes an operating circuit for the fourth counting chain relay 230, the circuit therefor extending from battery over the winding of the relay 230, contacts 305, C359, contacts 229, contacts 203, C368', contacts 338, C38, contacts 282, C39, contacts 291, C40, contacts 681 to ground. The fourth counting chain relay 230 operates and at its contacts 233 prepares an operating circuit for its associated sequence relay 210, which is held inoperative at the present time by reason of the shunt imposed thereon by the completed operating circuit for the counting chain relay 230. Similarly, at the substation the energization of the line relay 1000 effects closure of contacts 1001 and the operation of the fourth counting chain relay 930, the circuit extending from battery over the wind of the fourth counting chain relay 930, C1313, contacts 859, C1312, contacts 927, 903, C1303, contacts 808, contacts 843, C1366, contacts 1001 to ground. The fourth counting chain relay 930 operates and at its contacts 932 prepares a series operating circuit for its associated sequence relay 910 which is presently maintained inoperative by reason of the shunt imposed by the completed energizing circuit for the counting chain relay 930. It is apparent that the counting chains do not absorb the first three impulses, as in the initial operation, by reason of the operated condition of the protective relays 855 and 303.

The impulse transmission continues and line relays 680 and 1000 deenergize. Line relay 680 at its contacts 681 removes the shunt from the sequence relay 210 to effect the operation thereof. Sequence relay 210 is operated over a circuit extending from battery over the fourth counting chain relay 230, contacts 233, winding of the sequence relay 210, contacts 206, C369, contacts 351 to ground. Sequence relay 210 at its contacts 211 interrupts the holding circuit for sequence relay 200 and the third counting chain relay 225 to effect the restoration thereof. The line relay 1000 at the substation in releasing for the fourth time effects the removal of the shunt for the sequence relay 910 to effect the operation thereof, the series operating circiut therefor extending from battery over the winding of the fourth counting chain relay 930, contacts 932, winding of the sequence relay 910, contacts 909, C1304, contacts 809, 814, C1357, contacts 1031, 1042, 1023 to ground. Sequence relay 910 operates and at its contacts 914 interrupts the holding circuit for the sequence relay 900 and the third counting chain relay 925 to effect the restoration thereof.

The impulse sending arrangement now effects the fifth energization of the line relays 680 and 1000 and line relay 680 at its contacts 681 completes an operating circuit for the fifth counting chain relay 235. Counting chain relay 235 operates and at its contacts 238 prepares an operating circuit for its associated sequence relay 205 which is maintained inoperative at the present time by reason of the shunt imposed by the completed operating circuit for the counting chain relay 235.

In that the close control code comprises five impulses, the termination of the operation of the automatic transmitting arrangement is now required, and counting chain relay 235 at its contacts 237 therefor completes an operating circuit for the operation code control relay 610, which extends from battery over the winding of the control relay 610, contacts 622, C28, contacts 353, C21, contacts 503, contacts 512, C10, contacts 237, 241, 246, 251, 256, 261, C364, contacts 302, contacts 372, contacts 331 to ground. Code control relay 610 operates and at its contacts 616 opens a point in one of the energizing circuits for the sending control relay 360 to prepare the restoration thereof with the next release of the line relay 680, the sending control relay now being maintained operative over an energizing circuit controlled thereby.

The fifth operation of the line relay 1000 at the substation is effective to close contacts 1001 and thereby complete an operating circuit for the fifth counting chain relay 935, the operating circuit extending from battery over the winding of chain relay 935, contacts 931, contacts 913, 907, 902, C1303, contacts 808, contacts 843, C1366 and contacts 1001 to ground. The counting chain relay 935 operates and at its contacts 937 prepares a series operating circuit for its associated sequence relay 905, which is presently maintained inoperative by reason of the shunt imposed thereon by the initial energizing circuit for the counting chain relay 935.

As the line relays 680 and 1000 restore for the fifth time, line relay 680 at its contacts 681 is effective to interrupt the shunt circuit for the sequence relay 205 which operates and at its contacts 206 interrupts the holding circuit for the first sequence relay 210 and the fourth counting chain relay 230 to effect the restoration thereof. Line relay 680 at its contacts 683 also interrupts the second energizing circuit for the sending control relay 360 to effect the restoration thereof.

Sending relay 360 releases and at its contacts 361 interrupts the operating circuits for the sending drive relays 340 and 350 to thereby terminate the transmission of the close controlling code.

It is to be noted that the sending control relay 340 is slow-to-release to insure that the counting chain locking circuit is maintained open for a sufficient interval to permit the release thereof, the interruption of the counting chain locking circuit being accomplished by the release of the sending driver relay 350 and the opening of its associated contacts 351. The counting chain relay 235 in restoring with interruption of its holding circuit, opens a further point in the holding circuit at its contacts 238, so that upon restoration of the slow-to-release sending drive relay 340, the counting chain relay will not be operated.

With the fifth restoration of the line relay 1000 at the substation, contacts 1001 are opened and the shunt circuit for the sequence relay 905 is removed to effect the operation thereof. Sequence relay 905 operates and at its contacts 909 interrupts the holding circuit for the first sequence relay 910 and the fourth counting chain relay 930 to effect the restoration thereof. As a result of the termination of the transmittal of the control closing code by the control office, the line relay 1000 will be maintained inoperative for a prolonged period and the contacts 1001 will be in the open position. After a brief interval of time the receiving relay 835 for the substation will responsively release, whereby the substation equipment is transferred from the receiving condition and prepared to effect switch closure.

Such operation is accomplished with the release of the receiving relay 835 which at its contacts 839' is effective to complete an operating circuit for the operation control relay 885, the circuit extending from battery over the winding of relay 885, C1354, contacts 1045, contacts 1072, contacts 1061, C1364, contacts 857, contacts 839', contacts 833, C1355, contacts 1035, C1360 and contacts 837 to ground. The operation control relay 855 operates and at its contacts 886 completes an operating circuit for the close relay 1290, the circuit for which extends from battery over the winding of close relay 1290, contacts 1217, C1340, contacts 1103, C1371, contacts 936', contacts 886 to ground. The operated close relay 1290 thereupon effects the closure of the circuit breaker associated with point 12.

Thus, the desired automatic selection and operation is effected in a safe, reliable manner. It is important that the attendant be informed of this closure and the breaker is accordingly equipped with a set of auxiliary switch contacts, such at 1291, which close with operation of the breaker. As the breaker auxiliary switch contacts 1291 are closed, therefore, the substation is conditioned to transmit a close indication code.

CLOSE INDICATION CODE

Specifically, as the breaker auxiliary switch contacts 1291 are operated, the point indicating relay 1235 is operated over a circuit extending from battery, the winding of relay 1235, contacts 1272, 1291 to ground. Simultaneously, with the operation of the control relay 1235, the closure of breaker auxiliary switch contacts 1291 effects the completion of an operating circuit for the indication control relay 970, the circuit extending from battery over the winding of the relay 970, C1335, contacts 1219, 1272, 1291 to ground. Indication control relay 970 is operative to determine the number of impulses to be transmitted in the indication code, it being operative to effect transmission of three impulses in its restored condition and five impulses in its operated condition.

Point indication relay 1235 operates and at its contacts 1238 and 1239' opens the operating circuit for automatic point start relay 1270 to effect the release thereof. A holding circuit for the point indication relay 1235 and the indication control relay 970 is completed upon release of the automatic point start relay 1270, which circuit extends from battery over the windings of the relays, contacts 1271, 1236 to ground.

Indication control relay 970 operates and at its contacts 974 completes an operating circuit for the time delay control relay 1095, the circuit extending from battery over the winding of time delay relay 1095, contacts 1099, C1351, contacts 881, C1351', contacts 937', contacts 974 to ground.

A time delay relay arrangement comprising relays 1095 and 1098 has been introduced into the substation equipment to provide ample time for the breaker to close before releasing the close relay 1290.

Time delay relay 1095 operates and at its contacts 1096 completes an operating circuit for its associated time delay relay 1098. Associated time delay relay 1098 operates and at its contacts 1099 opens the operating circuit for the time delay relay 1095 and at its contacts 1099' connects its winding to the operating ground of the time delay relay 1095.

After a brief time interval has elapsed, time delay relay 1095 is of the extra-slow-to-release type and will release and at its contacts 1097 extends its initial operating ground and the operating ground for time delay relay 1098 to the supervisory code relay 1030. The supervisory code relay 1030 operates and at its contacts 1034 completes a self-holding circuit which extends from battery over the relay 1030, its contacts 1034, C1360, contacts 837 to ground. The holding circuit for the supervisory code relay 1030 is likewise effective for the time delay relay 1098 in an obvious manner.

Supervisory code relay 1030 at its contacts 1035 interrupts the holding circuit for the close control relay 885 and effects the restoration thereof. Supervisory code relay 1030 at its contacts 1031 also interrupts the holding circuit for the second sequence relay 905 and the fifth counting chain relay 935 to effect the release thereof. Sequence relay 905 in releasing effects the opening of its contacts 906 to interrupt the holding circuit for the receiver control relay 830, which releases and at its contacts 832 opens the holding circuit for its associated receiver control relay 825.

The substation equipment is now in condition for effecting transmittal of a close indication code to indicate to the attendant at the dispatch office that the desired circuit closing operation has been effected at the substation.

This transmittal of information is initiated with the restoration of the receiving control relay 825, which is effective at its contacts 826 to complete an operating circuit for the sending control relay 820; the circuit extending from battery over the winding of relay 820, contacts 826, C1358, contacts 1051, contacts 1032, contacts 1042, contacts 1023 to ground. The sending control relay 820 operates in a manner heretofore described to control operation of the sending drive relays 810 and 815 and the completion of the energizing circuit for the sending relay 1010 and the impulse pumping arrangement. The impulse sending relay 1010 operates and at its contacts 1013 and 1015 completes the operating circuits for the line relays 680 and 1000 at the respective stations.

The pumping operation at the substation effects the alternate energization and deenergization of the line relays 680 and 1000 and the sequential operation of the counting chain relays 915 to 935 with their associated sequence relays 900 to 910, inclusive, in the manner heretofore described. That is, with each energization of the line relay, a counting chain relay is operated, and with each release of the line relay 1000 its associated sequence relay is energized. As the fifth counting chain relay 935 is operated with the fifth energization of the line relay 1000, an associated sequence relay 905 is prepared; the sequence relay 905 remaining inoperative pending the removal of the shunt imposed by the completed operating circuit of counting chain relay 935. Counting chain relay 935 operates and at its contacts 938 completes an operating circuit for the supervisory code relay 1020, the operating circuit extending from battery over the winding of relay 1020, contacts 1033, contacts 1021, C1362, contacts 817, C1315, contacts 972, C1326, contacts 938, 944, 949, 954, 959, 964, C1311, contacts 852, contacts 828, 881, C1356, contacts 1053, 1043, C1353, contacts 874 to ground.

Supervisory code relay 1020 operates and at its contacts 1022 completes a holding circuit which extends from battery over the winding of relay 1020, contacts 1033 and contacts 1022 to ground. Relay 1020 at its contacts 1025 extends its operating ground over resistor 1025', C1341, contacts 1219' and contacts 1239, the winding of automatic point start relay 1270, contacts 1237, to battery. Automatic point start relay 1270 operates and at its contacts 1272 locks the point indicating relay 1235 over the auxiliary switch contacts 1291 to ground, and at its contacts 1275' completes a self-holding circuit which extends from battery over contacts 1237, the winding of relay 1270, contacts 1239, resistor 1247, contacts 1275', C1292 and contacts 1107 to ground. Supervision code relay 1020 at its contacts 1023 opens a point in one of the energizing circuits for the sending control relay 820 and the termination of the automatic transmission of the impulses is thereby initiated.

As the line relay 1000 restores for the fifth time, the second energizing circuit for the sending control relay 820 is opened by the contacts 1001, whereupon sending control relay 820 restores and at its contacts 822 interrupts the operating circuit for the impulse sending relay to terminate the further transmission of the impulses. Relay 820 at its contacts 821 also effects the restoration of sending drive relays 810 and 815. Sending drive relay 815 in its restoration, at its contacts 816, effects the interruption of the holding circuit for the operated counting chain relay 935 and the operated sequence 905 to effect the restoration thereof. Relay 812 restores slowly and at its contacts 814 holds the operating circuit open long enough for 935 and 905 to release.

Referring now to the control office and the operation of the equipment thereat responsive to receipt of the close indication code and the consequent five operations of the line relay 680, the first energization of the line relay 680 effects the conditioning of the control office equipment to receive a set of coded impulses from the substation by operating the receiving relay 384 and the first counting chain relay 215. With the first de-energization of the line relay 680, the opening of the contacts 681 effects the operation of the sequence relay 210, the relay 210 operating over a series circuit extending from battery over the winding of the first counting chain relay 215, contacts 217, the winding of the sequence relay 210, contacts 206, C369, contacts 343, C36, contacts 615, contacts 629, C51, contacts 519 to ground. Each of the sequence relays are operated by the ground presently connected to C36 upon removal of its shunt circuit imposed by the operating circuit of its associated counting chain relay. The sequence relay 210 in operating also effects the operation of the receiving control relay 380, which in turn operates 370.

The subsequent energizations and deenergizations of the line relay 680 effect the sequential operation of counting chain relay 220 and its associated sequence relay 205, counting chain relay 225 and its associated sequence relay 200, counting chain relay 230 and its associated sequence relay 210, counting chain relay 235 and its associated sequence relay 205.

Following receipt of the five impulses, the line relay 680 remains in the restored condition. Accordingly, after a brief period of time has elapsed, the receiving relay 384 restores. The details of the telemetering circuit are disclosed in the heretofore mentioned copending application.

Receiving relay 384 restores and at its contacts 386 completes an operating circuit for the supervisory control relay 280, the circuit therefor extending from battery over the winding of the supervisory control relay 280, C43, contacts 611, contacts 645, C27, contacts 304', contacts 383, contacts 386 to ground.

The supervisory control relay 280 operates and at its contacts 281 completes an operating circuit for the auxiliary supervisory control relay 270, the circuit therefor extending from battery over the winding of the relay 270, contacts 228', C78, contacts 184', 196, C80, contacts 281 to ground.

The auxiliary supervisory relay 270 operates and at its contacts 272 completes an obvious self-holding circuit in combination with the contacts 281 to ground. The auxiliary supervisory control relay at its contacts 275 completes an operating circuit for the point indication relay 180, the circuit therefor extending from ground over the winding of the relay 180, contacts 194, C98, contacts 235' and 275 through resistor 278 to battery.

The point indication relay 180 operates and at its contacts 184 completes an operating circuit for the indication agreement relay 515, the circuit therefor extending from battery over the winding of the relay 515, C77, contacts 236', C83, contacts 184, contacts 196, C80, contacts 281 to ground.

Point indication relay 180 at its contacts 183 interrupts the lighting circuit for the green lamp 118 at the control board, which was indicative of the open condition of the circuit breaker on the twelfth point at the substation, and at its contacts 182 completes a lighting circuit for the red lamp 117 at the control board to indicate the closed condition of that circuit breaker at the present time. The lighting circuit for the red lamp extends from negative battery over one side of the energizing switch 490, C99, the filament of the lamp 117, contacts 182, contacts 173, C82, the other side of switch 490 to positive battery.

The indication agreement relay 515 is arranged to initiate reset of the equipment after the code indication has been received and the point indication relay has functioned, and at its contacts 518 now completes an operating circuit for the reset control relay 600, which circuit extends from battery over the winding of the relay 600, contacts 608, C29, contacts 524, contacts 518 to ground. Reset relay 600 operates and at its contacts 602 completes an obvious self-holding circuit which extends from battery over the winding of reset relay 600, contacts 608, contacts 602 to ground. Indication agreement relay 515 at its contacts 516 interrupts the locking circuit for the operation code control relays 510 and 620 which responsively release. Indication agreement relay 515, at its contacts 519, interrupts the holding circuit for the counting chain relay 235 and the associated sequence relay 205 to also effect the restoration thereof, which, in turn, effects release of relays 380 and 370. Operation code control relay 620 in its release is effective to open contacts 622 to interrupt the energizing circuit for the associated operation code control relay 610 which also restores. The operation code control relay 610 at its contacts 611 interrupts the holding circuit for the supervisory control relay 280 to effect the restoration thereof and supervisory control relay 280, in restoring, opens its contacts 281 to effect the release of the auxiliary supervisory relay 270.

The registration of the close indication pulses from the substation is thus completed to inform the attendant, by operation of the lamp 117 associated with the selected circuit breaker, that the operation of the selected circuit breaker has been effected. The equipment at the control office and substation is now automatically reset to its normal condition to prepare the equipment for subsequent control or supervisory operations.

RESET OF EQUIPMENT

Reset relay 600 initiates the reset of the equipment at the dispatch office by effecting the closure of its contacts 603 to operate the impulse sending relay 665 over an obvious circuit and effect the transmission of a reset signal consisting of a single long pulse. The impulse sending relay 665 operates and at its contacts 667 and 668 completes the operating circuits for the line relays 680 and 1000 at the respective stations.

Reset relay 600 holds the impulse sending relay 665 operated, and consequently the line relays 680 and 1000 are energized until the reset operation has been practically completed.

Line relay 680 operates and at its contacts 681 effects the incidental operation of the first counting chain relay 215, the associated sequence relay 210 being held inoperative by the open condition of each of the series energizing circuits at this time, these circuits being held open at contacts 519 of operation code relay 515, contacts 632 of relay 630 and contacts 662 of group code relay 660 at contacts 629 of point check relay 624, and contacts 615 of operation code control relay 610. Line relay 680 at its contacts 681 effects the incidental operation of relay 384 and at its contacts 682 also interrupts the operating circuit of reset relay 390, which being of the extra-slow to release type shortly deenergizes and at its contacts 392 effects the opening of the positive battery supply circuit for the following equipment: reset relay 600, group stop relay 670, group code relay 660, point stop relay 640, point code relay 630, start relays 326 and 322, first counting chain relay 215, indication agreement relay 515, the preliminary impulse relays 300 and 303, point guard relay 791, point group guard relay 794, point start relay 710, group start relay 725, group selection relays 420 and 430, point selection relay 190 and the point selection lamp 116. Reset relay 390, at its contacts 391, releases receiving relay 384. It should be noted that the length of the long reset signal is determined largely by the extra-slow-to-release characteristics of relay 390.

As reset control relay 600 (of the slow-release type) releases as a result of the opening of its potential supply source by the reset relay contacts 392, it is effective at its contacts 603 to interrupt the operating circuit for the impulse sending relay 665. Impulse sending relay 665 and start relay 322 in releasing recomplete an operating circuit for line supervision relay 685, which extends from positive battery through resistor 1018, over contacts 1011, line relay 1000, contacts 1014, line conductor 85, contacts 666, line relay 680, the winding of line supervisory relay 685, C31, contacts 325b, C30, resistor 659, contacts 669, line conductor 86, contacts 1012, C1361, contacts 888 and 873 through resistor 872' to battery, the substation being released simultaneously to effect closure of contacts 873.

Line supervision relay 685 operates to restore supervision for the line, it being effective at its contacts 687 to effect restoration of the associated line supervision relay 690 and at its contacts 686 holds associate relay 695. Relay 690 releases and at its contacts 691 interrupts the energizing circuit for the alarm lamp 415 to extinguish same. The equipment at the dispatch office is now completely restored for possible subsequent operations.

Referring now to the reset operation which occurs at the substation as the line relay 1000 thereat is operated during the long reset pulse under the control of the control station reset equipment, closed contacts 1001 complete an incidental operating circuit for the first counting chain relay 915 in the manner heretofore described. Line relay 1000 at its contacts 1001 also effects the operation of the receiving relay 835 over a circuit extending from battery over the winding of relay 835, contacts 813, 823, 843, C1336, contacts 1001 to ground. Receiving relay 835 operates and at its contacts 837 interrupts the holding circuit for the time delay relay 1098 and supervisory code relay 1030 to effect the restoration thereof. Supervisory code relay 1030 in its release is effective at its contacts 1033 to open the operating circuit for associated supervisory code relay 1020 to effect the restoration thereof.

A brief period of time after the energization of the line relay 1000, and opening of contacts 1002, the reset relay 840 releases and at its contacts 841 completes an operating circuit for an associated time delay relay 800. Time delay relay 800 operates and at its contacts 801 completes an operating circuit for an associated time delay relay 860.

Reset relay 840 releases and at its contacts 842 interrupts the potential supply for the following equipment at the substation to effect the restoration thereof: group code relay 1080, group check relay 1070, point code relay 1050, point check relay 1040, incoming start relay 870, counting chain relay 915, preliminary protective pulse terminating relays 850 and 855, group selection relays 1170 and 1180, point selection relay 1215 and metering relay 1292. At its contacts 843, reset relay 840 releases receiving relay 835.

Point selection relay 1215 releases and at its contacts 1219 interrupts the holding circuit for the indication control relay 970 to effect the restoration thereof. The equipment is now practically restored with the exception of the reset relay and the time delay relays associated therewith. As the reset operation at the control office is completed, operating circuits for the line relays 680 and 1000 are interrupted, as before described, and line relay 1000 restores. Line relay 1000 at its contacts 1002 recompletes an energizing circuit for the reset relay 840, which operates and at its contacts 841 interrupts the energizing circuit for the time delay relay 800. Relay 800, of the extra-slow-to-release type, after an interval restores and interrupts the operating circuit for the time relay 860 which, being of the extra-slow-to-release type, releases after an interval. The equipment at the substation is now reset in its restored condition and prepared for further supervisory operations.

It is apparent from the foregoing that with operation of the close key 408 following selection of a point in the substation, a code comprising five impulses will be transmitted by the control station to effect closing of the circuit breaker unit at the selected point. In the event that the selected unit is already in the closed position, the trip key 406 is operated after selection of the point and a code of three impulses is transmitted by the equipment to effect the tripping of the circuit breaker at that point. Briefly, relay 620 is operative alone to control the sending of three impulses much in the manner that it was operative with relay 510 heretofore to send five impulses for the close code. A detailed description of this operation is not believed necessary at this point, the operation being apparent to those skilled in the art.

SUBSTATION REPORT OF AUTOMATIC CIRCUIT BREAKER OPERATION

Provision is also made for reporting to the dispatcher's office of an automatic trip by an automatic close of a circuit breaker.

With the automatic operation of a circuit breaker to a different position, such as is frequently caused by the occurrence of heavy overloads on the protected lines, it is important that suitable notification be given to the attendant at the control office, so that corrective measures can be taken. In the presently disclosed arrangement, such notification is effected by the transmission of informative coded pulses by the substation to the control station, the equipment thereat being effective to change the lamp indications to show the new position of the device and to operate suitable audio and visual alarm equipment thereat.

Specifically, with restoration of a circuit breaker, the substation equipment is responsively conditioned for automatic impulse transmission, the transmitting equipment being first operative to send a series of "key" or unlocking pulses followed by a set of coded impulses which are representative of the group with which the restored circuit breaker is associated.

The control station, on receipt of the first key pulse, conditions itself for impulse reception and upon registration of the group signal sends back a set of coded check-back impulses which indicate the value of the group signal received and registered. The substation accepts the check-back signal, and upon agreement of the original signal and check-back signal returns a coded signal which is indicative of the point in the group with which the restored circuit breaker is associated. The control station, on receipt of the point signal, effects registration thereof and the return of a check-back signal which indicates the value of the point signal received and registered.

Following receipt of the point check information from the control office and the agreement thereof with the originally transmitted point signal, the equipment at the substation will initiate transmission of a set of indication pulses which inform the attendant that the automatic operation has occurred, such code in the present embodiment comprising a code of three impulses. With receipt thereof, the proper alarm signal at the control office will be operated to indicate to the attendant that an automatic operation has occurred at the substation and the particular position to which that circuit breaker has been operated. Reset of the substation and control office equipment is then initiated by the control station. Inasmuch as the operation of the equipment in the transmission of the protective pulses, group selection pulses, group check pulses, point selection pulses, point check pulses, trip indication, and reset impulses is somewhat similar to that which has been previously described in the portions of the description pertaining to the automatic selective switch operation, the disclosure at this point will be limited to a catalogue of the particular relays which are operated. Operating circuits for the relays not previously operated are traced in detail.

TRIP OF CIRCUIT BREAKER 12

Assuming for purposes of illustration that the circuit breaker associated with the auxiliary switch 12 is automatically operated to its tripped position, thus opening its associated contacts 1291, and that both the dispatcher's office and substation are in the normal restored condition, that is, battery supervision relay 605, reset relay 390, line supervision relays 695 and 685 in the operated condition at the control office, and reset relay 840 and automatic point start relays 1240 to 1270 in the operated position at the substation. As the contacts 1291 are opened, the holding circuit for the point indication relay 1235 is opened to effect the restoration thereof.

Relay 1235 releases and at its contacts 1239 interrupts the energizing circuit for the automatic point start relay 1270 which relay releases to condition the substation equipment for transmittal of the change of indication code to the control office. Relay 1270 releases and at its contacts 1275 completes an operating circuit for the second group start relay 1194.

As previously pointed out, the circuit breaker associated with the twelfth point is identified as being the second point in the second group of ten points. Accordingly, the group selection code for identifying the restored circuit breaker will comprise two impulses. Moreover, the equipment being in its protective stage must be unlocked to effect proper operation thereof by the control pulses and accordingly the group pulses must be preceded by the key impulses which, in the present embodiment, comprise a group of three impulses.

Group start relay 1194 operates and at its contacts 1195 completes an operating circuit for the outgoing start relays 875 and 880, which mark the operations as originating at the substation, the operating circuit extending from battery over the winding of the start relays 875 and 880, contacts 861, C1316, contacts 1195, C1318 and contacts 874' to ground.

Relay 880 operates and at its contacts 888, interrupts the operating circuit for the line supervision relay 685 located at the control office to effect the restoration thereof. Line supervision relay 685 restores and at its contacts 686 opens the energizing circuit of its associated relay 695, which relay, being of the slow-release type holds operated until another energizing circuit is subsequently closed in C22 and contacts 318 to ground as will appear hereinafter. Line supervision relay 685 at its contacts 687 completes an operating circuit to its associated line supervision relay 690 which operates and at its contacts 691 completes an operating circuit for the alarm lamp 415 on the control panel to indicate to the attendant thereat that the system has moved off-normal.

Outgoing start relay 875 at its contacts 877 effects the energization of the sending control relay 820 over a circuit extending from battery over the winding of relay 820, contacts 826, contacts 877, C1359 and contacts 1091 to ground.

The sending control relay 820 operates and at its contacts 821 completes an obvious energizing circuit for the sending drive relays 810 and 815, and at its contacts 822 completes the initial operating circuit for the impulse sending relay 1010 to effect energization of the substation pumping arrangement, the operating circuit therefor extending from battery over the impulse sending relay 1010, C1368, contacts 846, C1369, contacts 1004, C1365, contacts 822, contacts 826, contacts 877, C1359, contacts 1091 to ground.

The impulse sending relay 1010 operates to effect the first protective impulse at its contacts 1013 and 1015 by effecting the closure of the operating circuits for the line relays 680 and 1000. Line relay 1000 at the substation operates and at its contacts 1001 effects the operation of the first counting chain relay 915.

Impulse sending relay 1010 at its contacts 1011 and 1012 further interrupts the operating circuit of the line supervision relay 685 located at the control office.

As the first protective impulse is received at the control station, line relay 680 operates and at its contacts 681 effects the completion of an operating circuit for the receiving relay 384 and for the first counting chain relay 215.

With the operation of the first counting chain relay 215, and at its contacts 219, an operating circuit is completed for the incoming start relay 315, the operating circuit therefor extending from battery over the winding of relay 315, C366, contacts 219, C367, contacts 330 to ground. Start relay 315 operates and at its contacts 316 to 321 inclusive conditions circuits to prepare the equipment for reporting from the substation.

TRANSMISSION OF PROTECTIVE IMPULSES

As the pumping action described heretofore proceeds, the alternate energization and de-energization of the line relays 680 and 1000 is effected. At the substation with the first de-energization of the line relay 1000 after energization, the associated sequence relay 910 is operated in series with the first counting chain relay 915. At the control station, the release of line relay 680 effects operation of the first associated sequence relay 210 in series with the first counting chain relay 215. Upon operation of the sequence relay 210 and the closure of its associated contacts 214, an operating circuit is completed for the receiving control relay 380.

Receiving control relay 380 operates and at its contacts 381 effects completion of an operating circuit to the associated receiving control relay 370, these relays being energized for the duration of the incoming impulses and being operative to restore on completion thereof to terminate the receiving condition of the equipment.

As the pumping action continues, the line relays 680 and 1000 are again energized, and at the substation the line relay 1000 effects the operation of the second counting chain relay 920. Line relay 680 at the control office effects the operation of the second counting chain relay 220.

Line relays 680 and 1000 are again restored. Line relay 1000 at the substation effects the operation of the second sequence relay 905, and the line relay 680 at the control office effects the operation of the second sequence relay 205. Sequence relays 205 and 905 in operating effect, respectively, the release of the first counting chain relay 215 and first sequence relay 210 at the control station and the release of the first counting chain relay 915 and first sequence relay 905 at the substation.

As the line relays 1000 and 680 operate for the third time, line relay 1000 effects the operation of the third counting chain relay 925, and the line relay 680 at the control office effects the operation of the third counting chain relay 225. Counting chain relay 225 at its contacts 229 prepares an operating circuit for the first counting chain relay 215, and counting chain relay 925 at its contacts 927 prepares a circuit for the first counting chain relay 915. It is apparent therefrom that the counting chain has absorbed the protective pulses and is now reconnecting itself for active duty.

With the subsequent release of the line relays 1000 and 680 at the respective stations, the third sequence relays 200 and 900 are operated and are respectively operative to effect the release of the second counting chain relays 220 and 920 and the second sequence relays 205 and 905 at the respective stations.

At this point, three protective impulses have been transmitted by the substation to the control office preparatory to transmission of the functional group selection code digit "two," and the equipment now unlocks to permit registration of the identifying group digit. The unlocking operation is prepared at the substation by the sequence relay 900, which operates and at its contacts 904 completes an operating circuit for the preliminary protective pulse terminating relay 850, the circuit therefor extending from battery over the winding of relay 850, contacts 858, C1314, contacts 926, contacts 904', C1304, contacts 809 and contacts 816 to ground.

Similarly, at the control office the operation of the third sequence relay 200 begins the unlocking of the equipment thereat by the completion of an operating circuit to the preliminary protective pulse terminating relay 300, the circuit therefor extending from battery over the winding of the relay 300, contacts 304, C355, contacts 226', contacts 201, C369, contacts 343, 662 to ground.

TRANSMISSION OF GROUP CODE

As the line relay 1000 at the substation now energizes for the fourth time on the first pulse of the group code, it is effective at its contacts 1001 to complete the energizing circuit for the first counting chain relay 915, which was prepared by the third counting chain relay in its operation. The counting chain is thus operative to, in effect, chase its first three relays.

Line relay 680 similarly effects operation of the first counting chain relay 215 over the circuit prepared by the third counting chain relay 225. It is apparent that the equipment at each station is still locked, for as the equipment now stands, if a sixth pulse were received the first relay of the counting chain would be reenergized.

The unlocking of the equipment is effected with the fourth de-energization of the line relays 680 and 1000, which effects the operation of the first sequence relays 210 and 910, respectively. Sequence relay 210 in operating is effective to restore sequence relay 200 and chain relay 225, which relays at their contacts 201 and 226" remove the shunt from the second preliminary protective pulse terminating relay 303 to effect operation thereof. Relay 303 operates in series with relay 300 and at its contacts 306 prevents further recycling of the first three counting chain relays. Sequence relay 910 similarly effects release of the third counting chain relay 925 and sequence relay 900, as well as the operation of the substation protective relay 855 which opens contacts 859' to prevent recycling of the substation counting chain.

As the fifth energization of line relays 680 and 1000 is effected, the second counting chain relays 220 and 920 are operated. Since the group selection digit is two and this is the second group selection pulse to be transmitted, the equipment now prepares to terminate the impulse transmission by effecting operation of the group stop relay 1090, the circuit extending from battery over the winding of the group stop 1090, contacts 1093, C1320, contacts 869, C1319, contacts 1192, contacts 1197 of the group start relay 1194, C1328, contacts 923, contacts 929', 934, 939, 944, 949, 954, 959, 964, C1311, contacts 852, contacts 828, contacts 882, 886 to ground. Group stop relay 1090 operates and at its contacts 1091 effects the opening of one of the energizing circuits for the sending control relay 820. Relay 820, however, is held operated over a second energizing circuit controlled by line relay 1000. As the line relay 1000 restores for the fifth time, sequence relay 905 operates and at its contacts 909 effects the release of the first counting chain relay 915 and its associated sequence relay 910. Line relay 1000 is also effective at its contacts 1001 to open the second energizing circuit for the sending control relay 820 and to effect the release thereof. The release of sending drive relay 815, the second counting chain relay 920 and the second sequence relay 905, and sending drive relay 810 are effected in order.

Referring now to the dispatcher's office, with the energization of the line relay 680 for the fifth time, the second counting chain relay 220 is operated and prepares a circuit for sequence relay 205. As the line relay 680 is released for the fifth time, sequence relay 205 operates and at its contacts 206 effects the restoration of the first sequence relay 210 and the first counting chain relay 215. With the prolonged restoration of line relay 680 at the control station following termination of the group code transmission, the release of the receiving relay 384 is effected. Receiving relay 384 releases and at its contacts 386 effects the operation of the group selection control relays 550 and 560. Group selection control relays 550 and 560 operate and at their contacts 556 complete a holding circuit which extends from battery over their respective windings, contacts 556, C55, contacts 652, C20, contacts 317 to ground.

Group selection control relays 550 and 560 in operating control the operation of the particular group selection relays which have been selected by the operated one of the counting chain relays, and this effects registration of the received group digit. In the illustrated example, the second counting chain relay 220 is operated and, accordingly, the group selection relays 420 and 430 will be energized with the operation of the group selection control relays 550 and 560.

GROUP CHECK-BACK

The equipment having registered the group digit "two," now automatically transmits information of such registration to the substation. Specifically, group selection relay 430 operates and controls the energization of the group code relay 660. Group code relay 660 operates and completes the holding circuits for itself and the group selection 430 and 420. Group code relay 660 is also effective at its contacts 661 to interrupt the holding circuit for the second sequence relay 205 and the second counting chain relay 220 to effect the restoration thereof. The second sequence relay 205 in releasing effects the deenergization of the receiving control relay 380 which in turn effects the release of its associated relay 370.

As the receiving control relay 370 restores, it is effective at its contacts 374 to complete an operating circuit for the sending control relay 360, which in turn operates and extends its operating ground to the impulse sending relay 665, whereby the control station pumping arrangement is energized. Relay 360 at its contacts 361 also effects the operation of the associated sending drive relays 340 and 350. Thus, the set is once more conditioned to initiate the transmission of impulses, the impulses at this stage indicating the group code number which has been registered by the control office. Line relays 680 and 1000 are operated responsive to the first group check-back impulse and line relay 680 effects the operation of the first control station counting chain relay 215.

At the substation, the operation of the line relay 1000 results in the energization of the receiving relay 835 and the first counting chain relay 915. Inasmuch as the outgoing start relays 875 and 880 are operated at the substation on energization of the receiving relay 835, the check-back relay 865 is prepared for operation over a circuit extending from battery through resistor, over check-back relay 865, contacts 879, 839, 833, C1355, contacts 1035, C1360, and contacts 876 to ground. As the pumping operation continues, the line relays 680 and 1000 are released and the first sequence relay 210 at the control office is operated. Similarly, at the substation, with the release of the line relay 1000, the first sequence relay 910 is operated. With the operation of the first sequence relay 910, receiver control relays 825 and 830 at the substation are also operated which operates check-back relays 865.

With the second energization of the line relays 680 and 1000, the second counting chain relay 220 at the control station and the second counting chain relay 920 at the substation are both operated. Inasmuch as the control station has registered the digit two and is now repeating the digit for check-back purposes, it is necessary to terminate the pumping operation with the second impulse transmission. Such action is accomplished by the operation of the group check relay 650.

It will be remembered that the group selection control relay 550, and the group selection relay 430 have been held operated to indicate that group code digit two was received by the dispatch office. As the transmission of the check-back code of two impulses is effected by the dispatch office, the counting chain thereat advances to the second counting chain relay 220, and the operation of the group check relay 650 is effected over the contacts of the registering group selection relay 430, as well as the counting chain relay 220.

Specifically, the operating circuit for the group check relay 650 extends from battery over the winding of the relay 650, contacts 634, C25, contacts 332, 372, contacts 302, C364, contacts 261, 256, 251, 246, 241, 236, 231, 226, contacts 222, C7, contacts 552, C93, contacts 431, C54, contacts 661 to ground. The group check relay 650 operates and at its contacts 651 locks to ground through resistor 651', over C20 and contacts 317. Relay 650 at its contacts 654 interrupts one of the operating circuits for the sending control relay 360, and at its contacts 652 interrupts the holding circuit for the group selection control relays 550 and 560 to effect the release thereof.

Line relay 680 now releases for the second pulse of the check-back signal and is effective at its contacts 681 to effect the operation of the second sequence relay 205 which operates and at its contacts 206 interrupts the holding circuit for the first counting chain relay 215 and the first sequence relay 210 to effect the release thereof. Line relay 680 also interrupts the second energizing circuit for the sending control relay 360 to effect the de-energization thereof. Sending control relay 360 releases and at its contacts 361 effects the deenergization of the sending drive relays 340 and 350. Sending drive relay 350 at its contacts 351 interrupts the holding circuit for the second counting chain relay 220 and the second sequence relay 205 to effect the restoration thereof. The equipment thus terminates the transmission of impulses with the sending of the group check-back digit two to the substation.

Referring now to the substation equipment, the equipment thereat is operative to compare the incoming check-back signal with the group signal transmitted (in this example, digit two). In the event that the signals agree, with the second energizaion of the line relay 1000, responsive to the check-back code, line relay 1000 effects the operation of the second counting chain relay 920. As the line relay 1000 restores for the second time, the second sequence relay 905 is operated and at its contacts 909 effects the interruption of the holding circuit for the first sequence relay 910 and the first counting chain relay 915 to effect the restoration thereof. After the prolonged restoration of the line relay 1000 following termination of the group check-back code, receiving relay 835 releases and at its contacts 837 completes an operating circuit for the group selection relays 1130 and 1140, the circuit extending from battery over the windings of relays 1130 and 1140, C1349, contacts 1071, contacts 1061, C1364, contacts 857, contacts 839', contacts 833, C1355, contacts 1035, C1360, and contacts 876 to ground. Group selection control relays 1130 and 1140 operate, and group selection control relay 1130 at its contacts 1132 effects the operation of the group selection relays 1170 and 1180, the operating circuit therefor extending from battery over the windings of the respective relays 1170 and 1180, contacts 1132, C1328, contacts 923, 929', 934, 939, 944, 949, 954, 959, 964, C1311, contacts 852, contacts 827 to ground.

Group selection control relay 1130 at its contacts 1135 also completes a shunt circuit for the check-back relay 865 to effect the restoration thereof, the shunt circuit extending from relay 865 over C1317, contacts 1135, C1320, contacts 869, C1319, contacts 1192, contacts 1197, C1328, contacts 923, 929', 934, 939, 944, 949, 954, 959, 964, C1311, contacts 852, contacts 827 to ground. Check-back relay 865 accordingly releases.

It is apparent that if a check-back signal other than was received at this time, contacts 923 wohld be open and the check-back relay 865 wonld not release. The consequence in the event of non-release will be described at a later point. In either event, group selection relay 1170 now operates and at its contacts 1176 extends its operating ground over C1348 to the group code relay 1080 to effect the operation thereof. The group code relay 1080 operates and ats contacts 1083 interrupts the holding circuit for the second sequence relay 905 and the second counting chain relay 920 to effect the restoration thereof. The second sequence relay 905 in releasing at its contacts 906 effects the restoration of the receiving control relay 830, which in turn effects the release of its associated relay 825. Receiving control relay 830 at its contacts 833 also interrupts the holding circuit for the group selection control relays 1130 and 1140 to effect the restoration thereof.

POINT SELECTION CODE TRANSMISSION

As the receiving control relay 825 restores, it is effective at its contacts 826 to complete an operating circuit for the sending control relay 820 to condition the substation equipment for transmission of a point selection code which comprises a set of impulses which is indicative of the point classification for the circuit breaker which has been restored.

The sending control relay 820 operates over a circuit extending from battery over the winding of the relay 820, contacts 826, C1358, contacts 1081 of the group code relay, contacts 1073, 1063 to ground. Sending control relay 820 at its contacts 821 effects the operation of sending drive relays 810 and 815 over obvious circuits and also extends its operating ground to the impulse sending relay 1010 to initiate the operation of the substation impulse pumping arrangement.

Line relays 680 and 1000 are operated to initiate transmission of the point selection code and line relay 1000 at the substation effects the operation of the first counting chain relay 915. Line relay 680 at the control station effects the operation of the receiving relay 384 and the first counting chain relay 215.

As the line relays are released in the first instance by the impulse pumping arrangement, line relay 1000 at the substation effects the operation of the first sequence relay 910. Line relay 680 in releasing effects the operation of the first sequence relay 210 and consequently the receiver control relays 370 and 380 and at the control station.

On the second energization of the line relays 680 and 1000, the line relay 1000 at the substation effects the operation of the second counting chain relay 920. Since the digit to be transmitted only comprises two impulses, the point stop relay 1060 is now operated over a circuit extending from battery over point stop relay 1060, contacts 1065, C1363, contacts 818, 878, C1347, contacts 1175, C1338, contacts 1264 and 1273, C1328, contacts 923, 929', 934, 939, 944, 949, 954, 959, 964, C1311, 852, 828, 882, 866, to ground. Point stop relay 1060 operates and at its contacts 1063 opens a point in one of the energizing circuits for the sending control relay 820.

As the line relay 1000 restores for the second time, it is operative at its contacts 1001 to open the second energizing circuit for the sending control relay 820 to effect the release thereof. The line relay 1000 is also effective to operate the second sequence relay 905 which at its contacts 909 interrupts the holding circuit for the first sequence relay 910 and the first counting chain relay 915 to effect restoration thereof. The sending drive relays 815 and 810 likewise are restored, and as the sending drive relay 815 restores, it is effective at its contacts 816 to release the second counting chain relay 920 and the second sequence relay 905.

It is seen from the foregoing that in the event that the proper check back signal is received, the substation equipment then transmits the proper point code signal. Assuming however that the signals did not check, the check back relay 865, as heretofore explained, will be in the operated position. Accordingly, contacts 866 will be open and as the described substation impulse pumping operation occurs, the chain will run past the second counting chain relay, the absence of ground on the contacts 923 thereof preventing operation of the point code relay 1030. As the pumping continues both chains advance to their tenth relay and with receipt of the eleventh impulse at the substation lockout relay 805 is operated over a circuit extending from battery over the winding of relay 805, C1303, contacts 961, 913, 907, 902, C1303, contacts 808, 843, C1366 and contacts 1331 to ground. The lockout relay 805 operates to lock out the substation as described more fully hereinafter. At the dispatch office, the chain advances to the tenth relay 260 and with receipt of the eleventh impulse a circuit is completed to lockout relay 336 which resets the equipment at both stations in a manner described hereinafter. The circuit for lockout relay 336 extends from battery over the winding of relay 336, C365, contacts 264, contacts 212, 204, C366', contacts 338, C38, contacts 282, C39, contacts 391, C40 and contacts 681 to ground. Thus protection against the transmission of improper code signals is safely effected.

Continuing now with the operation of the equipment at the dispatch office in the event that the check back signal agreed with the transmitted signal, and the substation has transmitted the point selection code of two impulses, with the second energization of the line relays 680 and 1000, the line relay 680 is effective at its contacts 681 to complete an operating circuit for the second counting chain relay 220. On the second release of the line relay 680, the second sequence relay 205 is operated, and at its contacts 206 effects the restoration of the first sequence relay 210 and the first counting chain relay 215.

As the line relay 680 remains restored for a prolonged period of time following termination of the point selection impulses, the receiving relay 384 releases and at its contacts 386 completes an operating circuit for the point selection control relays 530 and 540. Point selection control relays 530 and 540 operate, and relay 530 at its contacts 532 completes an operating circuit for the point selection relay 190.

Point selection relay 190 operates and extends its operating circuit to the point code relay 630 to operate same, which in turn locks itself and the relay 190 over a holding circuit via contacts 631, 653, and 644 to ground. Point selection relay 190 at its contacts 191 effects the illumination of the white supervisory lamp 116 at the attendant's desk to attract the attendant's attention and indicate to him that point 12 is reporting.

Point code relay 630 operates and effects the release of the second counting relay 220 and the second sequence relay 205. As counting chain relay 220 and the sequence relay 205 restore, the restoration of the receiving control relays 380 and 370 are also effected.

POINT CHECK TRANSMISSION

The equipment having registered a point digit of two pulses to identify the circuit breaker 12 that is the second point in the second group, as the operative relay, now transmits a point checkback signal to the substation.

Sending control relay 360 operates with the release of receiving control relay 370 and effects energization of sending drive relays 340 and 350. Additionally, the sending control relay 360 effects the operation of the impulse sending relay 665 and the control station pumping arrangement once more becomes operative. Line relays 680 and 1000 operate on receipt of the first impulse, and line relay 680 effects the operation of the first counting chain relay 215. Line relay 1000 at the substation operates and effects the operation of the receiving relay 835 and the first counting chain relay 915.

As the line relay 680 and 1000 are restored for the first time on the point check-back series, the first sequence relay 210 is operated at the control office, and the first sequence relay 910 and the receiving control relays 825 and 830 are operated at the substation.

As the line relays 680 and 1000 energize for the second time, counting chain relay 220 is operated at the control office. Since only two impulses are required for the point check-back signal in the given illustration, the equipment prepares to terminate pulsing. Point check relay 624 is operated over the circuits prepared by the energized group selection relay 430 the energized point selection control relay 530, and the energized point relay 190, relay 190 in its operation being indicative of the number of point selection impulses originally received by the control office. Specifically, the operating circuit extends from battery over the winding of the point check relay 624, contacts 633, C25, contacts 332, contacts 372, contacts 302, C364, contacts 261, 256, 251, 246, 241, 236, 231, 226, 222, C7, contacts 532, C66 contacts 435, C92, contacts 193, C52, contacts 631, contacts 653 and 644 to ground. Point check relay 624 at its contacts 628 completes a self-holding circuit over contacts 628, C20 and contacts 317 to ground, at its contacts 627 interrupts the holding circuit for the point selection control relays 530 and 540 to effect the restoration thereof, and at its contacts 629' is effective to interrupt a point in one of the energizing circuits for the sending control relay 360.

As the line relay 680 releases for the second time in the series its contacts 681 are opened to interrupt the second energizing circuit for the sending control relay 360 and to effect the restoration thereof, along with sending driver relays 340 and 350. Line relay 680 in its second release also effects the operation of the second sequence relay 205 which, at its contacts 206, interrupts a holding circuit for the first sequence relay 210 and the first counting chain relay 215 to effect the restoration thereof. As the sending drive relay 350 now restores, it is effective at its contacts 351 to interrupt the holding circuit for the second sequence relay 205 and the second counting chain relay 220 to effect the restoration thereof. Accordingly, the sending control equipment at the control office is now in the restored condition.

At the substation the comparison of the check back signal with the transmitted signal is now effected and with the second energization of the line relay 1000 responsive to the incoming checkback signal, receiving relays 830 and 825, checkback relay 865 and the second counting chain relay 920 are operated. As the line relay 1000 restores for the second time in response to the termination of the incoming impulses, the second sequence relay 905 is operated and is effective to restore the first sequence relay 910 and the first counting chain relay 915. After a predetermined period of time has elapsed following the last release of the line relay 1000, the receiving relay 835 restores and at its contacts effects the operation of the point selection relays 1110 and 1120. With the restoration of the receiving relay 835, an operating circuit is completed for the point selection relays 1110 and 1120, the operating circuit extending from battery over the windings of the relays 1110 and 1120, C1346, contacts 1046, contacts 1063, C1364, contacts 857, contacts 839', contacts 833, C1355, contacts 1035, C1360, contacts 876' to ground. Point selection relay 1110 completes a shunt circuit for the check-back relay 865 to effect the restoration thereof, the circuit extending from relay 865 over C1317, contacts 1115, C1344, contacts 819, 878, C1347, contacts 1175, C1338, contacts 1264, 1273, C1328, contacts 923, 929', 934, 939, 944, 949, 954, 959, 964, C1311, contacts 852, contacts 827 to ground. Check back relay 865 releases.

It is apparent from the foregoing that in the event that a check back signal other than two is received at this time (the point selection digit two having been transmitted originally by the substation) contacts 923 would be open and the shunt circuit would not be completed. Check back relay 865 would accordingly be held energized. The effects of such operation will be described at a later point.

In any event whether check back relay 865 is held energized or released, point selection relay 1110 also completes an operating circuit for the point selection relay 1215, the circuit extending from battery over the winding of relay 1215, C1337, contacts 1172, contacts 1112 of the point selection relay 1110, C1328, contacts 923, 929', 934, 939, 944, 949, 954, 959, 964, C1311, contacts 852, contacts 827 to ground.

Point selection relay 1215 operates and at its contacts 1218' extends its operating ground over C1342 to the point code relay 1050 to effect the operation thereof. Point code relay 1050 operates and at its contacts 1054 completes a holding circuit over contacts 1064 to ground. Point selection relay 1215 at its contacts 1218' also extends its operating ground over C1342, contacts 1094, to the supervisory code relay 1030 and to the time delay relay 1098 (via contacts 1097).

Point code relay 1050 operates and at its contacts 1055 interrupts the holding circuit for the second sequence relay 905 and the second counting chain relay 920 to effect the restoration thereof, the sequence relay 905 in restoring effecting the restoration of receiving control relay 830. Receiving control relay 830 restores and at its contacts 833 effects the restoration of the point selection relays 1110 and 1120; at its contacts 832 receiver control relay 825. Accordingly, the receiving equipment at the substation is now restored.

TRANSMISSION OF TRIP INDICATION CODE

The equipment is now conditioned to effect transmission of a group of three impulses to the control office to operate the supervisory equipment thereat to indicate the restored condition of the circuit breaker 12.

As the receiving control relay 825 restores, it is effective at its contacts 826 to effect the operation of the sending control relay 820. Sending control relay 820 operates and effects the operation of the sending drive relays 810 and 815 and the impulse sending relay 1010 and the substation impulse pumping arrangement. As the operation of the line relays 680 and 1000 is effected responsive to the first impulse, the line relay 1000 at the substation effects the operation of the first counting chain relay 915. Line relay 680 at the control office effects the operation of the first counting chain relay 215 and the receiving control relay 384 to condition the set for the receipt of the trip indication code as transmitted by the substation.

With the first restoration of the line relays 680 and 1000, the first sequence relays, 210, at dispatcher's office and 910 at the substation are operated. Additionally, at the control office, receiving control relays 370 and 380, are energized. With the succeeding energization of line relays 680 and 1000 at their respective stations, the second counting chain relays 220 and 920 at dispatcher's office and substation, respectively are operated, and responsive to the second de-energization of the line relays 680 and 1000, the second sequence relays 205 and 905, respectively are energized. Sequence relays 205 and 905 operate and effect the restoration of the first sequence relays 210 and 910 and the first counting chain relays 215 and 915 at the respective stations. As the line relays 680 and 1000 once more energize, the third counting chain relays 225 and 925 at the respective stations are operated. At the substation, the associated supervisory code relay 1020 is operated with the operation of the third counting chain relay, over a circuit which was previously prepared by the supervisory code relay 1030, it being apparent that with the transmission of the third impulse, the trip indication code is completed and impulse transmission should be terminated. Specifically, the operating circuit for relay 1020 extends from battery over the winding of the supervisory code relay 1020, contacts 1033, contacts 1021, C1362, contacts 817, C1315, contacts 971, C1300, contacts 853, C1301, contacts 929, contacts 934, 939, 944, 949, 954, 959, 964, C1311, contacts 852, contacts 828, 882 and 866 to ground.

Supervisory code relay 1020 operates and at its contacts 1025 completes an energizing circuit for the automatic point start relay 1270 to effect the re-operation thereof, the circuit extending from battery over the contacts 1238, the winding of relay 1270, contacts 1239', contacts 1219', C1341, resistor 1025', contacts 1025, C1362, contacts 817, C1315, contacts 971, C1300, contacts 853, C1301, contacts 929, 934, 939, 944, 949, 954, 959, 964, C1311, contacts 852, contacts 828, 882 and 866 to ground. Automatic point start relay 1270 operates and at its contacts 1275' locks itself to ground over a circuit extending from battery over the contacts 1238, the winding of the relay 1270, contacts 1239', resistor 1247, contacts 1275', C1292, contacts 1107 to ground. Relay 1270 in operating at its contacts 1275 interrupts the operating circuit for the group start relay 1194 to effect the release thereof.

Supervisory code relay 1020, in operating, at its contact 1023 interrupts one of the holding circuits for the sending control relay 820. As the line relay 1000 now restores for the third time, the second energizing circuit for the sending control relay 820 is interrupted to effect the restoration thereof. Simultaneously, the third sequence relay 900 is operated to effect release of the second sequence relay 905 and the second counting chain relay 920. The sending control relay 820 in releasing effects the restoration of the sending drive relays 810 and 815, and as the sending drive relay 815 restores, the restoration of the third counting chain relay 925 and the third sequence relay 900 is effected. The transmission of the trip indication code impulses is thus terminated.

It is noted that if the check back point signal did not agree with the transmitted signal, the check back relay 865 being in the operated condition maintains its contacts 866 in the open condition and the energizing circuit for the supervisory code relay 1020 will be interrupted thereat. As a result of the nonoperation of the supervisory code relay the impulsing will continue and both chains will advance to their tenth relay. With receipt of the eleventh impulse lockout relay 805 at the substation operates to lock out the equipment thereat and lockout relay 336 at the control station operates as heretofore described to effect reset of the equipment at both stations.

Continuing with the operation of the equipment at the control office in the event the signals agreed and a trip indication code of three impulses was transmitted, the third counting chain relay 225 is operated with the third energization of the line relay 680, and upon the release of the line relay 680, sequence relay 200 is operated. With the operation of the sequence relay 200, the second counting chain relay 220 and the second sequence relay 205 are restored. As the line relay 680 remains in the de-energized condition for a prolonged period as a result of the termination of the incoming trip indication impulses, the slow-to-release receiving relay 384 is restored. The registration of the trip indication on the control panel is now effected by the equipment, the restoration of the receiving relay effecting the operation of the supervisory control relay 280 over a circuit extending from battery over the winding of the relay 280, C43, contacts 626, contacts 612, contacts 665, contacts 646, C27, contacts 394', contacts 383, contacts 386 to ground.

Supervisory control relay 280 operates at its contacts 281 establishes an operating circuit for its associated supervisory relay 270, the circuit extending from battery over the winding of the auxiliary supervisory control relay 270, contacts 237', C83, contacts 184', contacts 196, C80, contacts 281 to ground. Auxiliary supervisory control relay 270 at contacts 273 completes a circuit for alarm relay 525, the circuit extending from negative battery over relay 525, contacts 273, contacts 327 to ground. Relay 525 operates and at its contacts 526 completes a self locking circuit over contacts 402' of alarm key 402 to ground. Relay 525 also closes a circuit to alarm bell 414 at contacts 528 which causes the alarm bell to sound until the alarm key is operated to open contacts 402' and the holding circuit for relay 525. Auxiliary supervisory control relay 270 at its contacts 274 also completes a shunt circuit for point indication relay 180 to effect the release thereof, the circuit extending from battery over contacts 181, resistance 181', contacts 194, C98, contacts 225' and 274 to ground. In that the circuit breaker 12 at the substation associated with selector key 120 has changed from the closed to the open condition, the indicating lamp at the dispatcher's office must be operated to indicate such change. Such transfer of lamp energization is accomplished with the release of point indication relay 180, which at its contacts 183 closes a lighting circuit for the green lamp 118 to indicate the opened condition of the circuit breaker. Relay 180 at its contacts 182 also effects the extinguishment of the red lamp 117.

With reference now to the flashing alarm system which comprises relays 290, 295 and 297, it will be remembered that with operation of the point selection relay 190, an energizing circuit was prepared at its contacts 192, which circuit is now completed by the operating supervisory relay 270. The circuit extends from battery over relay 170, contacts 192, C97, contacts 271, C49, contacts 316 to ground. Point flasher alarm relay 170 operates and at its contacts 174 completes an operating circuit for the flashing alarm relay 295, the circuit extending from battery over the winding of the flashing alarm relay 295, contacts 299, C79, contacts 174 to ground. Flashing alarm relay 295 operates and at its contacts 296 completes an energizing circuit for the slow-to-release relay 297. Relay 297 operates and at its contacts 298 completes an operating circuit for the associate flasher relay 290. Flashing alarm relay 290 operates and at its contacts 291 completes an operating circuit for the green indication lamp 118 which extends from battery over one side of the switch 490, C99, green lamp 118, contacts 183, contacts 172, C81, contacts 291, C82, over the other side of the switch 490 to ground. Green lamp 118 accordingly illuminates.

As the flashing alarm relay 297 operates, it is also effective at its contacts 299 to open the operating circuit for the first flasher alarm relay 295, which, after a brief interval, releases and at its contacts 296 opens the circuit of the relay 297. After a brief interval, relay 297 releases and at its contacts 298 interrupts the operating circuit for the associate relay 290 which restores to open the energizing circuit for the green indication lamp 118. Relay 297 at its contacts 299 also recompletes the operating circuit for the flasher relay 295 which re-operates and at its contacts 296 re-operates relay 297. Thus, the flash alarm relays 290, 295 and 297 repeatedly cycle to effect closing of the circuit for the green indication lamp 118 to effect a flashing operation thereof. The operator is thus informed that the circuit breaker associated with that position has been automatically tripped. Summarizing then, flasher relay 170 operates to transfer the green indication lamp from steady green to flashing green. Similarly, had the breaker automatically closed instead of automatically opened, relay 180 would have effected illumination of the red point lamp and relay 170 would have transferred the red lamp from steady red to flashing red.

As the point indication relay 180 restores, it is also effective at its contacts 185 to complete an operating circuit for the indication agreement relay 515, the circuit extending from battery over the winding of relay 515, C77, contacts 277, C78, contacts 184', contacts 196, C80, contacts 281 to ground. The indication agreement relay 515 operates and at its contacts 518 completes an operating circuit for the reset relay 600, the circuit extending from battery over the winding of the relay 600, contacts 608, C29, contacts 524 and 518 to ground. Indication agreement relay 515 at its contacts 519 also effects the restoration of the third sequence relay 200 and the third counting chain relay 225. Sequence relay 200 and chain relay 225 restore, and sequence relay 200 at its contacts 204' effects the release of the receiving control relays 380 and 370.

RESET BY DISPATCH OFFICE EQUIPMENT

Reset relay 600 operates and at its contacts 603 completes the operating circuit for the impulse sending relay 665. Impulse sending relay 665 operates and at its contacts 667 and 668 effects a prolonged operation of line relays 680 and 1000. The reset code of one long impulse is thus initiated and the reset operation is effected in the manner previously described.

It will be observed that with the release of the receiving control relay 380, the circuits for the receiving control relay 370 and the supervisory control relay 280 are interrupted to effect the restoration thereof. Receiving control relay 380 at its contacts 383 interrupts the energizing circuit for the supervisory control relay 280 to effect restoration thereof.

As line relay 680 energizes, receiving control relay 384 and the first counting chain relay 215 are energized. However as line relay 680 is maintained operated for a prolonged period responsive to the long reset impulse, reset relay 390 restores and at its contacts 392 interrupts the power supply for the following energized equipment: reset control relay 600, group code relay 660, group check relay 650, point code relay 630, point check relay 624, incoming start relay 315, the first counting chain relay 215, indication agreement relay 515, preliminary protective pulse termination relays 300 and 303, group selection relays 430 and 420, point selection relay 190 and the white selection lamp 115. Reset relay 390 at its contacts 391 releases relay 384.

As the reset relay 600 releases, it interrupts the operating circuit for the impulse sending relay 665, which, in turn, effects the restoration of the line relay 680.

Referring now to the equipment at the substation, it will be remembered that with the operation of the reset relay 600 at the control station, a prolonged reset impulse is transmitted and line relays 680 and 1000 are energized for a prolonged time interval. As a result of such energization of the line relay 1000 at the substation, the holding circuit for the reset relay 840 is interrupted for a period of time sufficient to effect the release thereof. Line relay 1000 at its contacts 1001 also effects the operation of the receiving relay 835 and the first counting chain relay 915. Reset relay 840, in releasing, at its contacts 841 completes an operating circuit for the time delay relay 800 which, in turn, at its contacts operates associated time delay relay 860. Reset relay 840, at its contacts 842, effects the interruption of the power supply to the following energized equipment: supervisory code relays 1020 and 1030, outgoing start relays 875 and 880, time delay relay 1098, group stop relay 1090, group code relay 1080, point stop relay 1060, point code relay 1050, group selection relays 1170 and 1180, point selection relay 1215, metering relay 1292, the preliminary protective pulse terminating relays 850 and 855, and the first counting chain relay 915. Reset relay 840 at its contacts 843 releases relay 835.

As the line relay 1000 is released by the equipment at the dispatch office, reset relay 840 is reoperated and time delay relays 800 and 860 are restored in a cascade manner. The equipment at the substation is, therefore, now once more restored to its normal condition. Following restoration of the substation equipment, the energizing circuit for the line supervisory relay 685 is recompleted and relay 690 releases. The circuit 695 was opened at contacts 318, but, being of the slow to release type, relay 695 does not release but is held through contacts 686 and 693. Line supervision is again in effect. The alarm bell continues to sound and the alarm lamp remains lighted until the alarm key is operated to release relay 525. The green lamp continues to flash until the reset key 404 is operated to open contacts 403 and to release relay 170.

TRANSIENT PROTECTION

The more pertinent features of the present disclosure are concerned with the manner in which safe operation and reliable reporting is accomplished even when the equipment is subjected to the most adverse types of operating conditions and specifically the manner in which foreign electrical disturbances are prevented from effecting false operation of the controlled circuit breaker units or false reporting of sub-station conditions. In that a complete description of the general operation of the control system has been given heretofore, the manner in which the system is operative to accomplish this safeguard may be described with considerable more clarity and brevity at this time, it being believed necessary to describe the operating circuits only in instances where the relay in point has not been previously energized.

Transient pulses are the direct result of adverse atmospheric or installation conditions and accordingly the transients normally received will vary in strength and number in accordance with the particular locality at which the equipment is located. For example, in some general areas the receipt of more than a single transient impulse at a time is very unusual, whereas in other localities as many as five and six impulses may be experienced. Some installations must therefore have a provision for protection against more transients than others and a feature of the disclosed equipment is the flexible manner in which the equipment may be adjusted to the conditions normally experienced in each of the various localities. In the particular embodiment of the invention disclosed herein the equipment is arranged to effect automatic reset of the equipment if three or less transient impulses are received, but adjustment to provide reset with receipt of a larger number of impulses such as 5, 6, 9 etc. is readily accomplished as will become apparent hereinafter.

Another problem which renders the provisions of positive protection against transient impulses somewhat difficult is the inconsistent manner in which the transient impulses may be received. In some instances for example, a single pulse will effect operation of only the line relay at the substation, at other times only the line relay at the control office, and at other times the line relays at both the control office and the substation. The disclosed arrangement is adapted to provide the desired protection in each instance, but since the circuit operations will vary with the nature of the transient impulse received, each case must be individually considered. While the limit of transient pulses ordinarly received is between one and five transient impulses, the reaction of the system to more than this number will also be considered herein.

I. *Single transient pulse*
*(both ends receiving simultaneously)*

Assuming that the equipment at the control office and at the substation are in the normal restored conditions, battery supervision relay 605, reset relay 390, and line supervision relays 695 and 685 at the control station will be energized and reset relay 840 and automatic point start relays 1240 to 1270 at the substation will be energized. Assume now the occurrence of a single transient impulse on the line conductors 85 and 86, and the simultaneous receipt thereof by the substation and the control office, whereby the operation of the line relays 680 and 1000 at the respective stations is effected.

According to the invention, with operation of the line relays at each end of the channel by a transient, the equipment at the control station and the equipment at the substation are adapted to effect independent reset of their own equipment, for on receipt of the first impulse both ends are simultaneously conditioned as receiving stations. It should also be noted at this point that should the transient impulse be imposed for an excessive time interval, the line relay 680 and 1000 will be responsively operated for a prolonged period of time and, in effect, the reset signal of one long pulse is simulated. Accordingly, the reset of the equipment at both ends of the line will be responsively effected thereby.

In the event that the transient impulse simulates the normally transmitted control pulses, line relays 680 and 1000 will be operated to condition their associated stations as receivers. Since each station effects its own reset, the operation thereof will be independently described. Control station line relay 680 at its contacts 681 will effect the operation of the receiving relay 384, and the first counting chain relay 215. Counting chain relay 215 operates and at its contacts 219 completes an operating circuit for incoming start relay 315 such circuit extending from battery over the winding of the relay 315, C366, contacts 219, C367 and contacts 330 to ground. Incoming start relay 315 operates and at its contacts 319 completes an obvious self-holding circuit to ground.

As the transient impulse is terminated the line relay 680 is restored and contacts 681 opens to interrupt the energizing circuit for receiving relay 384. Line relay 680 is also effective at its contacts 681 to remove the shunt from the first sequence relay 210, which operates and at its contacts 214 effects the energization of receiving control relay 380. Relay 380 operates and effects operation of its associated relay 370.

After a brief time interval, the receiving relay 384 restores and at its contacts 386 completes an operating circuit for the lockout relay 336, the operating circuit extending from battery over the winding of relay 336, contacts 305', contacts 383, and contacts 386 to ground. Lockout relay 336 operates and at its contacts 337 completes an obvious self-holding circuit to ground; at its contacts 338 opens the driving circuit for the counting chain relays to prevent subsequent operation thereof. Lockout relay 336 at its contacts 339 completes an energizing circuit for the reset control relay which extends from battery over the winding of the reset control relay 600, contacts 608, C29, contacts 339 to ground. Reset relay 600 operates and at its contacts 603, connects operating ground to the impulse sending relay 665. Impulse sending relay 665 operates, and at its contacts 667 and 668, connects operating potential to the line for energizing the line relays 680 and 1000. Reference must now be made to the operations which have occurred at the substation during this same operating period at the control stations.

As the transient impulse is received at the substation, the line relay 1000 operates and at its contacts effected the operation of receiving relay 835 and the first counting chain relay 915. Counting chain relay 915 operates and at its contacts 916 completes an operating circuit for the incoming start relay 870, the circuit extending from battery over the winding of incoming start relay 870, C1310, contacts 916, C1309, contacts 883 to ground. Incoming start relay 870 operates and at its contacts 873 disconnects operating battery from the line conductors to effect the restoration of the line supervision relay 685 at the control office, in the event that the relay has not been previously released. Line supervision relay 685 restores and at its contacts 687 completes an operating circuit for the alarm relay 690 which closes its contacts 691 to energize the alarm lamp 415. Relay 695 does not release but is held over C22 to ground through contacts 318.

Returning once more to the substation equipment, as the transient impulse is terminated, the substation line relay 1000 restores to effect restoration of receiving relay 835 and removal of the shunt for sequence relay 910 which effects the operation thereof. Sequence relay 910 operates and at its contacts 911 effects the operation of the receiving control relays 830 and 825. A brief interval after the operation of the receiving control relays 825 and 830, receiving relay 835 restores and at its contacts 837 effects the operation of the reset control relay 845, the circuit therefor extending from battery over the winding of the reset control relay 845, contacts 856, contacts 839', contacts 833, C1355, contacts 1035, C1360, contacts 837 to ground. Reset relay 845 operates and at its contacts 848 completes an obvious self-holding circuit to ground, and at its contacts 847 completes an obvious energizing circuit for the impulse sending relay 1010. Impulse sending relay 1010 operates and at its contacts 1013 and 1015 applies operating potential to the line conductors for energizing the line relays 680 and 1000.

Since the aforedescribed responsive operations of the equipment at the control station and substation are accomplished in comparatively equal time intervals, the described operating potentials are simultaneously applied to the line conductors 85 and 86 by the impulse sending relays 665 and 1010. In that positive potential is applied to C86 at both ends and negative potential is applied to C85 at both ends, current will not flow over the loop, but the line relays 680 and 1000 will instead be operated by the potential which is locally applied in each case.

RESET AT DISPATCH OFFICE

Line relay 680 operates and at its contacts 681 reoperates the receiving relay 384 which has released following the prolonged deenergization of line relay 680. Line relay 680 at its contacts 682 interrupts the holding circuit for the reset relay 390, which, after a predetermined interval releases, and at its contacts 392 effects interruption of the battery potential supply for the following energized equipment at the control office to restore same; reset relay 600, first counting chain relay 215, sequence relay 210, receiving control relay 380 lockout relay 336 and incoming start relay 315. At its contacts 391, relay 390 releases relay 384. Relay 380 releases relay 370.

Reset relay 600 restores, and at its contacts 603 opens the holding circuit for the impulse sending relay 665 which restores to interrupt the energizing circuit for line relay 680. Line relay 680 restores and at its contacts 682 completes an operating circuit for the reset relay 390, which operates and at its contacts 392 once more connects operating potential to the control station equipment controlled thereby.

RESET AT THE SUBSTATION

As the line relay 1000 at the substation operates responsive to the locally applied operating potential following termination of the transient, line relay 1000 is effective at its contacts 1002 to interrupt the holding circuit for the reset relay 840 for a time interval which is of sufficient length to effect the restoration thereof. Line relay 1000 at its contacts 1001 completes operating circuits for the receiving relay 835 and the second counting chain relay 920.

Reset relay 840 restores and at its contacts 841 effects the operation of the time delay relays 800 which operates 860; and at its contacts 842 interrupts the power supply for the following operated substation equipment; reset control relay 845, first counting chain relay 915, sequence relay 910, second counting chain relay 920, receiving control relays 830 and incoming start relay 870. At its contacts 843, relay 840 releases relay 835. Relay 830 releases relay 825.

Reset control relay 845 restores and at its contacts 847 interrupts the energizing circuit for the impulse sending relay 1010, which releases and, in turn, effects the restoration of substation line relay 1000.

Line relay 1000 releases and at its contacts 1002 re-completes an energizing circuit for reset relay 840, which operates and at its contacts 841 interrupts the operating circuit for time relay 800 which releases 860; and at its contacts 842 re-applies power to the aforementioned substation equipment which is controlled thereby.

It will be observed that with return of the equipment to normal, line supervision relay 685 reoperates and relay 690 releases, extinguishing the alarm lamp.

SIMULTANEOUS RECEIPT OF TRANSIENT GROUP BY BOTH STATIONS

The inherent structure of the substation and control station equipment is generally such as to prevent response to transients even though the frequency in pulses per second of transients received may vary widely. For instance, transients arriving at a rate of less than five impulses per second will simulate reset control pulses used in the system for reset purposes and will thus automatically effect reset of the equipment at each of the stations. Transient impulses which arrive at a rate in excess of twenty pulses per second moreover will be of such short duration that the counting chain relays will not have sufficient time to respond thereto, and accordingly the transients will provide no operative effect. It is seen therefrom that the equipment is inherently limited in its response to those transients which arrive at a rate which is in the range of approximately five to twenty impulses per second.

Although the receipt of more than one transient impulse at a time which meets these aforedescribed qualifications is more or less infrequent, the reception of a group comprising as many as five and six operative transient impulses has been experienced in certain localities, and it is with the protection of the equipment from groups of transient impulses of this nature that the following description is concerned.

Primarily, it is noted that the operation of the equipment in response to receipt of a group of impulses varies with the particular response characteristics for which the equipment has been adjusted. As previously pointed out, the counting chain at each station may be adjusted to receive a given number of impulses, such as 3, 6, 9 or even 10, prior to unlocking of the equipment thereat so as to register the further received pulses for circuit operating purposes. This range of impulses for which the equipment is maintained locked is called the preliminary impulse range and in the disclosed arrangement, for purposes of simplicity of description, the equipment has been adjusted to provide a preliminary impulse range of three impulses.

In explaining the manner in which the equipment is operative to prevent improper operation of the controlled circuit breakers and improper reporting of substation conditions, the various manners in which the impulses may be received must be individually considered; that is, the operation of the equipment when a transient or group of transients within the preliminary range (1, 2 or 3) are received, the operation of the equipment when transients in a given secondary group (4-13) are received, and operation of the equipment in the event of receipt of more than the secondary group (more than thirteen impulses).

GROUP OF 1-3 TRANSIENTS

The operation of the system when both ends receive a single transient pulse simultaneously has been discussed. Attention now will be given to simultaneous reception of a greater number of transient pulses.

Assuming first that both stations are in the normal restored condition and that two transient impulses are received by both stations. Since each station on simultaneous receipt of transients effects its own restoration, the operation of the equipment at each station may be independently considered. Considering first the receipt by the control station of the two transients, the line relay 680 thereat responds to the transients as if they were the protection pulses transmitted by the substation prior to transmission of a group selection code. The control station therefore energizes in the receiving condition, and, as the transients are received, the counting chain is operated sequentially to eventually effect the energization of the second counting chain relay 220.

Briefly, following termination of the second transient impulse in line conductor 85 and 86, control station line supervision relay 685 will have been released and relay 690, battery supervision relay 205, reset relay 390, counting chain relay 220, sequence relay 205, receiving relay 384, receiving control relays 380 and 370, and incoming start relay 315 will be in the operated condition. Relays 210 and 215 will also be released.

As the control line relay 680 remains in the restored position following termination of the transients, receiving relay 384 releases and at its contacts 386 completes an energizing circuit for the lockout relay 336. Lockout relay 336 operates, and at its contacts 339 completes an operating circuit for the reset control relay 600 which operates to effect the operation of the impulse sending relay 665, line relay 680 and receiving relay 384. Line relay 680 operates and at its contacts 682 interrupts the operating circuit for reset relay 390 for a prolonged period of time, to effect restoration thereof which in turn is operative to interrupt the power supply for the following control station equipment: reset relay 600, counting chain relay 220, sequence relay 205, receiving control relay 380, lockout relay 336, and incoming start relay 315. Relay 390 at its contacts 391 releases relay 384 and relay 380 releases relay 370.

The restoration of the aforedescribed equipment is effected and reset relay 600 in restoring effects restoration of impulse sending relay 665 and line relay 680. Reset relay 390 reenergizes with restoration of line relay 680 and the control station is once more restored to normal.

With reference to the substation equipment, the two transient impulses will be accepted as protective impulses transmitted by the control station and the substation will accordingly energize in the receiving condition in the manner described heretofore. The counting chain will advance to its second relay 920 and a brief period after termination of the second transient impulse, reset relay 840, incoming start relay 870, receiving control relays 830 and 835, second counting chain relay 920, its associated sequence relay 905 will be found energized at the substation.

A predetermined period after restoration of line relay 1000, following termination of the transient impulses, receiving relay 835 will restore to effect operation of the reset control relay 845, which in turn effects operation of the impulse sending relay 1010. Line relay 1000 is reenergized by the operated impulse sending relay 1010. Relay 835 and the third counting chain relay 925 operates.

A brief interval of time after operation of line relay 1000, reset relay 840 releases to interrupt the power supply for reset control relay 845, counting chain relays 920, and 925 sequence relay 905, receiving control relays 830 and incoming start relay 870 to effect the restoration thereof. Relay 840 at its contacts 843 releases relay 835 and relay 830 releases relay 825.

As the reset control relay 845 restores, it is operative to effect the release of the impulse sending relay 1010, which, in turn, releases the line relay 1000. Reset relay 840 reoperates responsive to release of line relay 1000 to prepare portions of the operating circuits for the aforedescribed equipment at the substation, and to effect release of time delay relays 800 and 860.

With restoration of the incoming start relay 870 at the substation and relay 665 at the control station, the control station line supervision relay 685 operates and relay 690 releases to restore normal line supervision. As line supervision is restored, deenergization of the alarm lamp at the attendant's desk is also effected.

With the receipt of a single transient or a group of transients of two or three impulses simultaneously by both the substation and the control station, the equipment at each of these stations will be operative individually to effect reset of its associated equipment in the manner described and the controlled apparatus will be protected against improper operation thereby. In effect the equipment which controls operation of the controlled apparatus is locked behind a barrier to prevent operation thereof by a predetermined group of transient impulses (in this illustration 1, 2 or 3 transients). It is only through the use of a given predetermined number of "key" impulses (3) that access to the equipment may be obtained and the desired selective operation of the controlled apparatus effected.

As previously pointed out the preliminary range of transient impulse protection for the equipment is adjustable to any given number of impulses, and the invention is not to be considered limited to the disclosed arrangement in which the preliminary range is three impulses.

For example, to adjust the disclosed arrangement for protection against a different number of transient impulses it is merely necessary to preceed as follows: disconnect the effective break contacts 306 and 859' of the protective relays 303 and 855 at each of the stations from their connection with the make contact 229 and 927 of the third counting chain relays 225 and 925, and disconnect the fourth counting chain relays from contacts 305 and 859. By connecting contacts 229 and 927 directly to the fourth counting chain relay, a normal counting chain circuit is effected.

Assuming protection against six transient impulses is desired, the effective contacts 306 and 859' on protective relays 303 and 855 are connected between the sixth and seventh counting chain relays. At the substation for example contacts 244 would be disconnected from the winding of relay 245 and would be reconnected to C359. The winding of relay 245 should then be connected to C358 in an obvious manner. Thus the equipment will be held operated until unlocking six impulses have been received and the sixth counting chain relay has operated to prepare reinitiation of the counting chain cycle. At the control station contacts 244 would be disconnected from the winding relay 245 and would be reconnected to C359. The winding of relay 245 would then be connected to C358 in an obvious manner. It is apparent from the foregoing that the connections in each instance are such that as the first set of impulses operates the connecting chain to the last relay of the preliminary range, the last relay prepares an operating circuit for the first counting chain relay to reinitiate the cycle and thereby cause the chain to "chase itself after the preliminary range is received." The protective relays 300 and 303 at the control station and 850 and 855 at the substation operate after the preliminary range has been received to open the circuit between the first counting chain relay and the last relay of the preliminary range and prepares an operating circuit for the counting chain relay following the last relay of the preliminary range so that recycling will not be effected as the chain advances a second time to operate the associated equipment in a selective manner. The protective relays at their contacts 302 and 852 prepare operating circuits for such equipment and, in effect, may be considered the key to the lock. Contacts 308 and 854 are arranged to eliminate a "blind spot" which might otherwise occur as a result of the unusual operating condition which occurs to effect energization of the first and third counting chain relays at the same time.

The adjustment of the equipment in this manner is of course dependent upon the characteristics and conditions which are peculiar to the location at which the apparatus is installed, and on-the-job adjustments are effected readily by reason of the simplicity of the protective arrangement.

By selection of a preliminary range of impulse protection which is especially well suited to the environment, the possibility of improper operation of the controlled apparatus is practically eliminated. However, in order to provide the most reliable and dependable type of equipment, the apparatus of the invention is also adapted to guard against improper operation of the controlled apparatus even though a group of impulses which exceeds the selected preliminary range is received and the description of such adaptation is now considered.

RECEIPT OF IMPULSES IN SECONDARY RANGE
(4–13 IMPULSES)

In the event of the receipt by both stations of a group of transients which is in excess of the preliminary range, the first three transients will be accepted by each station as the unlocking protective pulses and the pulses in excess of three are accepted as the impulses of a group selection code such as might be transmitted by other stations. Therefore, on termination of the transients both of these stations initiate simultaneous transmission of the group check code. Thereafter the control station and substation both remain energized in the transmitting condition to await the receipt of a point selection code. Since neither is operative to transmit such code, the system is now stalled and release is effected by operation of a manual reset key 404 by the attendant.

Inasmuch as the description of the operation of the equipment upon receipt of five transients is the same as the previous description of the transmission of a group selection code of two by the substation to the control station, and vice versa, the operating circuits for the various relays will not be again described at this point.

Briefly, assuming the receipt of a group of five transient impulses the line relays 680 and 1000 at the control station and substation will energize and effect energization of the stations in the receiving condition. The first three transients are accepted as protective pulses and the counting chains advance to their third relays 225 and 925 to prepare operating circuits for the preliminary protective pulse terminating relays 300 and 850 at the respective stations and the unlocking of the functional equipment at the stations. Each counting chain now "chases itself" by preparing its first relay for registration of the fourth incoming transient. As the fourth and fifth transient impulses are received, the counting chains advance to their second relays 220 and 920 respectively in the manner described heretofore and the second protective preliminary pulse terminating relays 303 and 855 complete the unlocking of the equipment.

Upon termination of the fifth transient impulse the line relays 680 and 1000 will restore, and at the control station receiving relay 384 is released to effect the registration the transient impulses as a group selection code of two impulses and the initiation of the transmission of the group check code to the substation is thereupon effected. Upon termination of fifth transient impulse the equipment at the substation is similarly operative to effect the registration of the two transient impulses as a group selection code of two impulses and thereafter effects the transmission of the group check code of two impulses to the control station.

Both sets of equipment then await the transmission of the point selection code and a stalled condition of the system results. Specifically relays 420, 430, 660, 650, 315, 390, 605, 300 and 303 will be in the operated condition at the control station and relays 1170, 1180, 1080, 1070, 870, 850, 858 and 840 will be operated at the substation.

It is noted therefore that although the barrier has been broken down by the transient impulses, the protective circuit arrangement of the equipment nevertheless prevents the improper operation of the controlled apparatus. The alarm lamp will be maintained energized for a prolonged period and the attendants attention will be attracted thereto. Upon operation of the manual reset key 404, the control office reset relay 600 is operated in obvious manner and equipment at both stations is restored in manner heretofore described.

RECEIPT OF MORE THAN THIRTEEN TRANSIENTS

In the event that more than thirteen transient impulses are received, the system effects automatic restoration of the equipment at both stations. Specifically, the counting chains advance to the tenth relay and on receipt of the fourteenth transient impulse by the substation equipment the application of positive potential to the driving conductor 1366 by contacts 1001 of the energized line relay 1000 effects operation of the lockout relay 805 over the circuit extending from battery over the lockout relay winding C1308, contacts 961, 913, 907, 902, C1303, contacts 808, 843, C1366 and contacts 1001 to ground. Relay 805 locks over make-before-break contacts to ground through contacts 842 and removes the controlled ground from the substation, thus locking out the substation.

On receipt of the fourteenth transient impulse at the dispatcher's office, the application of positive potential to the driving conductor 368' by the operated line relay 680 at its contacts 681 results in the operation of the lockout relay 336 through contacts 264. Lockout relay 336 locks over make-before-break contacts 337.

Reset relay 600 is in turn operated by the lockout relay 336 at its contacts 339 to initiate resetting of the equipment at the control station and substation in the manner heretofore described.

II. *Receipt of transients by one station only*

In the provision of completely dependable and reliable type control equipment, protective means for preventing improper operation by transient pulses as received by one station alone must also be provided. In the foregoing examples the transients were considered as being received by both stations simultaneously and both stations accordingly effected their own release. On the receipt of transients by one station alone however reset of the equipment is accomplished in a somewhat different manner.

SINGLE TRANSIENT PULSE (SUBSTATION ONLY)

Consideration will first be given to the operation of the equipment responsive to the receipt of a single transient pulse by the substation equipment alone. Briefly, assuming the equipment at the control station and substation to be in the normal condition, that is, relays 605, 390, 695 and 685 at the control office, and relays 840 and 1240 to 1270 at the substation, in the energized condition, it will be observed that with receipt of the single transient pulse at the substation, the line relay 1000 thereat will be operated to effect the operation of the receiving relay 835 and the first counting chain relay 915. Counting chain relay 915 in operating controls the operation of the incoming start relay 870, which at its contacts 873 interrupts the holding circuit for the line supervision relay 685 at the control office. The line supervisory equipment thereupon releases to operate relay 690 which lights the alarm lamp, and to release relay 695 which lights the line supervision lamp. The alarm lamp indicates that the equipment is off-normal. The line supervision lamp indicates that a line disturbance is present.

On termination of the transient impulse, line relay 1000 will restore to effect the release of receiving relay 835, and to simultaneously effect the operation of the first sequence relay 910. Sequence relay 910, in operating, effects the energization of the receiving control relays 825 and 830.

Receiving relay 835 restores to effect the energization of the reset control relay 845, which operates to control the energization of the impulse sending relay 1010. Impulse sending relay 1010 operates and at its contacts 1013, 1015 completes the operating circuits for the line relays 1000 and 680. Relays 835 and 920 operate.

Line relay 680 at the control office operates to control the operation of receiving relay 384 and the operation of first counting chain relay 215. Relay 215 operates the incoming start relay 315. As the line relay 680 is held operated thereby, reset relay 390 at the control office releases and at its contacts 392 interrupts the holding circuit for the following energized relays thereat to restore same; first counting chain relay 215 and incoming start relay 315. Relay 390 at its contacts 391 releases relay 384. Reset relay 390 is maintained deenergized for the interval that the line relay 680 is energized by the equipment at the substation. As the line relay 680 and 1000 are later released, line relay 680 effects the re-operation of the reset relay 390 and the equipment thereat is restored to normal.

Returning to the equipment at the substation, as the sustained operation of the line relays 680 and 1000 is effected by the sending relay 1010, restoration of reset relay 840 is effected by line relay 1000. Reset relay 840 in releasing effects the operation of the time delay relays 800 and 860 and simultaneously interrupts the power supply source for the energized relays 845, 835, 915, 910, 920, 830 and 870. Relay 830 releases relay 825.

As the reset control relay 845 restores, interruption of the holding circuit for the impulse sending relay 1010 is effected, whereupon the impulse sending relay 1010 restores and interrupts the holding circuit for the line relays 1000 and 680. Re-operation of the reset relays 390 and 840 at the respective stations is again effected. Substation time delay relays 800 and 860 restore in cascade a brief interval thereafter.

It should also be noted that the incoming start relay 870 in releasing is effective at its contacts 872 to prepare an energizing circuit for the line supervision relay equipment at the substation which subsequently responsively operates upon the release of relay 1010 and effects the termination of the lamp signals and bell at the control board. The attendant is thus informed that the transient condition has been cleared.

SINGLE TRANSIENT PULSE (CONTROL OFFICE ONLY)

In the event that a single transient pulse effects the operation of the control office line relay 680 alone, the reset of the equipment at both the substation and the control office will be accomplished by the reset equipment at the control office. For example, assuming the equipment in its normal condition, battery supervision relay 605, reset relay 390, and line supervision relays 685 and 695 at the control station and reset relay 840, and automatic point start relays 1240 and 1270 at the substation in the operated condition, as a single transient is received at the control office, line relay 680 thereat is operated to effect the operation of the receiving relay 384 and the first counting chain relay 215. Counting chain relay 215 in operating effects the operation of the incoming start relay 315.

As the single transient impulse terminates, line relay 680 is restored to interrupt the energizing circuit for the receiving relay 384. Sequence relay 210, which is associated with the first counting chain relay 215, is operated and at its contacts effects the operation of the receiving control relays 370 and 380.

Receiving relay 384 in restoring is effective at its contacts 386 to complete an operating circuit for the lockout relay 336, which operates and at its contacts 339, completes an operating circuit for the reset relay 600. Reset relay 600 operates and at its contacts 603 completes an operating circuit for the impulse sending relay 665, which is effective at its contacts 667 and 668 to complete operating circuits for the line relays 680 and 1000 at the respective stations, and to release line supervision relay 685. Relay 690 operates to illuminate the alarm lamp, but relay 695 holds through contacts 318.

Until this time the equipment at the substation has been inoperative. However, the line relay 1000 thereat is now operated by the single restoring impulse transmitted by the control station to effect the energization of the receiving relay 835 and the first counting chain relay 915 which operates the incoming start relay 870. Incoming start relay 870 at its contacts 873 further opens the line supervision equipment at the control station (which was released by control station relay 665).

As the substation line relay 1000 is held energized for a prolonged period of time, the release of the reset relay 840 is effected. Reset relay 840 restores and at its contacts 841 effects the operation of the time delay relays 800 and 860. Reset relay 840 interrupts the power supply for the receiving relay 835, counting chain relay 915 and incoming start relay 870. As line relays 680 and 1000 are subsequently restored by the control office equipment, line relay 1000 is effective to effect reenergization of the reset relay 840 and recompletion of the power supply circuits for the aforementioned portion of the equipment. Restoration of the time delay relays 800 and 860 follows the operation of the reset relay 840 and the equipment at the substation is once more restored to normal.

It should be noted at this time that as the incoming start relay 870 is released a contact is closed in the energizing circuit for the line supervisory relay 685.

Returning now to the description of the operation of the control office equipment following operation of the line relay 680 thereat by the reset relay 600 and impulse sending relay 665, receiving relay 384 is once more operated. As the line relay 680 is maintained energized for a prolonged time period, reset relay 390 restores and at its contacts 392 effects the interruption of the power for the control station equipment deenergizing reset relay 600, counting chain relay 215, sequence relay 210, receiving control relay 380, lockout relay 336 and incoming start relay 315. At its contacts 391 relay 390 releases receiving relay 384. Relay 380 releases 370. At the end of reset, relays 390 and 685 reoperate and relay 690 releases.

The equipment at both stations is now restored to normal and improper operation of the controlled apparatus by the single transient impulse received at the control office has been prevented.

TRANSIENT GROUP WITHIN PRELIMINARY RANGE (ONE STATION ONLY)

Consideration will now be given to the operation of the equipment to prevent improper operation of the controlled apparatus responsive to the receipt of groups of transients at the control office alone. Several protective circuit reactions may develop, depending upon the nature of the transient group received. For example, in the event of the reception of a group of transients within the preliminary range (one, two or three transients in the embodiment disclosed herewith), the operation of the equipment will be similar to that set forth in the foregoing description of the equipment in its operation responsive to receipt of a single transient impulse.

Briefly, assuming reception of three impulses by the control office, the equipment thereat will respond to energize itself in the receiving condition and to accept the transient impulses by effecting operation of the counting chain to the third relay 225. The equipment for controlling the operation of the controlled apparatus, however, is safely locked apart from the counting chain, and no operation thereof is effected at this time. Following reception of the last transient, operation of the reset relay 690 is effected and equipment is restored to normal, as heretofore described.

The substation equipment is similarly responsive to receipt of transients within the preliminary range, that is, the set energizes itself in the receiving condition and accepts the transient impulses to operate the counting chain to the relay corresponding to the number of transients received. The other equipment at the station is safely locked apart from the counting chain and no functional operation of the controlled apparatus is effected at this time. As the transient impulses are terminated, the operation of the reset control relay 845 is effected along with the impulse sending relay 1010 and line relay 1000. Reset relay 840 is thereafter operated to restore the set to normal in the manner heretofore described.

Transient Groups Outside Preliminary Range

In the event of the reception of a group of transients which is greater than the preliminary range for which the apparatus is adjusted, the operation of the equipment is dependent upon the number of transients received, the equipment of the present disclosure operating in one manner if the number of transients lies in the range of from 4 to 6 impulses, in a second manner in the event that the number of transients is in the range of from 7 to 13 impulses, and in a third manner if the number of transients exceeds 13. It is apparent that these ranges will vary with the manner in which the equipment is adjusted, a set adjusted with a preliminary range of six impulses having a first outside range of 7-12 impulses, a second range of 13-16 impulses, and a third range beyond 16 impulses.

Transient Receipt by Dispatcher's Office Alone

*Group transients in secondary range*

(a) FOUR TO SIX IMPULSES

The equipment is operative in several different manners in accordance with the number of impulses received in the secondary range (4-13 impulses) and separate consideration must therefore be given to each operation.

The operation of equipment in the event of receipt of transients in the first portion of the secondary range (4 to 6 impulses) by the control office alone will be first considered. Briefly, in the event of the receipt of a group of impulses within this range, the control office will be operative to energize itself in the receiving condition, and to tender the first three of the transient impulses to its counting chain to effect the unlocking of the equipment. Assuming that five transient impulses have been received, the next two of the transient impulses are translated by the equipment as impulses of a group selection code, and the counting chain advances to the second relay. As the transients are terminated, registration is accomplished in the same manner heretofore described in connection with the equipment operation responsive to the receipt of the group selection code in identifying an automatic circuit breaker trip at point twelve. The equipment at the control station now conditions itself to effect the transmission of a group check code comprising two impulses to indicate to the substation that a group selection code of two impulses has been registered.

The equipment at the substation has been heretofore inoperative (the transients having been received by the control station alone) and the equipment thereat now responds to the two impulses transmitted by the control station and energizes itself in the receiving condition. In that this is the first impulse reception by the substation at this time, the impulses are considered as transients, the counting chain advancing to its second relay 820. As the receiving relay 835 releases following termination of receipt of the two impulses, an operating circuit is completed for the reset control relay 845 which operates to complete an operating circuit for the impulse sending relay 1010. As the impulse sending relay 1010 operates to close its contacts 1013 and 1015, operating circuits for the line relay 680 and 1000 at each of the stations are completed.

After a predetermined period of energization of the line relays in such manner, the reset relays 390 and 840 of the respective stations are restored to effect the restoration of their associated station equipment, in the manner heretofore described, line supervision which has been disrupted is once more effected with restoration of the equipment to normal.

It is apparent from the foregoing that with the receipt of a group of transients outside the preliminary range and within the first portion of the secondary range (4-6 impulses) by the control station alone, the equipment is effective to automatically restore without effecting improper operation of the controlled apparatus or improper reporting. This is an important feature of the arrangement in that most previous arrangements, at best, only effect a stalled condition when the impulses exceeded a given preliminary range.

(b) SEVEN TO THIRTEEN IMPULSES

The operation of the equipment responsive to receipt by the control station alone of a group of transients (7-13 impulses) which lies in the latter portion of the secondary range is now considered. With the receipt of such group of transients by the control station only, the first three transients of the group are treated as protective pulses and the equipment thereat responds to effect unlocking of the functional equipment and the remaining impulses will be treated as the impulses of a group selection code. Specifically, assuming reception of a group of nine transient impulses, with the receipt of the first impulse the control station equipment energizes itself in the receiving condition and thereafter, with receipt of the second and third impulses, the counting chain relay is advanced to the third relay to prepare unlocking of the equipment and to initiate recycling of the counting chain.

As the succeeding six impulses are received, the counting chain advances to the sixth relay 240 to register the impulses as a group selection code of six impulses. Following termination of the incoming transient impulses, the receiving equipment at the control station is deenergized and the transmitting equipment is rendered effective to transmit to the substation, over the line conductors 85 and 86, a group check code which comprises six impulses.

It will be recalled that the substation has not received the transient impulses, and, accordingly, is still in the unoperated and locked condition. As the six transmitted impulses are received, therefore, the first three of the six impulses are considered as key impulses and the substation responsively energizes in the receiving condition and advances its counting chain to the third relay 925 to prepare unlocking of the associated equipment and to initiate recycling of the chain.

As the succeeding three impulses of the group of six are received, the recycled counting chain once more advances to its third relay 925 to register the impulses as a group selection code of three. Following receipt of the incoming group of six impulses, the registration of a group selection code of three impulses is effected, the details of such operation becoming apparent with reference to the previous description of the equipment operation during the control station signal selecting transmission.

Thereafter, the substation automatically deenergizes its receiving equipment, and energizes the transmitting equipment to effect the transmittal of a group check code of three impulses.

The equipment at the control office, on receipt of the first of the three impulses being transmitted by the substation energizes in the receiving condition and accepts the incoming set of three impulses as a point selection code by reason of its energized condition which followed its transmission of the group check code. The counting chain is accordingly advanced to the third relay and registration of the point selection code of three impulses is effected following the termination of the transients thereof. The control office equipment accordingly deenergizes its receiving equipment and conditions its transmitting equipment to effect the transmittal of a point check code of three impulses.

As the first of the three impulses comprising the point check code being transmitted by the control office are received by the substation, the substation equipment is energized in a receiving condition and accepts the three impulses as a point selection code by reason of its energized condition following its transmission of the group check code of three impulses. Following termination of the receipt of the three impulses, the substation automatically deenergizes its receiving equipment and effects the transmittal of the point check code of three impulses to the control office.

The control office equipment on receipt of the first of the three impulses energizes in the receiving condition and accepts the three impulses as an indication code by reason of its energized condition which followed its transmission of the point check code, the counting chain advancing to its third relay 225 and effecting the energization thereof.

It is apparent from the foregoing that a group selection code of six and a point selection of three are now registered at the control office and the white point selection lamp on point 63 will be illuminated. Inasmuch as the trip supervision code comprises three impulses and three impulses have now been received, the green open (trip) indication lamp associated with the selection lamp 63 will be falsely illuminated. Reset relay 600 at the control office is operated after the lamp illumination in a manner heretofore described in connection with the description of transmittal by the substation of an automatic trip, and reset of the equipment at both of the stations is accomplished.

It is apparent that if the pulses received were not equal to the trip indication code, the false indication would not have been effected. It is also evident that the only point in the one hundred points where such false trip indication can result is on point 63, and accordingly, if desirable, such point may be provided with suitable protective means or left unused. From a practical standpoint the receipt of this many transients is an improbability and normal usage of that point without fear of false operation may be safely effected.

In the event of the receipt of any other group of impulses in this range, the false indication code transmitted by the substation will not be equal to the predetermined code of three impulses. Accordingly, a counting chain relay other than the third relay (225) will be operated and the energizing circuits for the point indicating relay, associated with the group and point selection made, will be interrupted by the open contacts 225' of the third counting chain relay 225. The equipment has now reached an obvious stall.

The attendant is notified of such stall by the excessive length of time for which the alarm lamps 415 are maintained in the operated condition, and manual reset of the equipment may then be accomplished by operation of the reset key 404. Reset relay 600 is operated by the key in the manner heretofore described to effect the restoration of the equipment at both of the stations.

One other point which is susceptible to a false operation is point 85, it being apparent that with receipt of eleven transient impulses (almost an impossibility) a group selection code of eight and a point selection code of five will result to effect the transmission of a false close control digit of five impulses. Automatic reset follows such operation and a false indication only will result.

(c) TERTIARY RANGE (MORE THAN 13)

Consideration of the equipment operation responsive to receipt by the control station alone of a group of transients in excess of thirteen is now in order. As the first impulse of the transient group is received, the control station equipment will energize itself in the receiving condition and the first three impulses will be accepted as protective pulses to unlock the station equipment. As the third counting chain relay 225 is operated responsive thereto, the counting cycle is reinitiated and the counting chain thereafter receives the succeeding ten impulses to advance the chain to the tenth relay 260. As the fourteenth pulse is received, the aforedescribed operating circuit is completed for the lockout relay 336, which operates, and at its contacts 339 effects the operation of the reset relay 600 to effect the restoration of the equipment at the office and the substation in the manner heretofore described. Thus, the equipment is restored without danger of affecting the controlled circuit breakers.

It is apparent from the foregoing that with the receipt of any number of transient impulses at the control station alone, positive protection is provided for preventing operation of the controlled apparatus. Additionally, in the majority of cases, automatic reset of the equipment is safely, reliably and speedily effected.

TRANSIENT RECEIPT BY SUBSTATION ALONE

The substation equipment is operative in a similar manner to provide protection against improper operation of the controlled apparatus under all types of adverse operating conditions. In view of the similarity of the equipment at the stations and the detail with which the operating circuits have been heretofore considered, it is not considered necessary to set forth the details of the circuit operations.

The substation equipment is responsive to receipt of a group of transients within the preliminary range of the disclosed equipment (1-3 impulses) to energize its equipment in the receiving condition. As the impulses are received, the counting chain is operated to accept the transient impulses and register same in a non-functional manner. The remaining equipment, being locked apart from the counting chain, is not operated and the controlled apparatus is accordingly protected. As the group of transients has been entirely received, line relay 1000 and receiving relay 835 will restore and reset control relay 845 will operate through contacts 839' and 833 to initiate restoration of the equipment at the substation and at the control office in the manner heretofore described.

*Group transients in secondary range*

(a) FOUR TO SIX IMPULSES

With reception of a group of transients in the first portion of the secondary range by the substation alone, that is from 4 to 6 impulses, the substation equipment will respond to energize in the receiving condition. The first three impulses of the transient group are accepted by the substation as protective pulses. The counting chain is operated to unlock the equipment and to prepare operation of the initial counting chain relay. Assuming the reception of a group of five impulses, the first three impulses are used as described, and the last two impulses of the group will be accepted by the counting chain as a group selection code of two impulses. Following termination of the impulses, the registration of the group selection digit is effected, the receiving equipment at the substation is deenergized, and the transmitting equipment is energized to transmit a group check code of two impulses.

Upon receipt of the first of the group check code impulses, the equipment at the control station is energized in the receiving condition and effects the successive operation of the first and second relays of the counting chain. Inasmuch as the control station has not received the transient impulses, it is still in its normal restored condition, and, accordingly, the two impulses transmitted by the substation as a group selection code are treated as transient impulses by the control office equipment. The counting chain thereat advances to the second relay and as the impulses are terminated, receiving relay 384 restores to effect the operation of lockout relay 336, and consequentially reset relay 600. The restoration of the equipment at the control office and the substation is thereafter effected by the reset relay 600 at the control office in the manner heretofore described.

It is apparent from the foregoing that with receipt, by the substation alone, of a group of transients outside the preliminary range and within the first portion of the secondary range (4 to 6 impulses) the equipment is effective to automatically restore without effecting improper operation of the controlled apparatus or improper reporting.

(b) SEVEN TO THIRTEEN IMPULSES

In the event of the reception of a group of transients by the substation alone, which group is in the latter portion of the secondary range, and in the present disclosure comprises a range of from seven to thirteen impulses, the substation equipment will, upon receipt of the first of these impulses, energize in a receiving condition. Assuming receipt of a nine transient impulse group, the first three of the nine impulses will be accepted as protective pulses and the counting chain is advanced to its third relay 925 to prepare unlocking of the equipment and re-initiation of the counting chain cycle. The remaining six impulses will be accepted by the substation as a group selection code of six impulses, the counting chain advancing to its sixth relay 940.

As the impulses terminate, the registration of the group selection digit is effected, and the substation thereafter deenergizes its receiving equipment and energizes its transmitting equipment to effect the transmission of group check code of six impulses, that is, a code comprising three impulses less than the number of transients received. The control station, not having been energized heretofore, accepts the first of the three incoming impulses as protective pulses to energize its equipment in the receiving condition, to prepare unlocking of the equipment, and to re-initiate the cycle of the counting chain. The last three of the code incoming impulses to be transmitted by the substation are accepted by the control station equipment as a group selection code of three impulses, and the counting chain is advanced to its third relay. As the impulses are terminated, the registration of the false group selection code is effected. Thereafter, the control station equipment is operative to deenergize its receiving equipment and to energize the transmitting equipment to send a group check code of three digits; that is, a code which comprises three impulses less than the number of impulses which was received.

The substation on receipt of the false group check code of three impulses transmitted by the control station energizes in the receiving condition and advances its counting chain to the third relay. By reason of the fact that the substation previously transmitted a group check code, the equipment thereat is presently energized to accept the incoming impulses as a point selection code. Upon termination of the incoming impulses, the registration of a point selection code of three pulses is accordingly effective, and the substation equipment is operative to transmit a point check code of three impulses back to the control office equipment.

The office equipment, however, having just transmitted a group check code, accepts the incoming impulses as a point selection code, and upon termination of the incoming impulses effects the registration of a point selection code of three impulses. Thereafter the control station equipment is responsively operative to transmit what it considers to be a point check code of three impulses to the substation. The substation, however, has just transmitted a point selection code, and accordingly accepts the three incoming impulses as a control code. Since the trip control code comprises three impulses, an operating circuit for the trip magnet of the chosen circuit breaker is completed.

It will be apparent that the registered group selection numeral is 4 and the point selection digit is three. Accordingly, the circuit will be completed for tripping the circuit breaker at point 63, such circuit extending from positive battery over contacts 886, C1339', contacts 926', C1339 and the closed contacts of the operated point selection relay for the circuit breaker at point 63 (not shown, but similar to contacts 1216 on point selection relay 1215 for point 12) and to the tripping magnet for circuit breaker 63 (not shown, but similar to magnet 1289 for point 12).

Upon tripping of the breaker, the substation is operative to send back an indication code to inform the attendant of the trip, which indication will be recorded on point 33 instead of point 63. Reset relay 600 at the control station is operated in the manner heretofore described in the description of indication code transmission by the substation to effect the resetting of the equipment at both ends.

It is obvious that when the pulses are equal to the trip control code only point 63 may be falsely operated. Accordingly, if it is not considered practical to set the preliminary range of the equipment at nine to prevent such occurrence, it may be considered advantageous to leave this point blank to effect absolute protection. From a practical standpoint, the receipt of nine transients is so improbable that the condition may safely be ignored in most installations.

It is obvious that if other than nine transients are received, the impulses accepted by the substation as the indication impulses will not be equal to the true code of three impulses. Accordingly, the third counting chain relay 925 will be inoperative when the impulses are terminated, and contacts 926' will be in the open position whereby the energizing circuits for all of the trip magnets, such as 1289, are opened and no circuit breaker is tripped. Additionally, the substation equipment is inoperative to send the trip indication code to the control station (which is still in the transmitting condition) and an obvious stall is effected.

In the event of the receipt of eleven transient impulses, a false close control code of five impulses will be received and point 85, if in the open condition, may be falsely closed. The several protective alternatives heretofore mentioned may be again employed if desired, it being noted that the receipt of eleven transients is a practical improbability.

RECEIPT OF MORE THAN THIRTEEN IMPULSES

In the event of the receipt of more than thirteen impulses by the substation alone, the counting chain at the substation advances to the third relay 925 and then reinitiates its cycle to advance to the tenth relay 960. As the fourteenth impulse is received, an operating circuit for lock out relay 805 is completed, which extends from battery over relay 805, C1308, contacts 961, 913, 907, 902, C1303, contacts 808, 843, C1366, and contacts 1001 to ground. Lockout relay 805 locks over make-before-break contacts to ground through contacts 842 and is operative to interrupt the operating circuits for the various substation components in the same manner as the reset relay 840. Thus substation lockout is effected. The lockout relay 805 may be readily adapted to simulate the reset effected by the lockout relay 336 at the control station, if desired, the present operation thereof to lock out the substation being adapted for use in systems of the multi-station type. The substation is thus operative to effect protection against false operation of the circuit breakers with receipt of any number of transient impulses thereat.

CONCLUSION

It is seen from the foregoing that the supervisory control equipment of the control station is arranged to effect positive, safe and reliable controlled operation of units disposed at one or more remotely located substations. Additionally, many supervisory features inherent in the system are adapted to keep the attendant at the control station informed at all times as to the condition of the units at the substation.

A particularly important feature of the invention is the manner in which novel protective circuit arrangements are provided to effect protection of the controlled apparatus from improper operation as a result of the entry of transient impulses within the system. In brief summary, the following charts indicate the exact protective operation effected, in an arrangement adjusted in the manner of the disclosed equipment, to have a preliminary range of transient protection comprising three, six or nine impulses.

PRELIMINARY RANGE OF THREE IMPULSES

| Transients | Office and Sub Receive Transients Simultaneously | Office Receives Transients Only | Sub Receives Transients Only |
| --- | --- | --- | --- |
| 1 | Reset | Reset | Reset. |
| 2 | do | do | Do. |
| 3 | do | do | Do. |
| 4 | Stall | do | Do. |
| 5 | do | do | Do. |
| 6 | do | do | Do. |
| 7 | do | Stall | Stall. |
| 8 | do | do | Do. |
| 9 | do | False Trip Indication on point 63 at office followed by Automatic Reset. | False trip control on point 63 at sub and false trip indication on point 33 at office followed by Automatic Reset. |
| 10 | do | Stall | Stall. |
| 11 | do | False Close Indication on point 85 at office followed by Automatic Reset. | False Close Control on point 85 at sub and false close indication on point 53 at office followed by Automatic Reset. |
| 12 | do | Stall | Stall. |
| 13 | do | do | Do. |
| Thereafter | Reset | Reset | Substation Lockout. |

PRELIMINARY RANGE OF SIX IMPULSES

| Transients | Office and Sub Receive Transients Simultaneously | Office Receives Transients Only | Sub Receives Transients Only |
|---|---|---|---|
| 1 | Reset | Reset | Reset. |
| 2 | do | do | Do. |
| 3 | do | do | Do. |
| 4 | do | do | Do. |
| 5 | do | do | Do. |
| 6 | do | do | Do. |
| 7 | Stall | do | Do. |
| 8 | do | do | Do. |
| 9 | do | do | Do. |
| 10 | do | do | Do. |
| 11 | do | do | Do. |
| 12 | do | do | Do. |
| 13 | do | Stall | Stall. |
| 14 | do | do | Do. |
| 15 | do | False Trip Indication on point 93 at office followed by Automatic Reset. | False Trip Control on point 93 at substation and false trip indication on point 33 at office followed by Automatic reset. |
| 16 | do | Stall | Stall. |
| Thereafter | Reset | Reset | Substation Lockout. |

PRELIMINARY RANGE OF NINE IMPULSES

| 1 | Reset | Reset | Reset. |
|---|---|---|---|
| 2 | do | do | Do. |
| 3 | do | do | Do. |
| 4 | do | do | Do. |
| 5 | do | do | Do. |
| 6 | do | do | Do. |
| 7 | do | do | Do. |
| 8 | do | do | Do. |
| 9 | do | do | Do. |
| 10 | Stall | do | Do. |
| 11 | do | do | Do. |
| 12 | do | do | Do. |
| 13 | do | do | Do. |
| 14 | do | do | Do. |
| 15 | do | do | Do. |
| 16 | do | do | Do. |
| 17 | do | do | Do. |
| 18 | do | do | Do. |
| 19 | do | Stall | Stall. |
| Thereafter | Reset | Reset | Substation Lockout. |

The protection obtainable by using other preliminary ranges is obvious from the foregoing illustrations.

As previously pointed out, the number of automatic resets by the equipment is greatly increased by an arrangement having a combination chain unit which through the use of protective relays is caused to "chase itself" in operation, and a greater margin of safety is, therefore, provided. By adjusting the equipment to respond to a preliminary range of impulses of a higher value, absolute protection against improper operation by any number of transient impulses may be effected under the most adverse operating conditions.

It is also important to note that such protection is afforded without diminution of the controllable points for which the particular type system is inherently adapted. For example, a two digit system, such as is disclosed herein, is inherently adapted for effecting selective control of one hundred points and, according to a feature of the invention, the desirable type protective features have been included without diminishing the number of points the equipment is adapted to control.

Also, the protective features have been added with little impairment of the speed of operation of the equipment, for once the equipment is unlocked the supervisory and selective operations are accomplishhed without further delay.

Finally, the comparative simplicity of the new and novel protective circuit arrangements provide a more economical type control system which is adapted for effecting safe remote control of all of the more critical types of equipment used in the field today and a definite advance in safe remote control equipment is provided thereby.

Various other features of the invention which are believed to be new are set forth in the accompanying claims.

We claim:

1. In a supervisory system adapted for remote control purposes having at least a pair of stations, each of said stations having means for connecting same to a source of potential and including equipment energized thereby for transmitting and receiving coded signals over an interconnecting signalling channel to selectively control a plurality of controlled units disposed at each of said stations, registering means at each station comprising a relay counting chain which is arranged for sequential advancement with each impulse reception to effect an indication of the total impulses received, means for translating signals registered on said chain into selective operations of the controlled units thereat, said translating means being normally locked whereby said counting chains are normally advanced by received impulses without effecting operation of the translating means, means for terminating advancement of said chain upon reaching a predetermined relay thereof and for preparing reoperation of the first counting chain relay and the recycling of the chain with receipt of a further signal impulse, protective means at each station controlled by advancement of said counting chain to said predetermined relay for unlocking said translating equipment, said protective means comprising a first protective relay which is controlled to operate with operation of said predetermined counting chain relay, switching means controlled by operation of said first protective relay to prepare an operating circuit for said translating means, and a second protective relay operative with initiation of the counting chain recycling in a selective operation to prevent recycling of the chain as it advances to said predetermined relay, said second protective relay being also operative to complete said prepared circuit to said translating means.

2. In a supervisory system adapted for remote control purposes having at least a pair of stations, each of said stations having means for connecting same to a source of potential and including equipment energized thereby for transmitting and receiving coded signals over an interconnecting signalling channel to selectively control a plurality of controlled units disposed at each of the stations, registering means at each station comprising a relay counting chain, a driving circuit controlled by received impulses for effecting sequential advancement of said chain with receipt of each impulse to effect an indication of the total number of impulses received, means for translating impulses registered on said chain into selective operations of the controlled units thereat, said translating means being normally locked whereby said counting chains are normally advanced responsive to receipt of impulses without effecting operation of the translating means; switching means controlled by the third relay of said chain on advancement of the chain thereto responsive to receipt of three impulses for reconnecting said driving circuit to the first relay of said counting chain; protective means at each station for unlocking said translating means, switching means controlled by operation of said third relay for initiating the operation of said protective means; said protective means comprising a first protective relay controlled to operate by said last switching means to prepare energizing circuits for said translating means, and a second protective relay arranged to be energized in series with said first protective relay following reoperation of said first counting chain relay, said second protective relay being operative to interrupt the recycling circuit controlled by the third counting chain relay and to prepare the fourth relay of said counting chain for operation with the recycling of said chain in a selective operation thereafter, whereby said counting chain effects successive registration of signal impulses received after dissipation of the first three protective impulses.

3. In a supervisory system adapted for remote control purposes having at least a pair of stations, each of said stations having means for connecting same to a source of potential and including equipment energized thereby for transmitting and receiving coded signals over an interconnecting signalling channel to selectively control a plurality of controlled units disposed at each of the stations, registering means at each station comprising a relay counting chain, a driving circuit controlled by received impulses for effecting sequential advancement of said chain with receipt of each impulse to effect an indication of the total number of impulses received, means for translating impulses registered on said chain into selective operations of the controlled units thereat, said translating means being normally locked whereby said counting chains are normally advanced responsive to receipt of impulses without effecting operation of the translating means; contact means controlled by the third relay of said chain on advancement of the chain thereto for reconnecting the driving circuit to the first counting chain relay; protective means at each station for unlocking said translating means, contact means controlled by said third relay for initiating operation of said protective means, said protective means comprising a first protective relay controlled to operate through said contact means, means controlled by said first protective relay for preparing energizing circuits for said translating means, a second protective relay arranged to be energized in series with said first protective relay following reoperation of said first counting chain relay, said second protective relay being arranged to control interruption of a point in said first relay driving circuit which was prepared by said third relay in its first round, and to transfer said prepared driving circuit to said fourth counting chain relay, whereby uninterrupted registration of the signal impulse received after the first three protective impulses is attained; reset means for resetting the equipment at both stations to said normal condition, an energizing circuit therefor arranged to be completed following termination of receipt of a first group of impulses of less than three, and contact means controlled by said second protective relay in its operation for interrupting said energizing circuit for said reset means, said system being operative thereby to restore responsive to receipt of three or less impulses by said counting chain and to effect selective operation of said control units with receipt of a group of impulses of more than three.

4. In a supervisory system adapted for remote control purposes having at least a first and second station, each of which stations includes equipment for transmitting and receiving coded impulse signals over an interconnecting signalling channel to selectively operate a predetermined number of control units disposed at each of the stations, each selective operation including the alternate transmission of several separate impulse groups by each station, locking means for normally preventing operation of the equipment at each station by received impulse groups, means at each station for prefixing an unlocking signal of a predetermined number of impulses to the first of the impulse groups to be transmitted by the signal initiating station to unlock said equipment at both stations for the duration of said selective operation, and means for resetting the equipment at each station responsive to receipt of a number of impulses prior to unlocking of the equipment which is equal to or less than the number comprising said predetermined unlocking signal.

5. In a supervisory system adapted for remote control purposes having at least a first and second station, each of said stations including equipment for transmitting and receiving coded impulse signals over an interconnecting signalling channel to selectively operate a predetermined number of controlled units disposed at each of the stations, each controlled unit at said first station being associated with a controlled unit at said second station, whereby operation of a unit at one of the stations effects a corresponding operation of the associated controlled unit at the other of the stations, said system being of the type in which a selective operation comprises initiation of an impulse transmission by one of the stations to the other of the stations to identify the unit selected for operation, the return of checkback signals by said other station which indicate the nature of the identifying signals received, transmission of an operating signal to said one station and the return of an indication of the operation accomplished by said other station; means in each of such stations normally locking its equipment to prevent operation of the controlled units thereat by incoming impulses, means for unlocking said equipment responsive to receipt of a predetermined code signal immediately prior to transmission of the unit identifying impulses, means at each of said stations for transmitting said unlocking signal only prior to the initiation of transmission of an identifying signal thereby, said unlocking equipment at each of said stations being operative responsive thereto to maintain said stations unlocked for the duration of the selective operation being accomplished, and means for resetting the equipment in the event of the receipt of impulses in number equal to or less than said predetermined unlocking code.

6. In a supervisory system adapted for remote control purposes having at least a first and second station, each of said stations including equipment for transmitting and receiving coded signal impulses over an interconnecting signalling channel to selectively operate controlled units disposed at each of the stations, each selective operation including the transmission by the initiating one of the stations of a group of impulses which identify the presently operable one of the controlled units, the return by the other station of a group of checkback impulses which indicate the unit identified by the impulses as received thereat, the transmission by the initiating station of an operating signal and the return of a signal indicating the operation which has been performed on the controlled unit; means for normally preventing operation of the controlled units at each station by impulse groups as received, means for unlocking said preventive means to permit operation of the controlled units, and means at each station for causing same, whenever it is the initiating station, to transmit a predetermined signal immediately prior to the transmission of the identifying impulse group, to operate said unlocking means at both stations for the duration of said selective operation; said means comprising an automatic impulse generator for generating signal impulses for transmission over said channel, registering means for registering impulses existing in said channel comprising a relay counting chain which is operative to advance one step with receipt of each successive impulse; means for effecting recycling of the chain after said chain has advanced to a predetermined relay responsive to transmission of a predetermined number of impulses by said generator, said impulses comprising the unlocking impulses for each station; and means for connecting said registering chain to control transmission of the remaining selective signals of the group by said impulse generator without further interruption thereby in the transmitting operation.

7. In a supervisory system adapted for remote control purposes having at least a first and second station, each of said stations including equipment for transmitting and receiving coded signal impulses over an interconnecting signalling channel to selectively operate controlled units disposed at each of the stations, each selective operation including the transmission by the initiating one of the stations of a group of impulses which identify the presently operable one of the controlled units, the return by the other station of a group of checkback impulses which indicate the unit identified by the impulses as received thereat, the transmission by the initiating station of an operating signal and the return of a signal indicating the operation which has been performed on the controlled unit; means for normally preventing operation of the controlled units at each station by impulse groups as received, means for unlocking said preventive means to permit operation of the controlled units, and means at each station for causing same, whenever it is the initiating station, to transmit a predetermined signal immediately prior to the transmission of the identifying impulse group, to operate said unlocking means at both stations for the duration of said selective operation.

8. In a supervisory system adapted for remote control purposes having at least a first and second station, each of said stations including equipment for transmitting and receiving coded signal impulses over an interconnecting signalling channel to selectively operate controlled units disposed at each of the stations, each selective operation including the transmission by the initiating one of the stations of a group of impulses which identify the presently operable one of the controlled units, the return by the other station of a group of checkback impulses which indicate the unit identified by the impulse as received thereat, the transmission by the initiating station of an operating signal and the return of a signal indicating the operation which has been performed on the controlled unit; means for normally preventing operation of the controlled units at each station by impulse groups as received, means for unlocking said preventive means to permit operation of the controlled units, and means at each station for causing same, whenever it is the initiating station, to transmit a predetermined signal immediately prior to the transmission of the identifying impulse group to operate said unlocking means at both stations for the duration of said selective operation; said pulse unlocking transmitting means comprising an automatic impulse generator for generating signal impulses for transmission over said channel, registering means for registering impulses existing in said channel which comprises a relay counting chain, said counting chain being arranged to advance one step with receipt of each successive impulse; means for effecting recycling of the chain after said chain has advanced to a predetermined relay with transmission of a predetermined number of impulses by said generator, said impulses comprising the unlocking impulses of each station; and means for rendering said recycling means for said counting chain inoperative during the transmission of said further identifying signals.

9. In a supervisory system having at least two spaced stations interconnected by a signal channel, each of which stations includes equipment for transmitting and receiving coded signals over said channel, at least one of said stations having a predetermined number of functional units located thereat and equipment for operatively supervising same, responsive to receipt of said coded signals; transient absorbing means associated with the selecting equipment at each station operative responsive to the occurrence of electrical transient impulses in said signal channel to absorb same, protective means for preventing operation of the equipment at each station other than by said transient absorbing means during normal periods, control means at each station for prefixing a given common unlocking signal to the first supervisory code signal transmitted thereby, and unlocking means associated with said transient absorption means at each station for unlocking the associated station with receipt of said prefix on the first code signal to permit response of selective equipment thereat to the following supervisory portion of the prefixed signal.

10. In a supervisory system having at least two spaced stations interconnected by a signal channel, each of which stations includes equipment for transmitting and receiving coded signals over said channel, at least one of said stations having a predetermined number of functional units located thereat and equipment for operatively supervising same responsive to receipt of said coded signals; transient absorption means associated with the selecting equipment at each station operative in response to the occurrence of electrical transient impulses in said channel to absorb same, protective means for normally preventing operation by the equipment at any station other than said transient absorbing means during normal periods, control means at each station for prefixing a given unlocking signal to the first supervisory code signal transmitted thereby, and unlocking means including and controlled by said transient absorption means at each of the stations in said system for disabling the transient absorbing means and unlocking the other equipment at each station responsive to receipt of said prefix on said first code signal, the selective equipment thereat responding to the following supervisory signals, the equipment at all stations in the system being unlocked responsive to the transmission of the common unlocking signal by any one of the stations therein.

11. In a supervisory system having at least two spaced stations interconnected by a signal channel, each of which stations includes equipment for transmitting and receiving coded signals comprising groups of impulses in given numbers over said channel, at least one of said stations having a predetermined number of functional units located thereat and equipment for operatively supervising same responsive to receipt of said coded signals; transient absorbing means associated with the selecting equipment at each station operative responsive to the occurrence of transient impulses in said channel to absorb same, protective means for preventing operation of the equipment at each station other than said transient absorbing means during normal periods, control means at each station for prefixing a common unlocking signal comprised of a single group of impulses of a predetermined number to the first supervisory code signal transmitted thereby, and unlocking means including and controlled by said operation of the transient absorption means said predetermined number of times for unlocking the associated station with receipt of said prefix to disable the transient absorbing means and unlock the equipment at each station to permit response of the selective equipment thereat to the following supervisory portion of the prefixed signal.

12. An arrangement as set forth in claim 11 in which said unlocking signal is prefixed to only the first group of supervisory impulses to be transmitted by the initiating one of said stations, and in which each station includes holding means for maintaining said station equipment unlocked and said transient absorbing means disabled for the duration of the ensuing supervisory operation.

13. In a supervisory system having at least two spaced stations interconnected by a signal channel, each of which stations includes equipment for transmitting and receiving coded signals comprising groups of impulses in given numbers over said channel, at least one of said stations having a predetermined number of functional units located thereat and equipment for operatively supervising same responsive to receipt of said coded signals; transient absorbing means associated with the selecting equipment at each station operated responsive to transient impulses which occur in said signal channel to absorb same, protective means for preventing a selecting operation by the equipment at the station responsive to absorption of transients by said transient absorbing means, control means at each station for prefixing a common unlocking signal, comprised of a single group of impulses of a predetermined number, to the first supervisory code signal transmitted thereby; unlocking means associated with said transient absorption means at each of the stations for unlocking the associated station with receipt of said prefixed code signal to permit response of the selective equipment thereat to the following supervisory portion of the prefixed signal whereby the equipment at all of said stations is unlocked simultaneously, and reset means at each of said stations operative prior to unlocking of the equipment responsive to the absorption of transient impulses of a less number than the number of impulses in the unlocking signal to effect restoration of the operated transient absorbing members.

14. In a supervisory system adapted for remote control purposes having at least a pair of stations interconnected by a signaling channel each of which includes equipment for transmitting and receiving coded signal impulse groups over said signaling chanel, and each having a set of controlled units disposed thereat; normally restored register means at each of said stations operated with receipt of incoming supervisory impulses to register same for selecting purposes and operated with occurrence of transient electrical impulses in said signaling channel to register and absorb same, translating means for translating impulses registered thereon into operation of the associated controlled units thereat, protective means for normally locking the station equipment including said translating means to prevent operation of the controlled units thereat during absorbing of transient impulses, and switching means at each station controlled by said register means operative responsive to receipt of a predetermined signal to disable said register as a transient absorbing unit, to unlock said equipment to permit response thereof to the set of supervisory signals received thereafter, and to reset said register for use in registration of the supervisory signals.

15. In a supervisory system adapted for remote control purposes having at least a pair of stations interconnected by a signaling channel each of which includes equipment for transmitting and receiving coded signal impulse groups over said signaling channel and each having a set of control units disposed thereat; register means at each of said stations operated at times with receipt of incoming supervisory impulses to register same for unit selecting purposes and at other times to register and absorb transient electrical impulses which occur in said signaling channel, translating means for translating supervisory impulses registered on said register means for operation of the associated control units thereat, protective means for normally locking the station equipment including said translating means to prevent operation of the control units thereat by the register unit in its absorption of transient impulses, and switching means at each station controlled by said register means operative responsive to receipt of a signal of a predetermined number of impulses to unlock said equipment to permit response thereof to the supervisory coded signals received thereafter, said protective means being operative to prevent unlocking of the locked equipment responsive to receipt of a signal of a less value than said predetermined number of impulses and to receipt of a signal of a greater value than a second predetermined number.

16. In an arrangement as set forth in claim 15 in which at least the control station includes alarm means operative responsive to the receipt of a signal other than said predetermined unlocking signal to notify the attendant of the operation by said register in preventing access to said equipment.

17. In a supervisory system adapted for remote control purposes having at least a pair of stations, each of said stations including equipment for transmitting and receiving coded signals over an interconnecting signaling channel to selectively control a plurality of control units disposed at each of said stations; normally restored register means at each of said stations comprising a relay counting chain which is arranged for sequential advancement with the receipt of each impulse over said signaling channel to effect the registration thereof on said chain, said counting chain at times being operative to register incoming supervisory impulses for further selective purposes and at other times to register and absorb transient electrical impulses occurring in said signaling channel to prevent false operation of the selecting equipment of the associated station; translating means for translating supervisory impulses registered thereon into operation of the associated control units thereat, protective means for normally locking the station equipment, including said translating means, to prevent operation thereof during registration of transient impulses by said counting chain, and switching means at each station controlled by said counting chain operative responsive to the advancement of said counting chain to a predetermined relay therein to disable the chain as a transient absorbing unit; to effect unlocking of the equipment at the associated station to permit response thereof to the supervisory coded signals received thereafter, and to recycle the chain to permit reuse as a register of supervisory impulses.

18. A supervisory control arrangement as set forth in claim 17 in which said predetermined relay in said counting chain is a relay other than the last relay of said chain, whereby only partial running of the chain is effected in the unlocking operation.

19. In a supervisory system adapted for remote control purposes having at least a pair of stations, each of said stations including equipment for transmitting and receiving coded signals over an interconnected signaling channel to selectively control a plurality of control units disposed at each of said stations, register means at each of said stations comprising a relay counting chain which is arranged for sequential advancement with the receipt of each impulse over said signaling channel to effect the registration thereof on said chain, said counting chain being operative at times to register incoming supervisory impulses for further selective purposes, and at other times to register and absorb transient electrical impulses occurring in said signaling channel; translating means for translating the supervisory impulses registered on said chain into operation of the associated control units thereat, protective means for normally locking the station equipment including said translating means to prevent operation thereof during registration of transient impulses by said counting chain, and switching means at each station controlled by the advancement of said counting chain to the third relay therein to effect unlocking of the translating and selective equipment, disabling of the chain as a transient absorbing unit, and enablement thereof as a recorder of selective impulse codes in the control of the selective equipment thereat.

20. In a supervisory system adapted for remote control purposes having at least a pair of stations interconnected over a signalling channel, each of which includes equipment for transmitting and receiving coded signal impulse groups over said signaling channel and each having a series of control units disposed thereat; registering means at each of said stations for registering impulses received over said channel, said registering means being operative at times to register supervisory impulses appearing on said channel for effecting selective operations in the associated equipment, and being operative at other times to register transient electrical disturbances appearing therein to absorb same; translating means for translating supervisory signals registered thereon into selection and operation of the associated control units, protective means for normally locking said translating means from said register to prevent the operation thereof at either station with operation of said register means to absorb said transient impulses, switching means associated with said register operative responsive only after receipt of a group of a predetermined number of impulses for disabling said registering means as a transient absorbing means, preparing same for use in a supervisory operation and for unlocking said translating means to permit the registration of supervisory impulses received thereafter, and reset means controlled by said register means in their response to receipt of a first group of impulses which is less in number than said predetermined number to reset the register to its normal transient absorbing connections, whereby transient impulses appearing in said channel in a number less than said predetermined number are prevented from operating said control units.

21. An arrangement as set forth in claim 20 which includes further protective means at each of said stations for preventing the false operation of control units thereat responsive to receipt of a number of impulses which is greater than a second predetermined number.

22. In a supervisory system adapted for remote control purposes having at least a pair of stations interconnected over a signalling channel, each of which includes equipment for transmitting and receiving coded signal impulse groups over said signalling channel and each having a series of control units disposed thereat; registering means at each of said stations for registering impulses received over said channel, said registering means being operative at times to register supervisory impulses appearing on said channel for effecting selective operations in the associated equipment, and being operative at other times to register transient electrical disturbances appearing therein to absorb same; translating means for translating supervisory signals registered thereon into selection and operation of the associated control units, protective means for normally locking said translating means from said register to prevent the operation thereof at either station with operation of said register means to absorb said transient impulses, switching means associated with said register operative responsive only after receipt of a group of a predetermined number of impulses for disabling said registering means as a transient absorbing means, preparing same for use in a supervisory operation and for unlocking said translating means to permit the registration of supervisory impulses received thereafter, reset means controlled by said register means in their response to receipt of a first group of impulses which is less in number than said predetermined number to reset the register to its normal transient absorbing connections, whereby transient impulses appearing in said channel in a number less than said predetermined number are prevented from operating said control units, and auxiliary reset means at each of said stations which are operative responsive to receipt of a number of transient impulses at a station which is larger than a second predetermined number to effect restoration of the equipment at all of the stations in the system to their normal condition.

23. In a supervisory system adapted for remote control purposes having at least a pair of stations interconnected over a signaling channel, each of which includes equipment for transmitting and receiving coded signal impulse groups over said signaling channel and each having a series of control units disposed thereat; registering means at each of said stations for registering impulses received over said channel, said registering means being operative at times to register supervisory impulses appearing on said channel for effecting selective operations in the associated equipment, and being operative at other times to register transient electrical disturbances appearing therein to absorb same; translating means for translating supervisory signals registered thereon into selection and operation of the associated control units, protective means for normally locking said translating means from said register to prevent the operation thereof at either station with operation of said register means to absorb said transient impulses, switching means associated with said register operative responsive only after receipt of a group of a predetermined number of impulses for disabling said registering means as a transient absorbing means, preparing same for use in a supervisory operation and for unlocking said translating means to permit the registration of supervisory impulses received thereafter, reset means controlled by said register means in their response to receipt of a first group of impulses which is less in number than said predetermined number to reset the register to its normal transient absorbing connections, whereby transient impulses appearing in said channel in a number less than said predetermined number are prevented from operating said control units, and auxiliary reset means at each station operative in response to receipt of a number of impulses in excess of said predetermined number by said station to transmit a reset signal for restoring its own equipment and the equipment at each of the other stations in said system to said normal condition and to reset said register for its transient absorbing condition.

24. In a supervisory system adapted for remote control purposes having at least a first and second station, each of which stations includes equipment for transmitting and receiving coded impulse signals over an interconnecting signaling channel to selectively operate a predetermined number of control units disposed at each of the stations, each selective operation including the alternate transmission of several separate impulse groups by each station, transient absorbing means at each station for normally absorbing a given number of impulses appearing on said channel without effecting operation of other selective equipment at its associated station, whereby electrical transient disturbances appearing on the line are rendered incapable of effecting false operation of the selecting equipment thereat; and transmitting control means at each station for prefixing a predetermined common unlocking signal to the first group of a set of supervisory impulse groups to be transmitted by a signal initiating station, and receiving control means at each station for disabling the transient absorbing means and unlocking the equipment thereat to permit the response thereof to the succeeding supervisory impulse groups, and holding means at each station for maintaining the equipment at each of the stations unlocked for the duration of said ensuing selective operation.

LEMUEL R. BREESE.
HOWARD H. BREWER.

REFERENCES CITED

The following references are of record in the file of this patent:

UNITED STATES PATENTS

| Number | Name | Date |
|---|---|---|
| 2,021,382 | Reiber | Nov. 19, 1935 |
| 2,132,126 | Phinney | Oct. 4, 1938 |
| 2,229,249 | Lewis | Jan. 21, 1941 |
| 2,339,872 | Miller | Jan. 25, 1944 |
| 2,394,080 | Laurenson | Feb. 5, 1946 |
| 2,444,243 | Breese | June 29, 1948 |